US012809134B2

(12) United States Patent
Seo et al.

(10) Patent No.: US 12,809,134 B2
(45) Date of Patent: Nov. 24, 2026

(54) LENS ASSEMBLY AND ELECTRONIC DEVICE COMPRISING SAME

(71) Applicant: SAMSUNG ELECTRONICS CO., LTD., Suwon-si (KR)

(72) Inventors: Jungpa Seo, Suwon-si (KR); Seungyong Kim, Suwon-si (KR); Yongjae Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 18/921,722

(22) Filed: Oct. 21, 2024

(65) Prior Publication Data

US 2025/0044557 A1 Feb. 6, 2025

Related U.S. Application Data

(63) Continuation of application No. PCT/KR2023/004618, filed on Apr. 5, 2023.

(30) Foreign Application Priority Data

Apr. 20, 2022 (KR) ........................ 10-2022-0049090
Aug. 24, 2022 (KR) ........................ 10-2022-0106385

(51) Int. Cl.
*G02B 13/18* (2006.01)
*G02B 9/60* (2006.01)
(Continued)

(52) U.S. Cl.
CPC ........... *G02B 13/0045* (2013.01); *G02B 9/60* (2013.01); *G02B 30/00* (2020.01)

(58) Field of Classification Search
CPC ... G02B 9/12; G02B 9/34; G02B 9/60; G02B 9/62; G02B 13/0035; G02B 13/004; G02B 13/0045; G02B 13/18
See application file for complete search history.

(56) References Cited

U.S. PATENT DOCUMENTS 3,039,358 A 6/1962 Vierling et al.
6,570,652 B1 5/2003 Cappiello
(Continued)

FOREIGN PATENT DOCUMENTS

CN 208384208 U 1/2019
JP 2007-65528 A 3/2007
(Continued)

OTHER PUBLICATIONS

Communication dated Jul. 23, 2025, issued by the European Patent Office in counterpart European Application No. 23792073.1.
(Continued)

*Primary Examiner* — Joseph P Martinez
(74) *Attorney, Agent, or Firm* — Sughrue Mion, PLLC

(57) ABSTRACT

Provided is a device including: an image sensor; and a lens assembly, wherein the lens assembly includes a first lens made of a synthetic resin that is closest to the object side of the lens assembly among the lenses of the assembly, wherein at least one surface of an object side or an image side surface of the first lens is a free curved surface lens including a first radius of curvature for a first curve in a first direction, and a second radius of curvature different from the first radius of curvature for a second curve in a second direction, wherein an effective diameter of the second curve is greater than an effective diameter of the first curve, and the device satisfies the expression 0.1<DY_L1/F1<0.3, wherein DY_L1 is the effective diameter of the first curve, and F1 is a focal length of the first lens.

20 Claims, 48 Drawing Sheets

(51) Int. Cl.
*G02B 13/00* (2006.01)
*G02B 30/00* (2020.01)

(56) References Cited

U.S. PATENT DOCUMENTS

| | | | |
|---|---|---|---|
| 10,641,859 B2 | 5/2020 | Laine et al. | |
| 10,831,002 B1 | 11/2020 | Li et al. | |
| 10,838,171 B1 | 11/2020 | Li et al. | |
| 10,976,518 B2 | 4/2021 | Gong et al. | |
| 11,733,486 B2 | 8/2023 | Yoo et al. | |
| 2003/0189763 A1 | 10/2003 | Horiuchi | |
| 2005/0083405 A1 | 4/2005 | Imoto et al. | |
| 2007/0052833 A1* | 3/2007 | Matsui | G02B 13/08 348/335 |
| 2009/0268305 A1 | 10/2009 | Pretorius | |
| 2012/0154523 A1 | 6/2012 | Focke et al. | |
| 2014/0016210 A1 | 1/2014 | Vallés Navarro et al. | |
| 2014/0300973 A1 | 10/2014 | Neil | |
| 2014/0307152 A1 | 10/2014 | Iwamoto | |
| 2016/0161708 A1 | 6/2016 | Jang et al. | |
| 2016/0202393 A1 | 7/2016 | Saiga et al. | |
| 2019/0129152 A1 | 5/2019 | Matsuo | |
| 2020/0103619 A1 | 4/2020 | Heu | |
| 2021/0011264 A1 | 1/2021 | Wang et al. | |
| 2021/0096339 A1 | 4/2021 | Li et al. | |
| 2021/0116686 A1 | 4/2021 | Li et al. | |
| 2021/0132321 A1 | 5/2021 | Shobayashi | |
| 2021/0318527 A1 | 10/2021 | Gao et al. | |

FOREIGN PATENT DOCUMENTS

| | | |
|---|---|---|
| JP | 2008-107616 A | 5/2008 |
| JP | 2010-134286 A | 6/2010 |
| JP | 2021-32908 A | 3/2021 |
| KR | 10-1717208 B1 | 3/2017 |
| KR | 10-1777153 B1 | 9/2017 |
| KR | 10-1830765 B1 | 2/2018 |
| KR | 10-2020-0031512 A | 3/2020 |
| KR | 10-2020-0038154 A | 4/2020 |
| KR | 10-2020-0140245 A | 12/2020 |

OTHER PUBLICATIONS

International Search Report (PCT/ISA/210) issued on Jul. 13, 2023 by the International Searching Authority in International Patent Application No. PCT/KR2023/004618.
Written Opinion (PCT/ISA/237) issued on Jul. 13, 2023 by the International Searching Authority in International Patent Application No. PCT/KR2023/004618.
Office Action issued on Aug. 11, 2026 by the Indian Patent Office in corresponding IN Patent Application No. 202417087583.
Communication issued Aug. 21, 2026 by the European Patent Office for EP Patent Application No. 23 792 073.1.

* cited by examiner

LENS ASSEMBLY AND ELECTRONIC DEVICE COMPRISING SAME

CROSS-REFERENCE TO RELATED APPLICATIONS

This application is a by-pass continuation of International Application No. PCT/KR2023/004618, filed on Apr. 5, 2023, which is based on and claims priority to Korean Patent Application No. 10-2022-0049090, filed in the Korean Intellectual Property Office on Apr. 20, 2022, and Korean Patent Application No. 10-2022-0106385, filed in the Korean Intellectual Property Office on Aug. 24, 2022, the disclosures of which are incorporated by reference herein in their entireties.

BACKGROUND

1. Field

The disclosure relates to a lens assembly which may be mounted on a small electronic device such as a portable terminal and is capable of high-magnification imaging, and an electronic device including the same.

2. Description of Related Art

Optical devices, for example, cameras capable of capturing images or videos, are widely used. Although film-type optical devices were the mainstay of the past, digital cameras or video cameras with solid-state image sensors such as charge coupled devices (CCDs) or complementary metal-oxide semiconductors (CMOS) have become common in recent years. Optical devices with solid-state image sensors (CCDs or CMOSs) have been gradually replacing film-based optical devices, because they allow for easier storage, duplication, and movement of images as compared to film-based optical devices.

To obtain high-quality images and/or videos, an optical device may include an optical system including a lens assembly with a plurality of lenses and an image sensor having a high pixel count. The lens assembly may have, for example, a low F-number (Fno) and a low aberration, thereby enabling acquisition of high-quality (high-resolution) images and/or videos. To achieve a low F-number (Fno) and a low aberration, in other words, to achieve high-resolution and bright images, it is necessary to combine multiple lenses. As the image sensor includes more pixels, its pixel count increases, and an image sensor with a higher pixel count may obtain higher-definition (higher-resolution) images and/or videos. A plurality of very small pixels, for example, micrometer-scale pixels, may be arranged to implement a high-pixel image sensor in a limited mounting space within an electronic device. An image sensor including tens of millions to hundreds of millions of micrometer-scale pixels is now mounted even on a portable electronic device such as a smartphone or a tablet.

This optical device becomes an integral component of electronic devices that provide a variety of services and additional functions, and high-performance optical devices may entice users to purchase electronic devices.

SUMMARY

According to an aspect of the disclosure, an electronic device includes: an image sensor including an imaging plane on which an image is formed; and a lens assembly including a plurality of lenses aligned along a direction of an optical axis, the lens assembly having an object side corresponding to an object being viewed and an image side corresponding to the imaging plane, wherein the plurality of lenses includes a first lens from the object side of the lens assembly, wherein the first lens is closest to the object side of the lens assembly among the plurality of lenses, wherein an object side of the first lens includes a synthetic resin material, wherein at least one surface of an object side surface of the first lens or an image side surface of the first lens is a free curved surface lens, the free curved surface lens including a first radius of curvature for a curve in a first direction substantially perpendicular to the optical axis from a vertex through which the optical axis passes, and a second radius of curvature different from the first radius of curvature for a curve in a second direction substantially perpendicular to the optical axis from the vertex through which the optical axis passes, wherein an effective diameter of the curve in the second direction is greater than an effective diameter of the curve in the first direction, and wherein the electronic device satisfies Formula 1: $0.1<DY\_L1/F1<0.3$, wherein DY_L1 is the effective diameter of the curve in the first direction, and F1 is a focal length of the first lens.

The electronic device may satisfy Formula 2: $3<XFOV<8$, wherein XFOV is a half angle of view of the curve in the second direction.

XFOV may be equal to or greater than 6 degrees.

The second direction may be perpendicular to the first direction.

The curve in the first direction may be a curve on a tangential plane of the lens, and the curve in the second direction may be a curve on a sagittal plane of the lens, and the curve in the second direction may be perpendicular to the curve in the first direction.

The first lens may include a curve having a third radius of curvature in a third direction different from the first direction and the second direction and perpendicular to the optical axis.

The electronic device may satisfy Formula 3: $1.0<DX\_L1S1/DY\_L1S1<3.5$, wherein DX_L1S1 is the effective diameter of the curve in the second direction, and DY_L1S1 is the effective diameter of the curve in the first direction.

The first lens may have a positive refractive power.

The plurality of lenses may further include at least two lenses having a refractive power.

At least one of the plurality of lenses other than the first lens may include a synthetic resin material.

A second lens from the object side of the lens assembly may include a synthetic resin material, and the electronic device may satisfy Formula 4: $0.2<|F1/F2|<2.0$, wherein F1 is the focal length of the first lens, and F2 is a focal length of the second lens.

At least one of the plurality of lenses other than the first lens may include an aspheric surface.

The electronic device may satisfy Formula 5: $1.0<EFL/W\_Assy<2.5$, wherein EFL is a total focal length of the lens assembly, and W_Assy is a distance from the object side surface of the first lens to an image side surface of a last lens in the lens assembly, wherein the last lens is closest to the image side of the lens assembly among the plurality of lenses.

According to an aspect of the disclosure, an electronic device includes: an image sensor including an imaging plane on which an image is formed, a lens assembly including a plurality of lenses aligned along an optical axis, the lens assembly having an object side corresponding to an object being viewed and an image side corresponding to the imaging plane, wherein the plurality of lenses are sequentially arranged from the object side of the lens assembly to the image side of the lens assembly, wherein the plurality of lenses includes a first lens closest to the object side of the lens assembly among the plurality of lenses, wherein at least one surface of an object side surface of the first lens or an image side surface of the first lens is a free curved surface lens, the free curved surface lens including a first radius of curvature for a curve in a first direction substantially perpendicular to the optical axis from a vertex through which the optical axis passes, and a second radius of curvature different from the first radius of curvature for a curve in a second direction substantially perpendicular to the optical axis from the vertex through which the optical axis passes, wherein an effective diameter of the curve in the second direction is greater than an effective diameter of the curve in the first direction, and wherein the electronic device satisfies Formula 1: $0.1 < DY\_L1/F1 < 0.3$, wherein DY_L1 is the effective diameter of the curve in the first direction, and F1 is a focal length of the first lens.

The plurality of lenses may further include a second lens, a third lens, and a fourth lens sequentially arranged from the object side of the lens assembly to the image side of the lens assembly, the second lens may be on the image side of the first lens, the fourth lens may be closest to the image side of the lens assembly among the plurality of lenses, the first lens may have a positive refractive power, the second lens may have a negative refractive power, the third lens may have a negative refractive power, and the fourth lens may have a positive refractive power.

The plurality of lenses may further include a second lens, a third lens, a fourth lens, and a fifth lens sequentially arranged from the object side of the lens assembly to the image side of the lens assembly, the second lens may be on the image side of the first lens, the fifth lens may be closest to the image side of the lens assembly among the plurality of lenses, the first lens may have a positive refractive power, the second lens may have a negative refractive power, the third lens may have a negative refractive power, the fourth lens may have a positive refractive power, and the fifth lens may have a positive refractive power.

The plurality of lenses may further include a second lens, a third lens, a fourth lens, a fifth lens, and a sixth lens sequentially arranged from the object side of the lens assembly to the image side of the lens assembly, the second lens may be on the image side of the first lens, the sixth lens may be closest to the image side of the lens assembly among the plurality of lenses, the first lens may have a positive refractive power, the second lens may have a negative refractive power, the third lens may have a negative refractive power, the fourth lens may have a positive refractive power, the fifth lens may have a negative refractive power, and the sixth lens may have a positive refractive power.

The plurality of lenses may further include a second lens and a third lens sequentially arranged from object side of the lens assembly to the image side of the lens assembly, the second lens may be on the image side of the first lens, and the third lens may be closest to the image side of the lens assembly among the plurality of lenses, the first lens may have a positive refractive power, the second lens may have a negative refractive power, and the third lens may have a positive refractive power.

At least one of the plurality of lenses may include a synthetic resin material.

At least one of the plurality of lenses other than the first lens may include an aspheric surface.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1A:
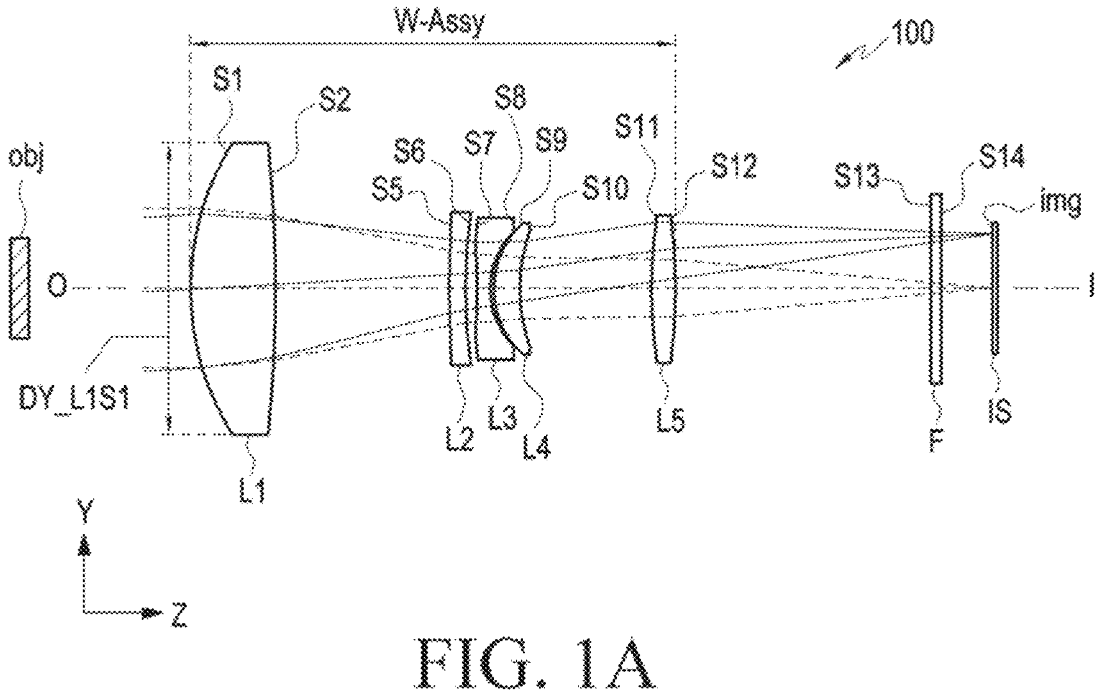
FIG. 1A is a diagram illustrating the configuration of a lens assembly according to an embodiment.

In a miniaturized electronic device such as a portable terminal, the overall length (overall length and/or height in an optical axis direction) of a lens assembly is limited, making it difficult to obtain a sufficient magnification ratio for implementing the functionality of a telephoto lens. As used herein, limiting the overall length of the lens assembly may mean, for example, limiting the number of lenses included in the lens assembly. When the number of lenses mountable in the lens assembly is limited, it may be difficult to obtain high-quality images and/or videos. It may be difficult to fabricate a lens assembly with a low F-number and a low aberration only with a limited number of lenses.

According to one or more embodiments, a lens assembly is disclosed in which the edges of lenses are D-cut to make the lens assembly mountable in a miniaturized electronic device and enable high-magnification imaging. In this case, it may be difficult to reduce the F-number of the lens assembly. Further, according to one or more embodiments, a lens assembly using anamorphic lenses to reduce distortion while achieving high magnification is also disclosed. In this case, the lens assembly may have the disadvantage of using a large number of lenses (e.g., seven or more lenses) to maintain high image quality, which may be difficult to meet the miniaturization of an electronic device and increase manufacturing cost.

An embodiment of the disclosure, may provide a low-cost, high-magnification lens assembly mountable in a miniaturized electronic device such as a portable terminal, and/or an electronic device including the same.

An embodiment of the disclosure will be described below with reference to the accompanying drawings.

An electronic device according to an embodiment of the disclosure may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device. The wearable device may include at least one of an accessory type (e.g., a watch, a ring, a bracelet, an anklet, a necklace, eyeglasses, contact lenses, or a head-mounted-device (HMD)), a fabric or clothing-integrated type (e.g., electronic clothing), a body-attached type (e.g., a skin pad or a tattoo), or bio-implantable circuitry. In one or more embodiments, the electronic device may include at least one of, for example, a television, a digital video disk (DVD) player, an audio device, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic photo frame.

According to an embodiment, the electronic device may include various medical devices (e.g., various portable medical devices (e.g., a glucose meter, a heart rate monitor, a blood pressure monitor, or a body temperature monitor), a magnetic resonance angiography (MRA), a magnetic resonance imaging (MRI), a computed tomography (CT), an imaging device, or an ultrasound device), a navigation device, a global navigation a satellite system (GNSS), an event data recorder (EDR), a flight data recorder (FDR), an automotive infotainment device, marine electronic equipment (e.g., marine navigation equipment, a gyrocompass, or the like), avionics, a security device, an automotive head unit, an industrial or domestic robot, a drone, an ATM at a financial institution, a point of sales at a store, or an Internet of things (IoT) device (e.g., a light bulb, various sensors, a sprinkler system, a smoke alarm, a thermostat, a streetlight, a toaster, exercise equipment, a hot water tank, a heater, a boiler, and so on). According to one or more embodiments, the electronic device may include at least one of part of furniture, a building/structure, or an automobile, an electronic board, an electronic signature receiving device, a projector, or various meters (e.g., a water, electricity, gas, or radio wave meter). In various embodiments, the electronic device may be flexible, or a combination of two or more of the various devices described above. The electronic device according to various embodiments of the disclosure is not limited to the devices described above. In various embodiments of the disclosure, the term user may refer to a person using an electronic device or a device (e.g., an artificial intelligence electronic device) using an electronic device. The electronic device according to an embodiment of the disclosure is not limited to the devices described above.

According to an embodiment, a representative example of the electronic device may include an optical device (e.g., a camera module), and the following description may be based on the assumption that a lens assembly is mounted in an optical device, as an embodiment.

In describing an embodiment of the disclosure, some numerical values and the like may be presented, but it should be noted that these numerical values do not limit the embodiment of the disclosure, unless stated in the claims.

Figure 1B:
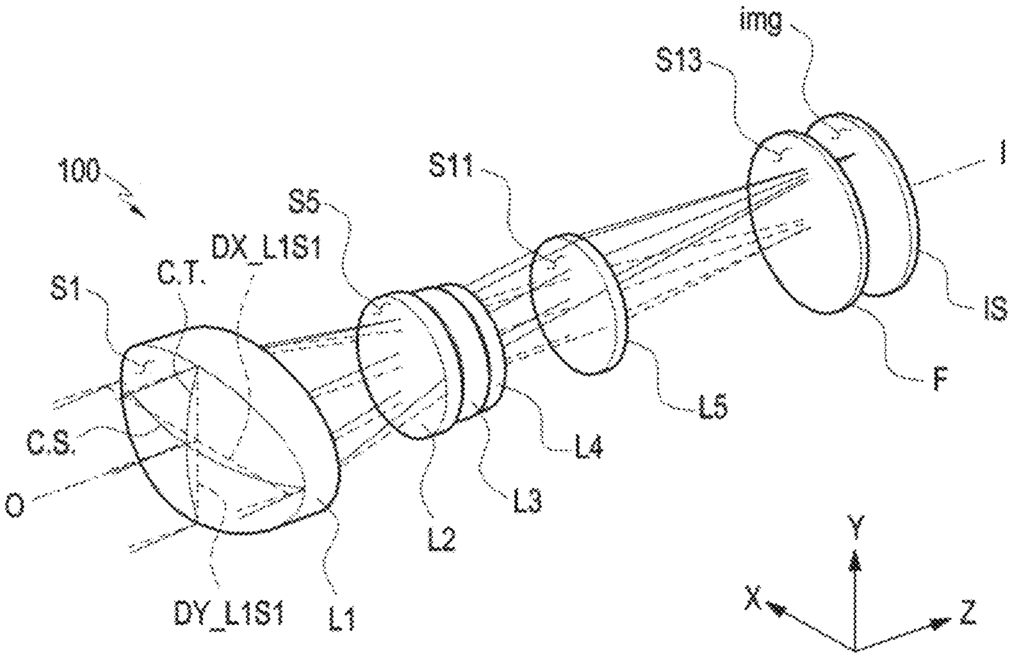
FIG. 1B is an exploded perspective view illustrating the lens assembly of FIG. 1A.
Figure 1C:
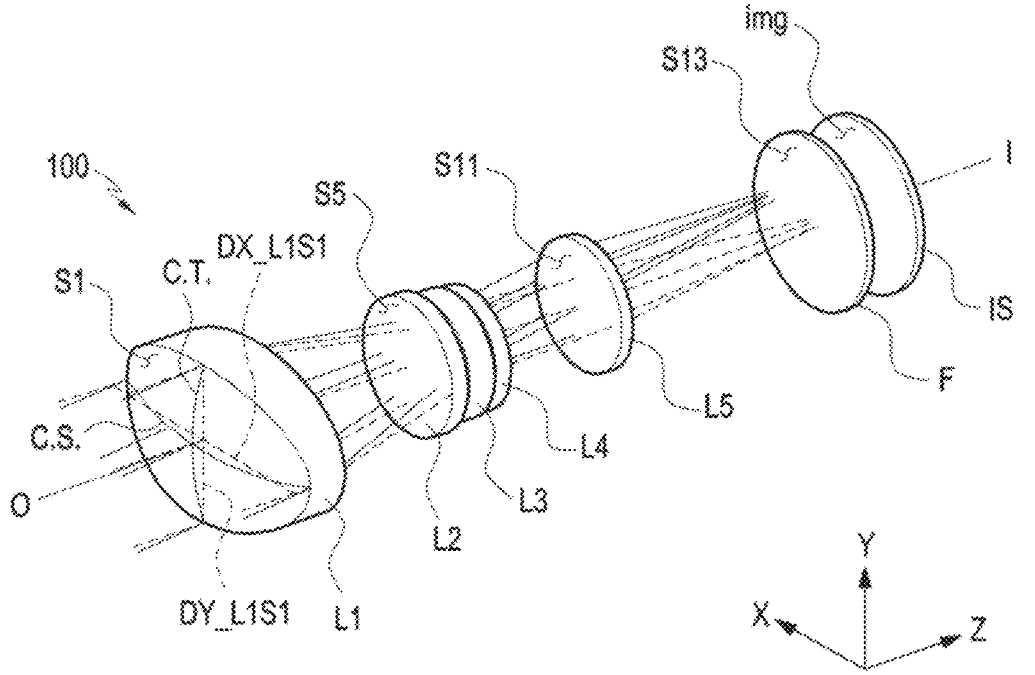
FIG. 1C is an exploded perspective view illustrating the lens assembly of FIG. 1A, in which an image is formed in a direction different from that in FIG. 1B.

FIG. 1A is a block diagram illustrating a lens assembly 100 according to an embodiment. FIG. 1B is an exploded perspective view illustrating the lens assembly 100 of FIG. 1A. FIG. 1C is an exploded perspective view illustrating the lens assembly 100 of FIG. 1A, in which an image is formed in a different direction from that in FIG. 1B. FIG. 1B may illustrate that an image is formed in a first direction substantially perpendicular to an optical axis O-I (e.g., in a direction parallel to a Y axis), while FIG. 1C may illustrate that an image is formed in a second direction substantially perpendicular to the optical axis O-I (e.g., in a direction parallel to an X axis). In FIG. 1B, it is shown that some light rays (indicated by dotted lines) are focused at the center of an image sensor IS, and other light rays (indicated by solid lines) are focused at a position spaced a predetermined distance from the center of the image sensor IS in the first direction (e.g., the direction parallel to the Y axis). In FIG. 1C, it is shown that some light rays (indicated by dotted lines) are focused at the center of the image sensor IS, and other light rays (indicated by solid lines) are focused at a position spaced a predetermined distance from the center of the image sensor IS in the second direction (e.g., the direction parallel to the X axis). According to the disclosure, although the embodiments of FIGS. 1B and 1C are taken as examples in describing a method in which light passing through the lens assembly 100 including a free curved surface lens (or asymmetric lens) forms an image on the image sensor IS, the disclosure is not necessarily limited to the embodiments, and various other embodiments are available. According to an embodiment, some light rays (indicated by dotted lines) in FIGS. 1A to 1C may represent light rays which are incident at an infinite distance from the lens assembly 100 and focused on an imaging plane, which may indicate the position of an aperture (or the diameter of an entrance pupil). Some other light rays (indicated by solid lines) in FIGS. 1A to 1C may represent light rays incident at an angle onto the lens assembly 100.

Referring to FIGS. 1A to 1C, the lens assembly 100 according to one of embodiments of the disclosure may include a plurality of lenses (e.g., L1, L2, L3, L4, and L5) and the image sensor IS.

Referring to FIGS. 1A to 1C, the lens assembly 100 according to one of embodiments of the disclosure may include the plurality of lenses (e.g., L1, L2, L3, L4, and L5). According to an embodiment, the image sensor IS may be located in at least a portion of an electronic device. The lens assembly 100 including the plurality of lenses (e.g., L1, L2, L3, L4, and L5) may be mounted in an optical device with the image sensor IS mounted therein and/or in the electronic device, thereby forming an optical system. The optical device may include, for example, a camera, and the following description may be based on the assumption that the lens assembly 100 is located in the optical device. Further, the optical device may be understood as further including a housing that protects internal components and forms the appearance thereof, together with the optical system.

According to an embodiment, the image sensor IS, which is a sensor mounted on a circuit board or the like and disposed in alignment with the optical axis O-I, may be responsive to light. The image sensor IS may include, for example, a sensor such as a complementary metal-oxide semiconductor (CMOS) image sensor or a charge coupled device (CCD). The image sensor IS may include, but not limited to, for example, various elements that convert an image of an object into an electrical image signal. The image sensor IS may obtain the image of the object by detecting contrast information, contrast ratio information, color information, and so on about the object from light passing through the plurality of lenses (e.g., L1, L2, L3, L4, and L5). According to an embodiment, the image sensor IS is shown as having a circular shape in one or more embodiments of the disclosure including FIG. 1B, to which the disclosure is not necessarily limited. For example, although a circular image may be formed on an imaging plane img of the image sensor IS, the image sensor IS itself may be formed in a shape other than circle. For example, an image sensor IS with an aspect ratio of 4:3 may be applied. Further, as described later, when a first lens included in the lens assembly has, as a short side, an effective diameter in the first direction substantially perpendicular to the optical axis and as a long side, an effective diameter in the second direction substantially perpendicular to the optical axis, the image sensor IS may also correspondingly have a length in the first direction (e.g., a longitudinal length) as a short side and a length in the second direction (e.g., a transverse length) as a long side.

According to an embodiment of the disclosure, at least one of the plurality of lenses (e.g., L1, L2, L3, L4, and L5) included in the lens assembly 100 may be formed of a synthetic resin (e.g., plastic) material. At least one of the plurality of lenses (e.g., L1, L2, L3, L4, and L5) included in the lens assembly 100 may be implemented as a lens formed of a synthetic resin (e.g., plastic) having a predetermined refractive index. According to an embodiment, there may be a high degree of design freedom in terms of size and shape by fabricating a plurality of lenses of a synthetic resin material. According to an embodiment, the first lens from an object side may include a synthetic resin material. Further, at least one of a plurality of lenses including the second lens from the object side to the lens closest to an image side may include a synthetic resin material. Referring to FIG. 1A as an example, the first lens (hereinafter, referred to as a first lens L1) from the object side may be formed of a plastic material, and at least one of the second lens (hereinafter, referred to as a second lens L2), the third lens (hereinafter, referred to as a third lens L3), the fourth lens (hereinafter, referred to as a fourth lens L4), or the fifth lens (hereinafter, referred to as a fifth lens L5) from the object side may also be formed of a plastic material. In other words, in one or more embodiments, all of the five lenses included in the lens assembly 100 may be formed as plastic lenses. As such, formation of the lens assembly 100 of a synthetic resin material may be advantageous for the light weight and miniaturization of the electronic device in which the lens assembly 100 is mounted. The first lens from the object side may be implemented as an asymmetric lens so that the lens assembly 100 according to an embodiment of the disclosure is mountable in a miniaturized electronic device and capable of high-magnification imaging. As the first lens from the object side is configured as an asymmetric lens, the lens assembly 100 may realize high magnification with a small number of lenses.

According to an embodiment, the lens assembly 100 may be disposed on the optical axis O-I passing through the centers of the plurality of lenses from an object side (external object side) O to an image side I. In describing the configuration of each lens below, for example, the object side may refer to a direction in which the object is located, and the image side may refer to a direction in which the image plane img on which an image is formed is located. Further, an "object side surface" of a lens may refer to, for example, a surface on a side where the object obj is located with respect to the optical axis O-I, which is a left surface (or front surface) of the lens in the drawings of the disclosure, and an "image side surface" of the lens may refer to a surface on a side where the image plane img is located with respect to the optical axis O-I, which is a right surface (or rear surface) of the lens in the drawings of the disclosure. The imaging plane img may be, for example, a portion in which an imaging element or the image sensor IS is disposed and thus an image is formed.

In describing the plurality of lenses (e.g., L1, L2, L3, L4, and L5) according to an embodiment, a portion of each lens closer to the optical axis O-I may be referred to as a "chief portion", and a portion of the lens farther from the optical axis O-I (or closer to an edge of the lens) may be referred to as a "marginal portion". The chief portion may be, for example, a portion that intersects the optical axis O-I in a certain lens (e.g., the first lens L1). The marginal portion may be, for example, a portion of the lens (e.g., the first lens L1) spaced apart from the optical axis by a predetermined distance. The marginal portion may include, for example, an end portion of the lens farthest from the optical axis O-I of the lens. Further, according to an embodiment of the disclosure, light passing through the chief portion or a portion close to the chief portion may be referred to as paraxial light, and light passing through the marginal portion may be referred to as marginal light.

According to an embodiment, the radius of curvature, thicknesses, total length from image plane (TTL), focal length, and so on of a lens of the disclosure may all be in units of mm, unless otherwise specified. Further, the thickness of a lens, the spacing between lenses, and a TTL may be distances measured with respect to the optical axis of the lenses. Further, in describing the shape of a lens, when it is said that one surface of the lens has a convex shape, this may mean that an optical-axis portion of the surface is convex, and when it is said that one surface of the lens has a concave shape, this may mean that the optical-axis portion of the surface is concave. Accordingly, even if one surface (the optical-axis portion of the surface) of a lens is described as having a convex shape, an edge portion of the lens (a portion spaced apart from the optical-axis portion of the surface by a predetermined distance) may be concave. Similarly, even if one surface (the optical-axis portion of the surface) of a lens is described as having a concave shape, an edge portion of the lens (a portion spaced apart from the optical-axis portion of the surface by a predetermined distance) may be convex. In the following detailed description and the claims, an inflection point may refer to a point where a radius of curvature changes in a portion that does not intersect the optical axis.

The lens assembly 100 according to an embodiment of the disclosure may include at least three lenses. The lens assembly 100 according to an embodiment may include five lenses as a plurality of lenses (e.g., L1, L2, L3, L4, and L5) arranged sequentially in a direction of the optical axis O-I (e.g., a direction from the object side O to the image side I in FIGS. 1A to 1C), for example, referring to FIGS. 1A to 1C. Embodiments including five lenses are disclosed below with reference to embodiments of FIGS. 4A, 4B, 7A, and 7B. In another example, embodiments of FIGS. 10A, 10B, 13A, 13B, 16A, 16B, 19A, and 19B below may include six lenses as a plurality of lenses (e.g., L1, L2, L3, L4, and L5, L6) arranged sequentially in the direction of the optical axis O-I (e.g., the direction from the object side O to the image side I in FIG. 1). For example, in the case of a lens assembly 100 having six lenses, the six lenses may be referred to as a first lens L1, a second lens L2, a third lens L3, a fourth lens L4, a fifth lens L5, and a sixth lens L6, sequentially from the object side O. The plurality of lenses (e.g., L1, L2, L3, L4, L5, and L6) may be disposed in alignment with the image sensor IS on the optical axis O-I.

According to an embodiment, the first lens L1 included in the lens assembly 100 may have a positive refractive power. When light substantially parallel to the optical axis O-I is incident on the lens having the positive refractive power, the light passing through the lens may be focused. For example, the lens with the positive refractive power may be a lens based on the principle of a convex lens. On the other hand, when parallel light is incident on a lens with a negative refractive power, the light passing through the lens may be dispersed. For example, the lens with the negative refractive power may be a lens based on the principle of a concave lens. For example, in the lens assembly including five lenses, the second lens L2 and the third lens L3 may have a negative refractive power, while the fourth lens L4 and the fifth lens 5 may have a positive refractive power. However, this is only an embodiment and other embodiments are also available.

According to an embodiment, a surface of at least one of the plurality of lenses (e.g., L1, L2, L3, L4, and L5) may be formed to be aspheric. According to an embodiment, the first lens L1 may be implemented as an asymmetric lens, and spherical aberration that may occur in the lens may be avoided by forming a surface of at least one of the remaining lenses of the plurality of lenses (e.g., L1, L2, L3, L4, and L5) other than the first lens L1 as an aspheric surface. For example, in the embodiment of FIGS. 1A to 1C, an object side surface S5 of the second lens L2, an object side surface S7 of the third lens L3, an image side surface S10 of the fourth lens L4, and an image side surface S12 of the fifth lens L5 may be formed to be aspheric. Accordingly, it is possible to prevent coma from occurring at the marginal portions of the image sensor IS, to facilitate astigmatism control, and to reduce field curvature from the chief portion to the marginal portions of the imaging plane img of the image sensor.

According to one or more embodiments, the lens assembly 100 may include at least one aperture stop. The amount of light reaching the imaging plane img of the image sensor IS may be adjusted by adjusting the size of the aperture stop. The aperture stop may be disposed on an object side surface S1 of the first lens L1 according to an embodiment, to which the disclosure is not necessarily limited. According to an embodiment, the aperture stop may also be formed as an asymmetric opening corresponding to the shape of the first lens L1.

According to an embodiment, the lens assembly 100 may further include a filter F disposed between the last lens from the object side (e.g., the fifth lens L5 in the embodiments of FIGS. 1A to 1C) and the image sensor IS. The filter F may block light, for example, infrared light, which is detected by a film of the optical device or the image sensor. The filter F may include at least one of, for example, a low pass filter or a cover glass. For example, when the filter F is mounted, it may make the color of an image, such as an image detected and captured through the image sensor IS, closer to a color perceived by the human eye, when an actual object is viewed. Further, the filter F may allow visible light to be transmitted and infrared light to be emitted to the outside, thereby preventing the infrared light from being transmitted to the image plane img of the image sensor.

The lens assembly 100 according to an embodiment of the disclosure may include at least three lenses (e.g., five lenses including the first lens L1, the second lens L2, the third lens L3, the fourth lens L4, and the fifth lens L5, as illustrated in FIGS. 1A to 1C), wherein the first lens L1, which is the first lens from the object side O, is a free curved surface lens, thereby realizing a high-magnification telephoto lens.

In the disclosure, forming the first lens L1 as a free curved surface lens may imply that at least one of the object side surface S1 or image side surface S2 of the first lens L1 is formed such that a curve from a vertex through which the optical axis passes in the first direction (or tangential plane) substantially perpendicular to the optical axis has a first radius of curvature, a curve from the vertex through which the optical axis passes in the second direction (or sagittal plane) substantially perpendicular to the optical axis has a second radius of curvature different from the first radius of curvature. Further, according to an embodiment of the disclosure, the lens assembly 100 may include the first lens L1 formed as a free curved surface lens, wherein an effective diameter of the lens from the vertex of the lens through which the optical axis passes in the first direction substantially perpendicular to the optical axis is different from an effective diameter of the lens in the second direction substantially perpendicular to the optical axis. As used herein, an "effective diameter" may mean the distance between one end portion and the other end portion of a lens in a direction substantially perpendicular to the optical axis O-I.

The first direction and the second direction may be orthogonal to each other, and the optical axis, the first direction, and the second direction may correspond to the Z axis, the Y axis, and the X axis in the spatial coordinate system illustrated in FIGS. 1A to 1C, respectively. Further, the effective diameter of a lens in the first direction may correspond to an effective diameter of a curve of tangential plane (or meridional plane) (C.T.) of the lens, and the effective diameter of the lens in the second direction may correspond to an effective diameter of a curve of sagittal plane (C.S.) of the lens. According to an embodiment of the disclosure, the effective diameter on the sagittal plane of the first lens (e.g., the first lens L1) from the object side O is formed to be different from the effective diameter on the tangential plane of the first lens from the object side O, and according to an embodiment, the effective diameter on the sagittal plane may be greater than the effective diameter on the tangential plane. When viewed from the direction of the optical axis, the asymmetric lens may be formed as an ellipsis having a side drawn toward both ends on the tangential plane as a short side and a side drawn toward both ends on the sagittal plane as a long side.

According to an embodiment, the free curved surface lens of the disclosure may be a lens having different radii of curvature and/or effective diameters in the first and second directions and a third direction. The third direction may mean a direction substantially perpendicular to the optical axis and different from the first direction and the second direction. The third direction may refer to any direction on an XY plane in the spatial coordinate system illustrated in FIGS. 1A to 1C. According to an embodiment, the free curved surface lens may also be referred to as an "asymmetric lens" in the sense of having different effective diameters of curves located in different directions with respect to the optical axis.

According to an embodiment of the disclosure, the lens assembly 100 may be mountable as a high-definition telephoto lens in a miniaturized electronic device by satisfying the following: Formula 1, Formula 2, and Formula 3.

$$0.1 < DY\_L1/F1 < 0.3 \quad \text{Formula 1}$$

$$3 < XFOV < 8 \quad \text{Formula 2}$$

$$1.0 < DX\_L1S1/DY\_L1S1 < 3.5 \quad \text{Formula 3}$$

DY_L1 in Formula 1 may represent the effective diameter of a curve in the first direction (or on the tangential plane) of the first lens from the object side, and F1 may represent the focal length of the first lens from the object side in the lens assembly. XFOV in Formula 2 may represent a half angle of view in the second direction (or on the sagittal plane) of the entire optical system including the lens assembly, and DX_L1S1 in Formula 3 may represent the effective diameter of the object side surface S1 of the first lens L1 in the second direction (or on the sagittal plane), DY_L1S1 may represent the effective diameter of the object side surface S1 of the first lens L1 in the first direction (or on the tangential plane). When DY_L1/F1 is less than a lower limit in Formula 1, it may be difficult to configure a bright lens due to a long focal length or a low brightness, and when DY_L1/F1 is greater than an upper limit in Formula 1, it may be difficult to control spherical aberration because an excessive amount of light is incident. When XFOV is less than a lower limit in Formula 2, the focal length may be too long, or the assembly may be oversized due to the need for a large number of lenses. The upper limit of XFOV in Formula 2 may be a value for configuring a telephoto lens. When DX_L1S1/DY_L1S1 is less than a lower limit in Formula 3, the amount of light incident on the entire lens assembly may be reduced, and thus it may be difficult to obtain an image of a desired brightness (i.e., Fno of the lens assembly increases). When DX_L1S1/DY_L1S1 is greater than an upper limit in Formula 3, it may be difficult to control aberration in the second direction (or the direction of the sagittal plane), thereby degrading image quality.

Further, the lens assembly 100 may satisfy the following: Formula 4 and Formula 5.

$$0.2 < |F1/F2| < 2.0 \quad \text{Formula 4}$$

$$1.0 < EFL/\text{W\_Assy} < 2.5 \quad \text{Formula 5}$$

In Formula 4, F1 may represent the focal length of the first lens L1 from the object side O, and F2 may represent the focal length of the second lens L2 from the object side O. In Formula 5, effective focal length (EFL) may represent a total effective focal length of the lens assembly, and W_Assy may represent the distance from the object side surface of the first lens to the image side surface of the last lens in the lens assembly. For example, referring to FIGS. 1A to 1C, W_Assy may be the distance from the object side surface S1 of the first lens L1 to the image side surface S12 of the fifth lens L5. In the case of a high-magnification lens, the total EFL is formed to be greater (e.g., 25 mm or more) than that of a typical lens (e.g., a wide-angle lens). When the absolute value of F1/F2 is less than a lower limit in Formula 4 under this condition, this means that the first lens L1 is implemented as a sensitive lens with an excessively short focal length relative to the focal length of the second lens L2. In this case, it may be difficult to shape and manufacture the first lens L1. Moreover, when the length of the first lens L1 is small in the high-magnification lens, the sensitivity of the lens increases, which may make it difficult to control aberration. On contrary, when the absolute value of F1/F2 is greater than an upper limit in Formula 4, the focal length of the first lens L1 is excessively large relative to the focal length of the second lens L2, which may make it difficult to control the aberration of the first lens L1. Further, in the case of a value less than a lower limit in Formula 5, the size of the entire lens assembly may also be excessively large, making it difficult to miniaturize the lens assembly, and in the case of a value greater than an upper limit, the sensitivity of the lenses may increase, causing manufacturing difficulties.

The lens assembly 100 according to the embodiments illustrated in FIGS. 1A to 1C may include the first lens L1 having a positive refractive power, the second lens L2 having a negative refractive power, the third lens L3 having a negative refractive power, the fourth lens L4 having a positive refractive power, and the fifth lens L5 having a positive refractive power.

The electronic device may further include an optical member that directs externally incident light toward the first lens L1 and/or the image sensor IS by refracting or reflecting the light. As the electronic device further includes the optical member in the lens assembly 100, a folded optical system may be implemented. For example, when the optical member is further included between the object and the lens assembly 100 and/or between the lens assembly 100 and the image sensor IS, an image of the object may be refracted or reflected by the optical member and then incident on the lens assembly 100. The optical member may include a mirror or a prism having a triangular cross-section. Alternatively, the optical member may include a wedge-shaped prism or a prism that may be changed to a wedge shape. As the optical member is included, the direction of the angle of view of the lens assembly may be changed. According to an embodiment, when a high-performance, large-sized image sensor IS is included, the quality of a captured image may be improved in the electronic device. However, as the image sensor IS increases in size, it may be difficult to mount the lens assembly 100 in a slimmed-down electronic device. For example, the thickness of the electronic device may increase due to the length or width of the image sensor IS. Accordingly, according to an embodiment, the lens assembly 100 may ensure design freedom in a direction in which the lenses L1, L2, L3, L4, and L5 are arranged or a direction in which the image sensor IS is disposed by including at least one optical member. Therefore, even when the image sensor IS is large, the lens assembly 100 may be mounted in a miniaturized and/or slimmed-down electronic device.

Table 1 below lists various lens data of the lens assembly 100 illustrated in FIGS. 1A to 1C, wherein "obj" may represent an object, radius may represent a radius of curvature of a lens, thickness may represent the thickness or air gap of a lens, focal length may represent the focal length of an EFL lens, nd may represent the refractive index of a medium (e.g., a lens), and vd may represent an abbe's number of a lens. Regarding thickness, a thickness written for the object side surface (e.g., S1) of a lens (e.g., the first lens L1) may mean the thickness of the lens, and a thickness written for the image side surface (e.g., S2) of the lens (e.g., the first lens L1) may refer to an air gap from the lens to a lens (e.g., the second lens L2) located behind the lens in the direction of the optical axis. "S1 to S14" may refer to the object side surfaces or image side surfaces of the plurality of lenses (e.g., L1, L2, L3, L4, and L5). Herein, "S3" and "S4", which are not actual lens surfaces, but rather locations considered in the design of the lens assembly 100, may be, for example, data for indicating the air gap from the image side surface S2 of the first lens L1 to the second lens L2. In summary, referring to Table 1 below, the thickness of the first lens L1 may correspond to the value of thickness for S1 in the table below, and the air gap from the image side surface S2 of the first lens L1 to the second lens L2 may correspond to the sum of the thicknesses of S2, S3, and S4 in the table below. The position of the aperture stop may be the same as the position of the object side surface S1 of the first lens L1 in the lens assembly 100. "S13" and "S14" may refer to the object side surface and image side surface of the IR cut filter F, respectively. Further, assignment of "*" together with reference symbols denoting surfaces of a plurality of lenses may mean that the surfaces of the lenses are formed to be aspheric. For example, in the lens assembly 100 of the embodiments of FIGS. 1A to 1C, the object side surface S5 of the second lens L2, the object side surface S7 of the third lens L3, the image side surface S10 of the fourth lens L4, and the image side surface S12 of the fifth lens L5 may be formed to be aspheric.

The lens assembly 100 included in Table 1 below may relate to a telephoto lens having an angle of view ANG of 16 degrees or less (a half angle of view XFOV of 8 degrees or less). Further, when the total EFL is 27.3 mm, the Fno is approximately 4.1, and an optical total length from image plane (OTTL) is 25.000 mm, the lens assembly 100 included in Table 1 below may satisfy the above-described conditions (and/or at least one of the above-described formulas). In the following Table 1, the radii of curvature of the object side surface S1 and image side surface S2 of the first lens L1 may be represented by "L1S1" and "L1S2", respectively. "L1S1" and "L1S2" will be described in more detail using a separate diagram (e.g., separately in Table 3 below).

TABLE 1

| surface | radius | Thickness (air gap) | EFL | nd | Vd |
|---|---|---|---|---|---|
| obj | infinity | infinity | | | |
| S1(sto) | L1S1 | 2.70000 | X: 13.053<br>Y: 13.059 | 1.54410 | 56.09 |
| S2 | L1S2 | 0.94121 | | | |
| S3 | infinity | 4.13790 | | | |
| S4 | infinity | 0.37491 | | | |
| S5* | 120.39448 | 0.44000 | -27.546 | 1.65388 | 20.65 |
| S6 | 15.79959 | 0.34750 | | | |
| S7* | −95.02486 | 0.44000 | −4.027 | 1.63254 | 23.1 |
| S8 | 2.64942 | 0.10056 | | | |
| S9 | 2.76231 | 0.80000 | 8.344 | 1.53120 | 56.5 |
| S10* | 6.54779 | 4.13656 | | | |
| S11 | 16.53700 | 0.71521 | 12.170 | 1.68035 | 18.4 |
| S12* | −16.70998 | 7.97975 | | | |
| S13 | infinity | 0.30000 | infinity | 1.51680 | 64.17 |
| S14 | infinity | | | | |
| img | infinity | | | | 55.93 |

Table 2 below lists the aspheric coefficients of the remaining lenses (e.g., L2, L3, L4, and L5) except the first lens L1 among the plurality of lenses (e.g., L1, L2, L3, L4, and L5). The aspheric coefficients may be calculated through the following Formula 6.

Formula 6

$$z = \frac{c'y^2}{1+\sqrt{1-(K+1)c'^2y^2}} + Ay^4 + By^6 + Cy^8 + Dy^{10} + Ey^{12} + Fy^{14} + Gy^{16} + Hy^{18} + Iy^{20}$$

Herein, "z" may represent a distance sag in the direction of the optical axis O-I from the vertex of the lens, "c" may represent the reciprocal of a radius of curvature at the vertex of the lens, "y" may represent a distance in a direction perpendicular to the optical axis, "K" may represent a Conic constant, and "A", "B", "C", "D", "E", "F", "G", "H", and "I" may represent aspheric coefficients. In the numerical values of Table 2 below, "E and a number following it" may represent a power of 10. For example, E+01 may represent $10^1$ and E-02 may represent $10^{-2}$.

TABLE 2

| | S5 | S7 | S10 | S12 |
|---|---|---|---|---|
| Radius | 1.20395E+02 | −9.50249E+01 | 6.54779E+00 | −1.67100E+01 |
| K(conic) | 1.00000E+00 | −1.00000E+00 | −1.00000E+00 | −1.00000E+00 |
| $A(4^{th})$ | 4.48731E−04 | −9.10238E−04 | −6.34333E−04 | −1.92270E−04 |
| $B(6^{th})$ | 2.92206E−04 | −1.07759E−04 | 1.18814E−04 | 3.38142E−05 |
| $C(8^{th})$ | −8.86285E−05 | −1.33232E−05 | −9.23015E−05 | 3.41543E−06 |
| $D(10^{th})$ | 1.68481E−05 | 2.86597E−05 | 4.72920E−05 | −4.69647E−06 |
| $E(12^{th})$ | −2.69809E−06 | 3.85680E−07 | 4.13841E−07 | 1.01551E−06 |
| $F(14^{th})$ | 0.00000E+00 | 6.25511E−09 | 6.50231E−08 | −7.17961E−08 |
| $G(16^{th})$ | 0.00000E+00 | 0.00000E+00 | 0.00000E+00 | 4.34044E−09 |
| $H(18^{th})$ | 0.00000E+00 | 0.00000E+00 | 0.00000E+00 | −6.88383E−10 |
| $I(20^{th})$ | 0.00000E+00 | 0.00000E+00 | 0.00000E+00 | 0.00000E+00 |

Table 3 below lists data such as curvatures, radii of curvature, and aspheric coefficients of the object side surface S1 and image side surface S2 of the first lens L1 among the plurality of lenses (e.g., L1, L2, L3, L4, and L5). In the disclosure, the definition of an aspheric lens may be given by Formula 7.

Formula 7

$$z = \frac{(CUX)X^2 + (CUY)Y^2}{1+\sqrt{1-(KX+1)(CUX)^2X^2-(KY+1)(CUY)^2Y^2}} + AR\{(1-AP)X^2+(A+AP)Y^2\}^2 + BR\{(1-BP)X^2+(1+BP)Y^2\}^3 + CR\{(1-CP)X^2+(1+CP)Y^2\}^4 + DR\{(1-DP)X^2+(1+DP)Y^2\}^4$$

Herein, "z" may represent a distance sag from the vertex of a lens in the direction of the optical axis O-I, "y" may represent a distance in the first direction substantially perpendicular to the optical axis (e.g., a direction on the tangential plane), "x" may represent a distance in the second direction substantially perpendicular to the optical axis (e.g., a direction on the sagittal plane), "CUX" may represent the reciprocal of a radius of curvature in the second direction at the vertex of the lens, "CUY" may represent the reciprocal of a radius of curvature in the first direction at the vertex of the lens, KX and KY may represent CONIC constants in the second and first directions, respectively, AR, BR, CR, and DR may represent symmetric aspheric coefficients, and AP, BP, CP, and DP may represent asymmetric aspheric coefficients, respectively.

TABLE 3

| L1S1 | | L1S2 | |
|---|---|---|---|
| X Curvature | 0.120227888 | X Curvature | −0.022567085 |
| X Radius | 8.317537791 | X Radius | −44.31232436 |
| Y Curvature | 0.120694414 | Y Curvature | −0.021973449 |
| Y Radius | 8.285387609 | Y Radius | −45.50946816 |
| Y Conic Constant (KY) | −1 | Y Conic Constant (KY) | 78.05666271 |
| (AR) | 9.01E−05 | (AR) | 0.000104468 |
| (BR) | 1.71E−06 | (BR) | 5.14E−06 |
| (CR) | 1.49E−08 | (CR) | −1.01E−11 |
| (DR) | 1.19E−11 | (DR) | −4.61E−09 |
| X Conic Constant (KX) | −1 | X Conic Constant (KX) | 29.91548164 |
| (AP) | −0.060096235 | (AP) | 0.04587632 |
| (BP) | 0.316811618 | (BP) | 0.298341247 |
| (CP) | −0.074231418 | (CP) | −1.360533275 |
| (DP) | −0.454113867 | (DP) | 0.367082757 |

Figure 2A:
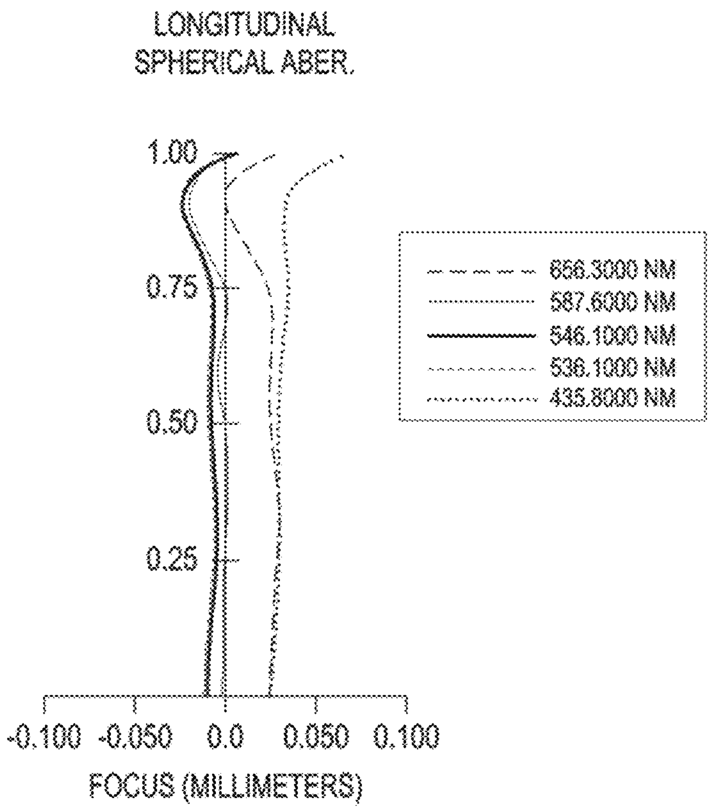
FIG. 2A is a graph illustrating spherical aberration of a lens assembly according to an embodiment.
Figure 2B:
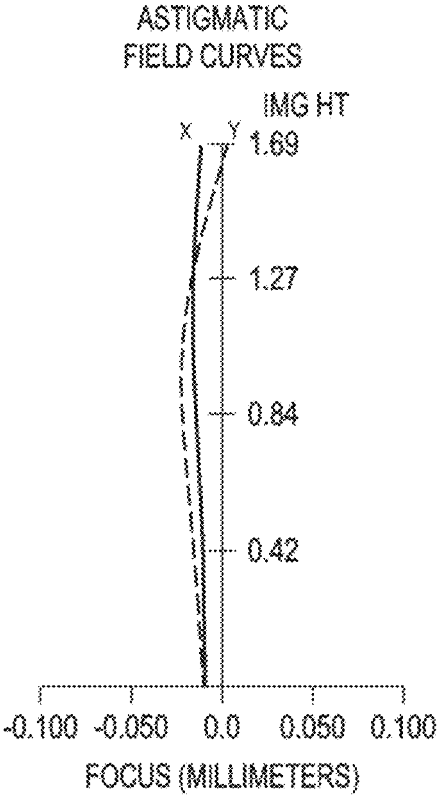
FIG. 2B is a graph illustrating astigmatism of a lens assembly according to an embodiment.
Figure 2C:
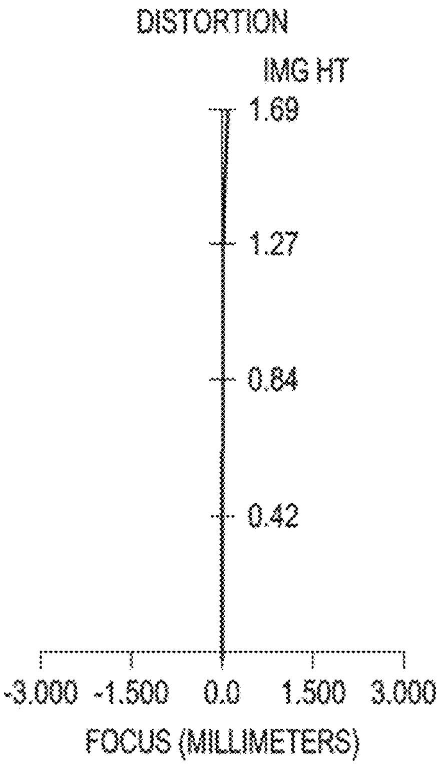
FIG. 2C is a graph illustrating distortion of a lens assembly according to an embodiment.

FIG. 2A is a graph illustrating spherical aberration of the lens assembly 100 according to an embodiment of the disclosure (e.g., the embodiment of FIG. 1B). Spherical aberration may be a phenomenon in which light passing through different portions (e.g., a chief portion and marginal portions) of a lens is focused at different positions. In FIG. 2A, a horizontal axis represents degrees of longitudinal spherical aberration, a vertical axis represents normalized distances from the center of the optical axis, and variations of the longitudinal spherical aberration according to wavelengths of light may be shown. Longitudinal spherical aberration may be plotted, for example, for light having a wavelength of about 656.3000 nanometers (nm), about 587.6000 nm, about 546.1000 nm, about 536.1000 nm, and about 435.8000 nm, respectively. Referring to FIG. 2A, it may be noted that the lens assembly according to an embodiment of the disclosure exhibits stable optical characteristics because its longitudinal spherical aberration in the visible band is limited to within approximately +0.050 to −0.050, except for light with a wavelength of 435.8000 nm. FIG. 2B is a graph illustrating astigmatism of the lens assembly 100 according to one (e.g., the embodiment of FIG. 1B) of embodiments of the disclosure. Astigmatism may be mismatch between the focus of light passing in a vertical direction and the focus of light passing in a horizontal direction, when the tangential or meridian plane and sagittal plane of a lens have different radii. The tangential plane may be a plane including a curve on the lens, located in the first direction substantially perpendicular to the optical axis from the vertex of the lens, and the sagittal plane may be a plane including a curve on the lens, located in the second direction substantially perpendicular to the optical axis from the vertex of the lens. In FIG. 2B and FIG. 2C below, a vertical axis IMG HT may represent image heights. An image height may refer to a maximum distance from the optical axis O-I to an edge of the image plane img of the image sensor IS (a half of the diagonal length of the image plane img).

In FIG. 2B, the astigmatism of the lens assembly 100 results from a wavelength of approximately 546.1000 nm, a dotted line Y may represent astigmatism in the direction of the tangential plane (e.g., tangential-plane curvature), and a solid line X may represent astigmatism in the direction of the sagittal plane (e.g., sagittal-plane curvature). As noted from FIG. 2B, the astigmatism according to an embodiment of the disclosure is limited to within approximately +0.050 to −0.050, indicating stable optical characteristics.

FIG. 2C is a graph illustrating distortion of the lens assembly 100 according to one (e.g., the embodiment of FIG. 1B) of embodiments of the disclosure. The distortion is caused by an optical magnification varying with a distance from the optical axis O-I, such that an image formed on an actual imaging plane (e.g., the imaging plane img in FIG. 1A) may appear larger or smaller than an image formed on a theoretical imaging plane.

In FIG. 2C, the distortion of the lens assembly 100 is a result obtained at a wavelength of approximately 546.1000 nm, and an image captured through the lens assembly 100 may be distorted at a point (e.g., a marginal portion) which deviates from the optical axis O-I. However, the distortion is at a level that may generally occurs in optical devices using lenses, and the lens assembly 100 according to one (e.g., the embodiment in FIG. 1B) of embodiments of the disclosure has a distortion rate less than approximately 1.50%, providing good optical characteristics.

Figure 3A:
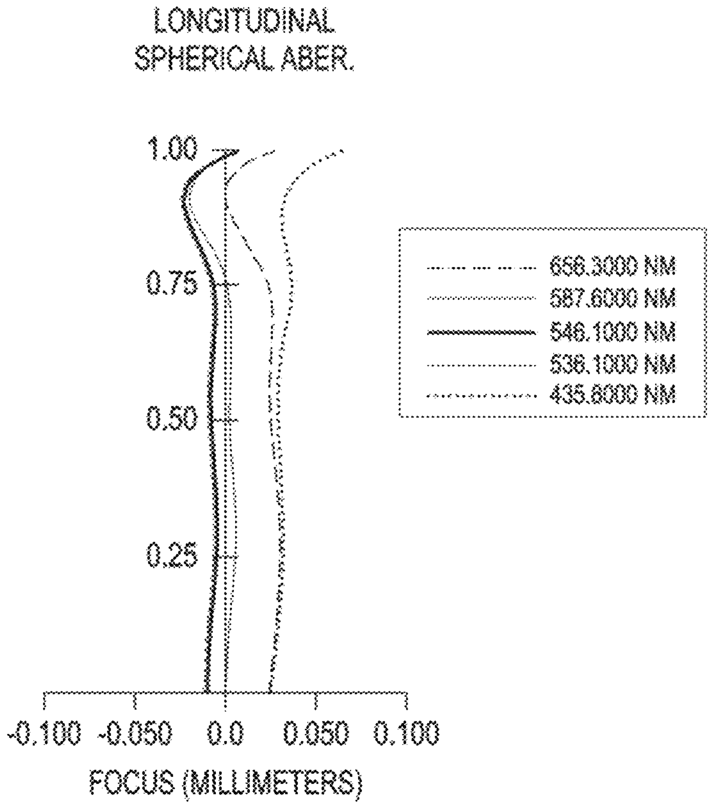
FIG. 3A is a graph illustrating spherical aberration of a lens assembly according to an embodiment.
Figure 3B:
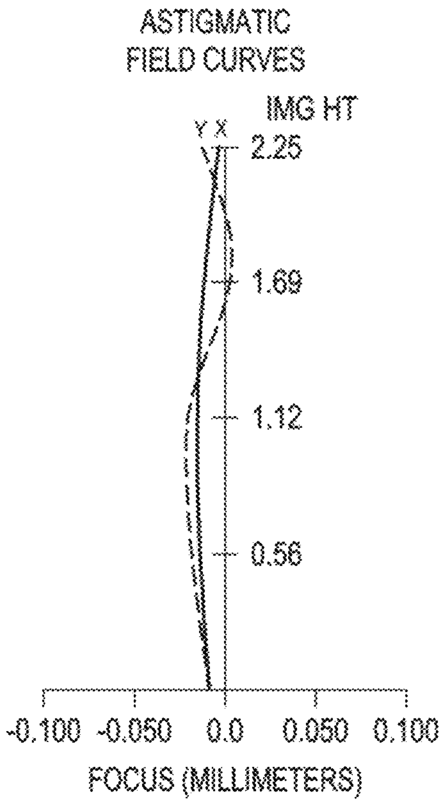
FIG. 3B is a graph illustrating astigmatism of a lens assembly according to an embodiment.
Figure 3C:
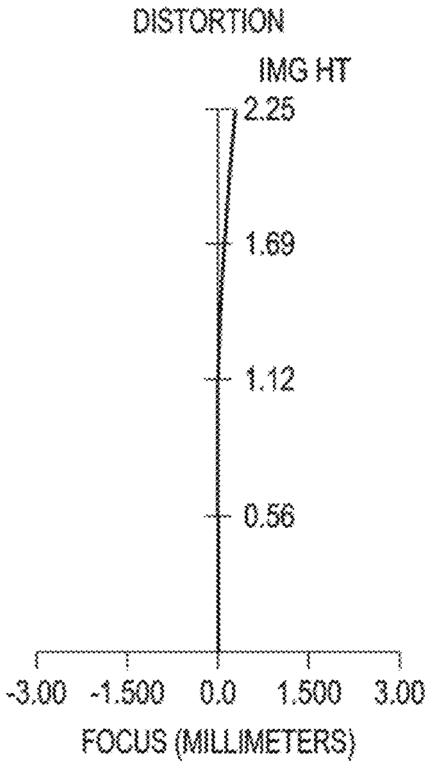
FIG. 3C is a graph illustrating distortion of a lens assembly according to an embodiment.

FIG. 3A is a graph illustrating spherical aberration of the lens assembly 100 according to an embodiment. FIG. 3B is a graph illustrating astigmatism of the lens assembly 100 according to an embodiment. FIG. 3C is a graph illustrating distortion of the lens assembly 100 according to an embodiment. The description of FIGS. 2A to 2C may be adapted to FIGS. 3A to 3C.

While the graphs of FIGS. 2A to 2C illustrate aberrations in the first direction (e.g., the Y-axis direction) substantially perpendicular to the optical axis O-I, as illustrated in the embodiment of FIG. 1B, the graphs of FIGS. 3A to 3C may illustrate aberrations in the second direction (e.g., the X-axis direction) substantially perpendicular to the optical axis O-I, as illustrated in the embodiment of FIG. 1C.

According to an embodiment of the disclosure, the lens assembly 100 and the electronic device including the same may be provided, which achieve high magnification by including an asymmetric lens, and have good optical characteristics in the second direction (e.g., the X-axis direction) in which a long side is formed as well as in the first direction (e.g., the Y-axis direction) in which a short side is formed, as noted from the graphs of FIGS. 2A to 3C.

The descriptions of the lens assembly 100 according to the above embodiments may be adapted to lens assemblies 200, 300, 400, 500, 600, and 700 according to other embodiments described below. Some of a plurality of lens assemblies 100, 200, 300, 400, 500, 600, and 700 may have the same lens properties (e.g., angle of view, focal length, autofocus, F-number, or optical zoom), or at least one of the lens assemblies may have one or more lens properties different from those of the other lens assemblies.

In the following description of an embodiment of the disclosure, like reference numerals or no reference numerals may be assigned to components that may be readily understood from the foregoing embodiments in the drawings. Further, their detailed descriptions may be omitted as long as they are redundant. Further, in describing the following embodiment below, an exploded perspective view of a lens assembly will be described with reference to an embodiment in which an image is formed in the first direction (e.g., the Y-axis direction) substantially perpendicular to the optical axis, while an embodiment in which an image is formed in the second direction (e.g., the X-axis direction) substantially perpendicular to the optical axis will be omitted, for convenience of description.

Figure 4A:
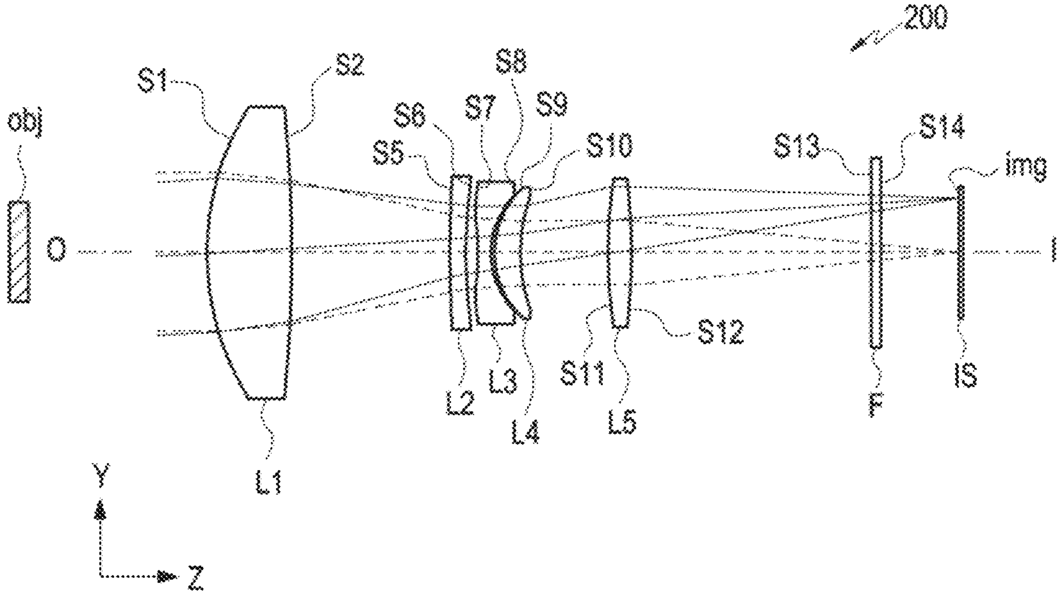
FIG. 4A is a diagram illustrating the configuration of a lens assembly according to an embodiment.
Figure 4B:
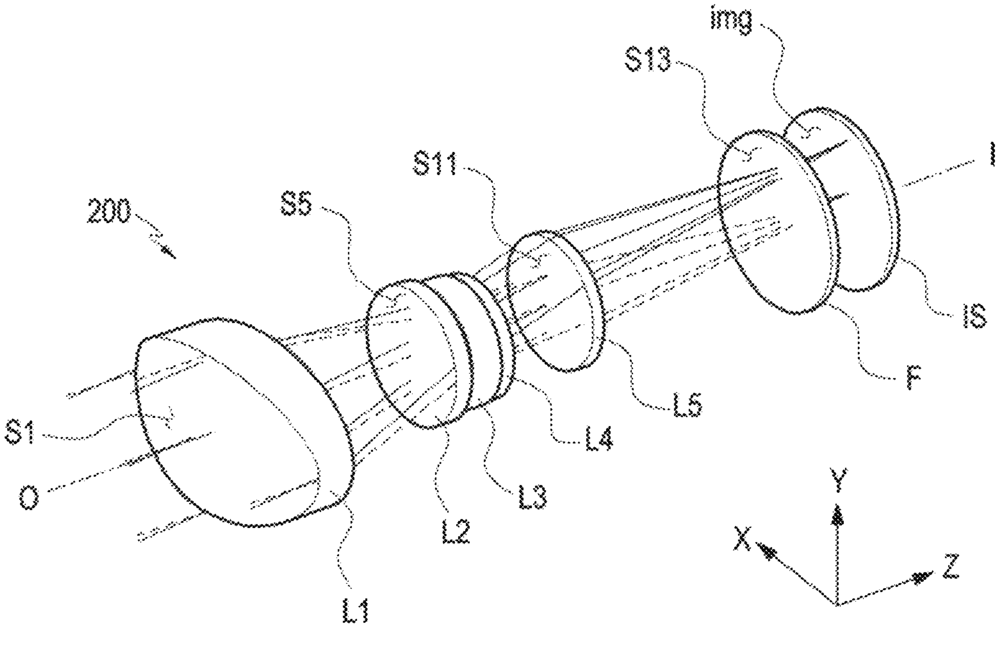
FIG. 4B is an exploded perspective view illustrating the lens assembly of FIG. 4A.
Figure 5A:
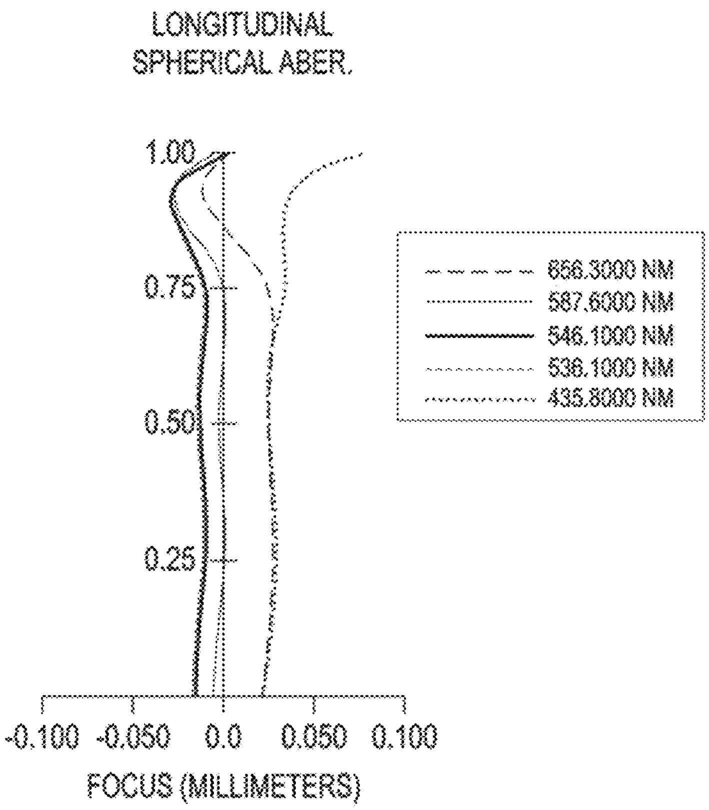
FIG. 5A is a graph illustrating spherical aberration of a lens assembly according to an embodiment.
Figure 5B:
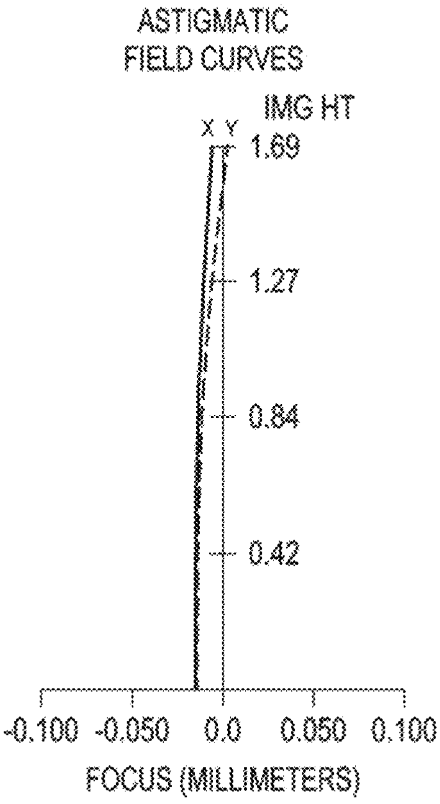
FIG. 5B is a graph illustrating astigmatism of a lens assembly according to an embodiment.
Figure 5C:
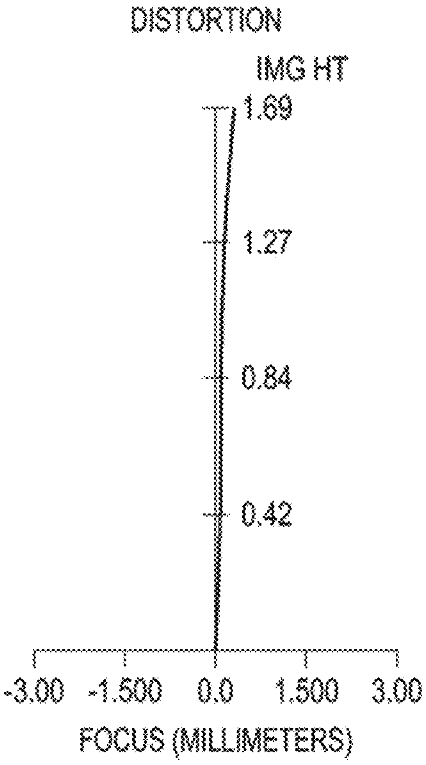
FIG. 5C is a graph illustrating distortion of a lens assembly according to an embodiment.
Figure 6A:
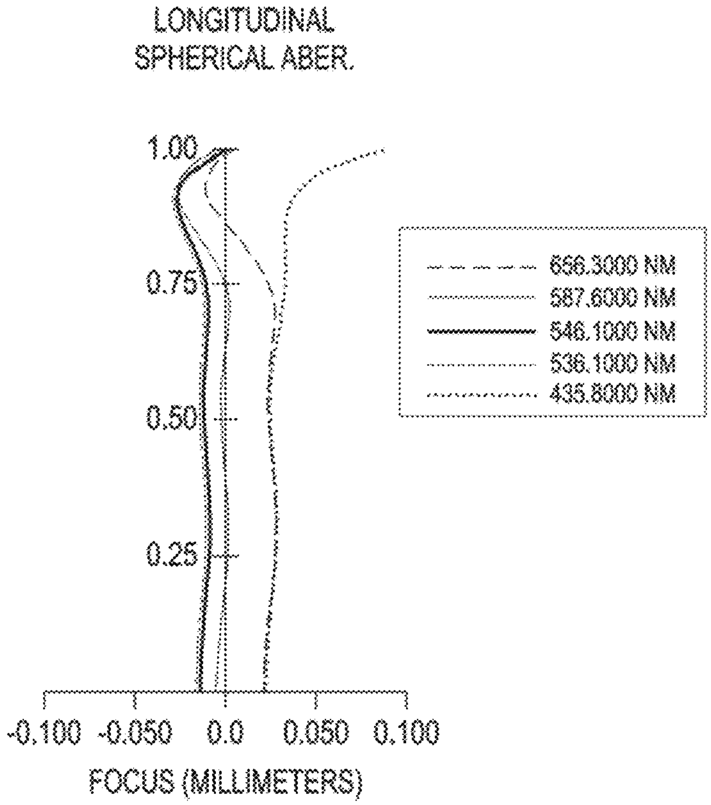
FIG. 6A is a graph illustrating spherical aberration of a lens assembly according to an embodiment.
Figure 6B:
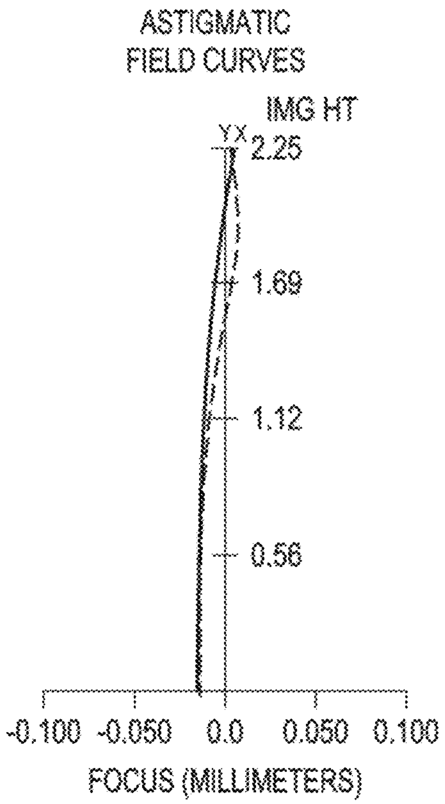
FIG. 6B is a graph illustrating astigmatism of a lens assembly according to an embodiment.
Figure 6C:
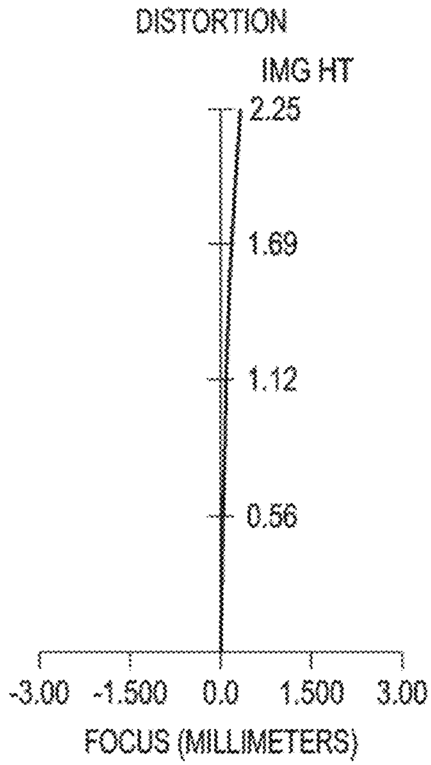
FIG. 6C is a graph illustrating distortion of a lens assembly according to an embodiment.

FIG. 4A is a perspective view illustrating the configuration of the lens assembly 200 according to an embodiment. FIG. 4B is an exploded perspective view illustrating the lens assembly 200 of FIG. 4A. FIG. 5A is a graph illustrating spherical aberration of the lens assembly 200 according to an embodiment. FIG. 5B is a graph illustrating astigmatism of the lens assembly 200 according to an embodiment. FIG. 5C is a graph illustrating distortion of the lens assembly 200 according to an embodiment. FIG. 6A is a graph illustrating spherical aberration of the lens assembly 200 according to an embodiment. FIG. 6B is a graph illustrating astigmatism of the lens assembly 200 according to an embodiment. FIG. 6C is a graph illustrating distortion of the lens assembly 200 according to an embodiment.

Referring to FIGS. 4A and 4B together, the lens assembly 200 according to an embodiment different from the embodiments of FIGS. 1A to 3C among the embodiments of the disclosure may include a plurality of lenses (e.g., L1, L2, L3, L4, and L5), the image sensor IS, and/or the filter F. The lens assembly 200 according to the embodiment illustrated in FIGS. 4A and 4B may include a first lens L1 having a positive refractive power, a second lens L2 having a negative refractive power, a third lens L3 having a negative refractive power, a fourth lens L4 having a positive refractive power, and a fifth lens L5 having a positive refractive power. According to an embodiment, a surface of at least one of the plurality of lenses (e.g., L1, L2, L3, L4, and L5) may be formed to be aspheric. According to an embodiment, the first lens L1 may be implemented as a free curved surface lens, and spherical aberration that may occur in the lens may be prevented by implementing a surface of at least one of the remaining lenses of the plurality of lenses (e.g., L1, L2, L3, L4, and L5) except the first lens L1 as an aspheric surface. For example, in the embodiment of FIGS. 4A and 4B, the object side surface S5 of the second lens L2, the object side surface S7 of the third lens L3, and the image side surface S10 of the fourth lens L4 may be formed to be aspheric.

Table 4 below may list various lens data of the lens assembly 200 according to the embodiment of FIGS. 4A and 4B. Table 5 and Table 6 below may list aspheric coefficients of the plurality of lenses L1, L2, L3, L4, and L5, and data for defining an asymmetric lens, respectively.

The lens assembly 200 included in Table 4 below may relate to a telephoto lens having an angle of view ANG of 16 degrees or less (a half angle of view XFOV of 8 degrees or less). Further, when the total EFL is 27.3 mm, the Fno is approximately 4.1, and the OTTL is 25.000 mm, the lens assembly 200 included in Table 4 below may satisfy the above-described conditions (and/or at least one of the above-described formulas).

TABLE 4

| surface | radius | Thickness (air gap) | EFL | nd | Vd |
|---|---|---|---|---|---|
| obj | infinity | infinity | | | |
| S1 (sto) | L1S1 | 2.70000 | X: 13.029 Y: 13.035 | 1.54410 | 56.09 |
| S2 | L1S2 | 0.92342 | | | |
| S3 | infinity | 4.12011 | | | |
| S4 | infinity | 0.35713 | | | |
| S5* | 77.02185 | 0.44000 | −18.137 | 1.68035 | 18.4 |
| S6 | 10.72696 | 0.44601 | | | |
| S7* | −32.63574 | 0.44000 | −4.315 | 1.63505 | 22.77 |
| S8 | 3.04130 | 0.10000 | | | |
| S9 | 3.19384 | 0.80000 | 9.333 | 1.54410 | 56.09 |
| S10* | 7.79019 | 3.00000 | | | |
| S11 | 13.44738 | 0.72166 | 10.947 | 1.68035 | 18.4 |
| S12 | 16.80087 | 7.97847 | | | |
| S13 | infinity | 0.30000 | infinity | 1.51680 | 64.17 |
| S14 | infinity | 2.66301 | | | |
| img | infinity | 0.01361 | | | |

TABLE 5

| | S5 | S7 | S10 |
|---|---|---|---|
| Radius | 7.70219E+01 | −3.26357E+01 | 7.79019E+00 |
| K(conic) | 1.00000E+00 | −1.00000E+00 | −1.00000E+00 |
| A($4^{th}$) | 5.23134E−04 | −8.82324E−04 | −4.34139E−04 |
| B($6^{th}$) | 3.17337E−04 | −6.61850E−05 | 2.63376E−04 |
| C($8^{th}$) | −1.14017E−04 | −3.83604E−06 | −1.19445E−04 |
| D($10^{th}$) | 2.06773E−05 | 2.69947E−05 | 3.68803E−05 |
| E($12^{th}$) | 2.90811E−06 | 3.85680E−07 | −4.13841E−07 |
| F($14^{th}$) | 0.00000E+00 | 6.25512E−09 | 6.50231E−08 |
| G($16^{th}$) | 0.00000E+00 | 0.00000E+00 | 0.00000E+00 |
| H($18^{th}$) | 0.00000E+00 | 0.00000E+00 | 0.00000E+00 |
| I($20^{th}$) | 0.00000E+00 | 0.00000E+00 | 0.00000E+00 |

TABLE 6

| L1S1 | | L1S2 | |
|---|---|---|---|
| X Curvature | 0.120480447 | X Curvature | −0.022583522 |
| X Radius | 8.300101993 | X Radius | −44.28007192 |
| Y Curvature | 0.12087615 | Y Curvature | −0.02207422 |
| Y Radius | 8.272930599 | Y Radius | 45.30171294 |
| Y Conic Constant (KY) | −1 | Y Conic Constant (KY) | 79.82085888 |
| (AR) | 9.04E−05 | (AR) | 0.000110031 |
| (BR) | 1.94E−06 | (BR) | 5.63E−06 |
| (CR) | 2.26E−08 | (CR) | 1.34E−09 |
| (DR) | 8.61E−11 | (DR) | 4.74E−09 |
| X Conic Constant (KX) | −1 | X Conic Constant (KX) | 27.22599149 |
| (AP) | −0.096957935 | (AP) | 0.007864752 |
| (BP) | 0.246826517 | (BP) | 0.267187352 |
| (CP) | −0.141176067 | (CP) | 0.408772456 |
| (DP) | 0.207008421 | (DP) | 0.27257608 |

Figure 7A:
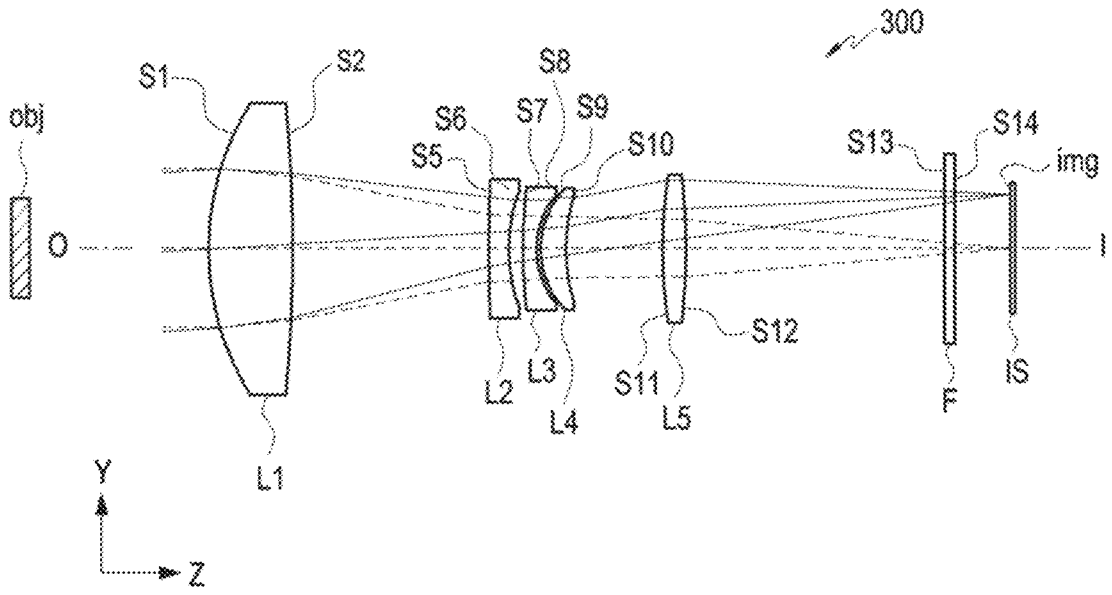
FIG. 7A is a diagram illustrating the configuration of a lens assembly according to an embodiment.
Figure 7B:
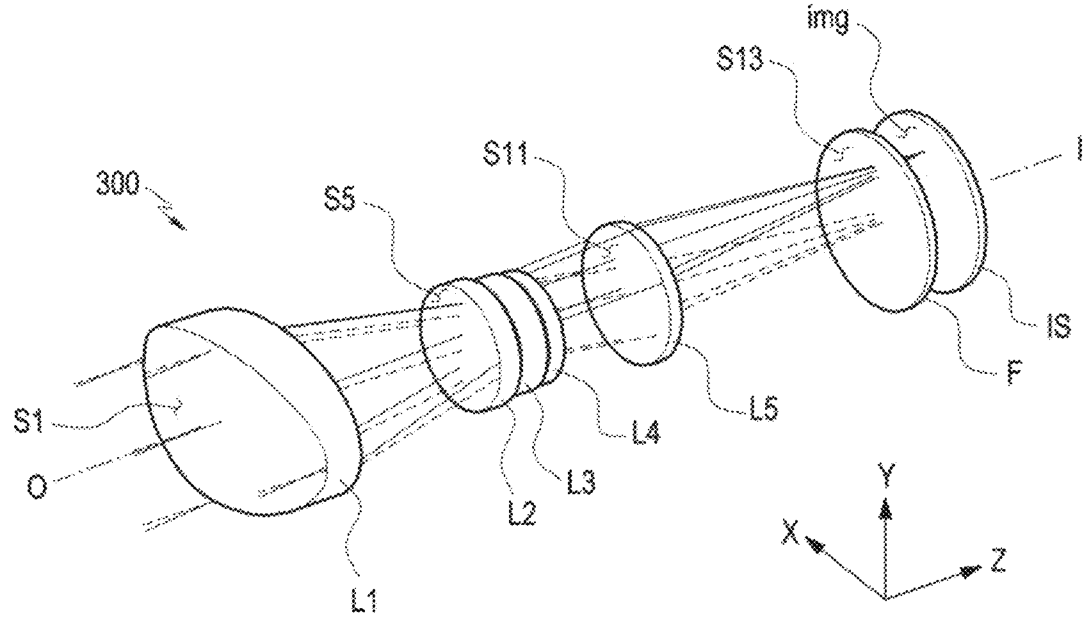
FIG. 7B is an exploded perspective view illustrating the lens assembly of FIG. 7A.
Figure 8A:
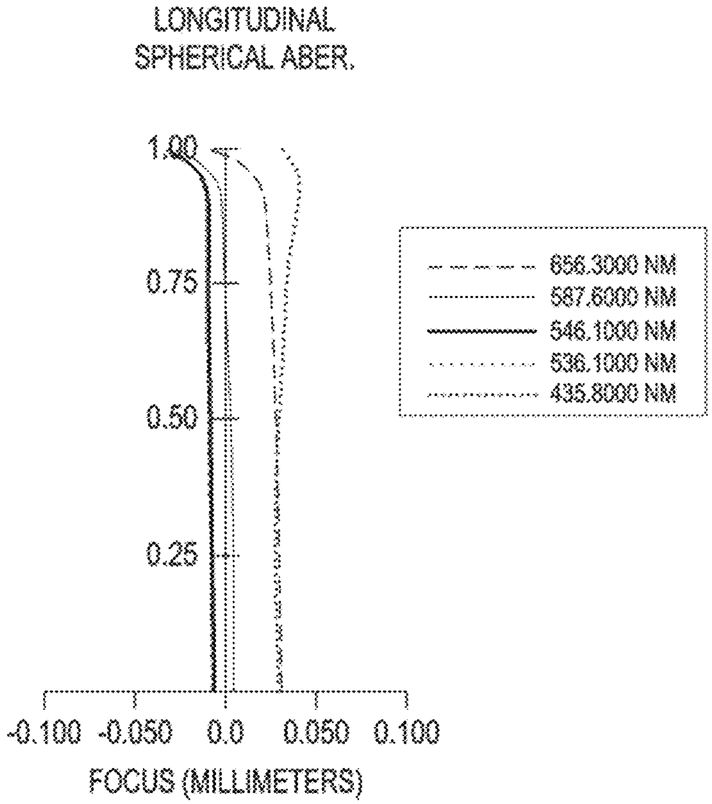
FIG. 8A is a graph illustrating spherical aberration of a lens assembly according to an embodiment.
Figure 8B:
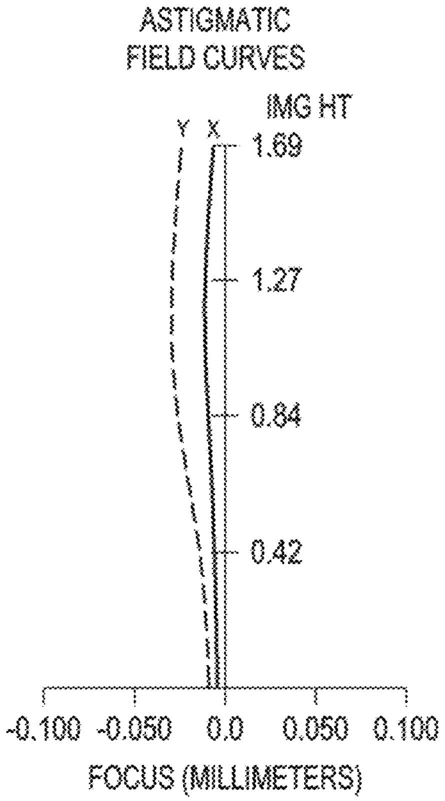
FIG. 8B is a graph illustrating astigmatism of a lens assembly according to an embodiment.
Figure 8C:
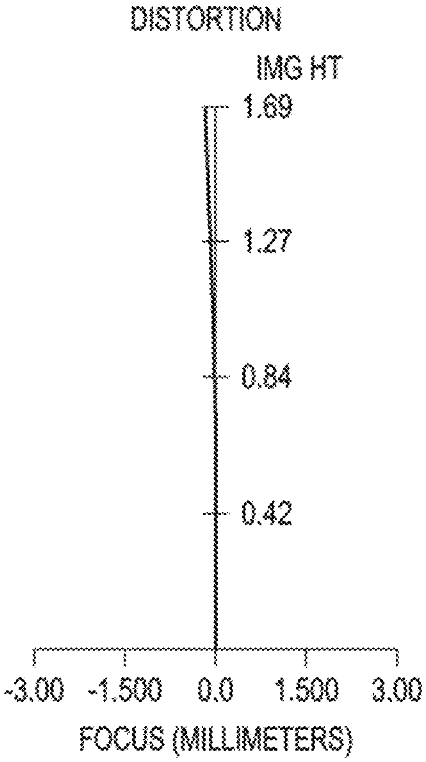
FIG. 8C is a graph illustrating distortion of a lens assembly according to an embodiment.
Figure 9A:
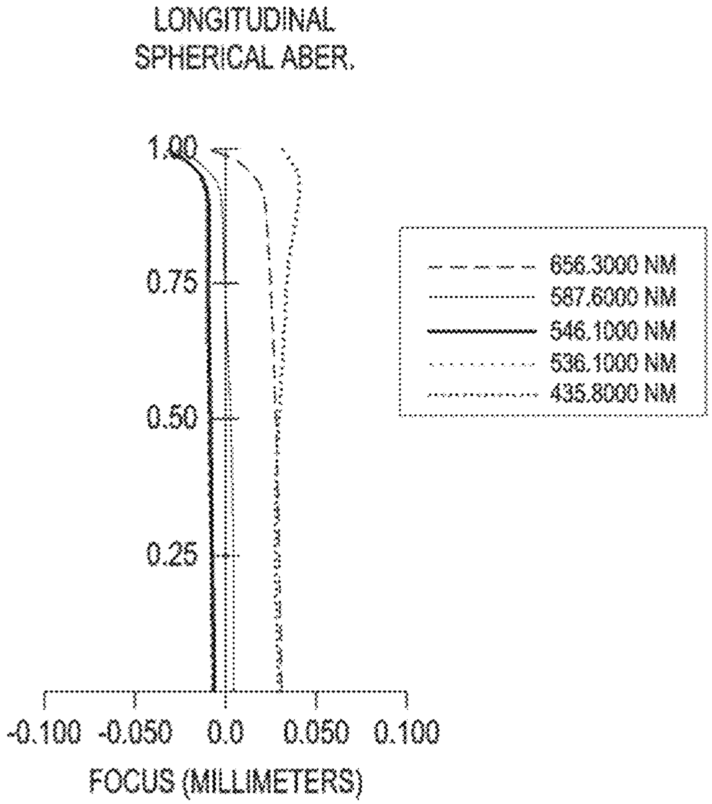
FIG. 9A is a graph illustrating spherical aberration of a lens assembly according to an embodiment.
Figure 9B:
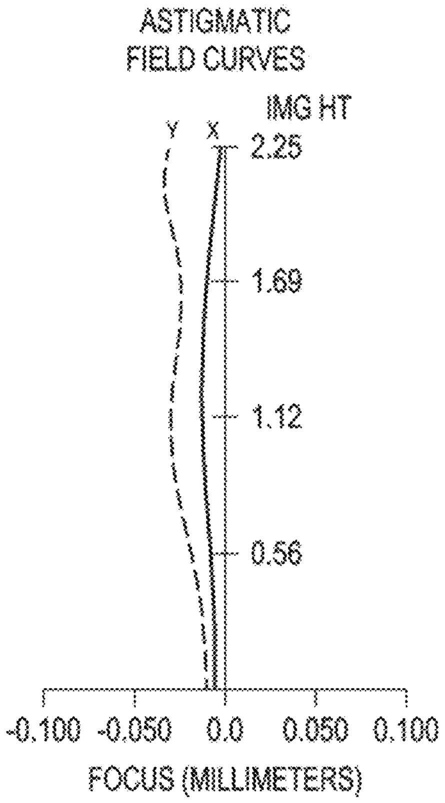
FIG. 9B is a graph illustrating astigmatism of a lens assembly according to an embodiment.
Figure 9C:
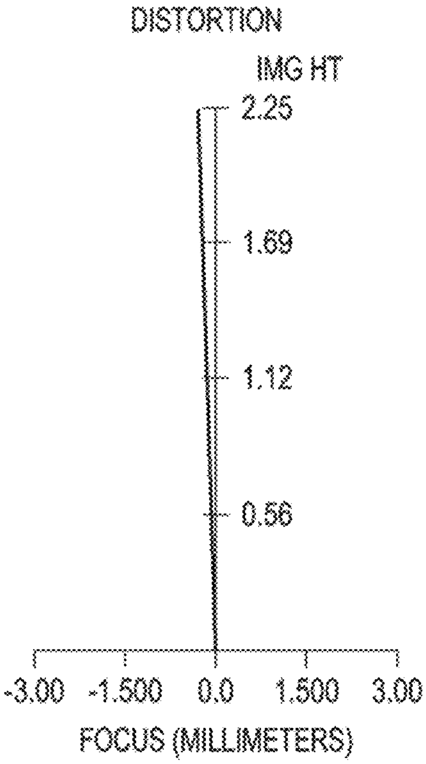
FIG. 9C is a graph illustrating distortion of a lens assembly according to an embodiment.

FIG. 7A is a perspective view illustrating the configuration of the lens assembly 300 according to an embodiment. FIG. 7B is an exploded perspective view illustrating the lens assembly 300 of FIG. 7A. FIG. 8A is a graph illustrating spherical aberration of the lens assembly 300 according to an embodiment. FIG. 8B is a graph illustrating astigmatism of the lens assembly 300 according to an embodiment. FIG. 8C is a graph illustrating distortion of the lens assembly 300 according to an embodiment. FIG. 9A is a graph illustrating spherical aberration of the lens assembly 300 according to an embodiment. FIG. 9B is a graph illustrating astigmatism of the lens assembly 300 according to an embodiment. FIG. 9C is a graph illustrating distortion of the lens assembly 300 according to an embodiment. Referring to FIGS. 7A and 7B together, the lens assembly 300 according to another embodiment different from the embodiments of FIGS. 1A to 3C among the embodiments of the disclosure may include a plurality of lenses (e.g., L1, L2, L3, L4, and L5), the image sensor IS, and/or the filter F. The lens assembly 300 according to the embodiment illustrated in FIGS. 7A and 7B may include a first lens L1 having a positive refractive power, a second lens L2 having a negative refractive power, a third lens L3 having a negative refractive power, a fourth lens L4 having a positive refractive power, and a fifth lens L5 having a positive refractive power. According to an embodiment, a surface of at least one of the plurality of lenses (e.g., L1, L2, L3, L4, and L5) may be formed to be aspheric. According to an embodiment, the first lens L1 may be implemented as an asymmetric lens, and spherical aberration that may occur in the lens may be prevented by implementing a surface of at least one of the remaining lenses of the plurality of lenses (e.g., L1, L2, L3, L4, and L5) except the first lens L1 as an aspheric surface. For example, in the embodiment of FIGS. 7A and 7B, the object side surface S7 of the third lens L3, the image side surface S10 of the fourth lens L4, and the image side surface S12 of the fifth lens L5 may be formed to be aspheric. Table 7 below may list various lens data of the lens assembly 300 according to the embodiment of FIGS. 7A and 7B. Table 8 and Table 9 below may list aspheric coefficients of the plurality of lenses L1, L2, L3, L4, and L5, and data for defining an asymmetric lens, respectively.

The lens assembly 300 included in Table 7 below may relate to a telephoto lens having an angle of view ANG of 16 degrees or less (a half angle of view XFOV of 8 degrees or less). Further, when the total EFL is 27.3 mm, the Fno is approximately 4.1, and the OTTL is 25.000 mm, the lens assembly 300 included in Table 7 below may satisfy the above-described conditions (and/or at least one of the above-described formulas).

TABLE 7

| surface | radius | Thickness (air gap) | EFL | nd | Vd |
|---|---|---|---|---|---|
| obj | infinity | infinity | | | |
| S1(sto) | L1S1 | 2.70000 | X: 13.339 Y: 13.340 | 1.53258 | 56.45 |
| S2 | L1S2 | 1.15629 | | | |
| S3 | infinity | 4.35299 | | | |
| S4 | infinity | 0.59000 | | | |
| S5 | 75.78213 | 0.60000 | −8.688 | 1.66100 | 19.79 |
| S6 | 5.37971 | 0.41393 | | | |
| S7* | 15.75743 | 0.44639 | −5.006 | 1.64136 | 21.67 |
| S8 | 2.66112 | 0.10000 | | | |
| S9 | 2.78718 | 0.80000 | 8.074 | 1.53806 | 56.28 |
| S10* | 6.94042 | 3.00000 | | | |
| S11 | 12.51829 | 0.80456 | 9.756 | 1.68035 | 18.4 |
| S12* | −14.13626 | 7.97847 | | | |
| S13 | infinity | 0.30000 | infinity | 1.51680 | 64.17 |
| S14 | infinity | | | | |
| img | infinity | | | | |

TABLE 8

| | S7 | S10 | S12 |
|---|---|---|---|
| Radius | 1.57574E+01 | 6.94042E+00 | −1.41363E+01 |
| K(conic) | −1.00000E+00 | −1.00000E+00 | −1.00000E+00 |
| A($4^{th}$) | −5.37641E−04 | −1.13084E−03 | 2.81126E−04 |
| B($6^{th}$) | 1.87689E−05 | −4.72527E−05 | 3.33141E−05 |
| C($8^{th}$) | −1.16379E−05 | −1.04325E−04 | 6.31730E−06 |
| D($10^{th}$) | 1.81958E−05 | 6.00464E−05 | −4.39912E−06 |
| E($12^{th}$) | 3.85680E−07 | −4.13841E−07 | 9.31481E−07 |
| F($14^{th}$) | 6.25512E−09 | 6.50231E−08 | −6.75257E−08 |
| G($16^{th}$) | 0.00000E+00 | 0.00000E+00 | 4.82170E−09 |
| H($18^{th}$) | 0.00000E+00 | 0.00000E+00 | −6.88383E−10 |
| I($20^{th}$) | 0.00000E+00 | 0.00000E+00 | 0.00000E+00 |

TABLE 9

| L1S1 | | L1S2 | |
|---|---|---|---|
| X Curvature | 0.120254251 | X Curvature | −0.022461312 |
| X Radius | 8.315714371 | X Radius | −44.52099772 |
| Y Curvature | 0.12039893 | Y Curvature | −0.022294089 |
| Y Radius | 8.305721644 | Y Radius | −44.85493916 |
| Y Conic Constant (KY) | −1 | Y Conic Constant (KY) | 57.81653525 |
| (AR) | 8.50E−05 | (AR) | 0.000107037 |
| (BR) | 2.37E−06 | (BR) | 4.59E−06 |
| (CR) | 1.73E−08 | (CR) | 5.13E−10 |
| (DR) | 2.42E−13 | (DR) | 1.78E−09 |
| X Conic Constant (KX) | −1 | X Conic Constant (KX) | 30.36705549 |
| (AP) | −0.0381125 | (AP) | 0.048275642 |
| (BP) | 0.339887964 | (BP) | 0.341154422 |
| (CP) | −0.020718847 | (CP) | −0.968258901 |
| (DP) | 0.187556968 | (DP) | 0.47253158 |

Figure 10A:
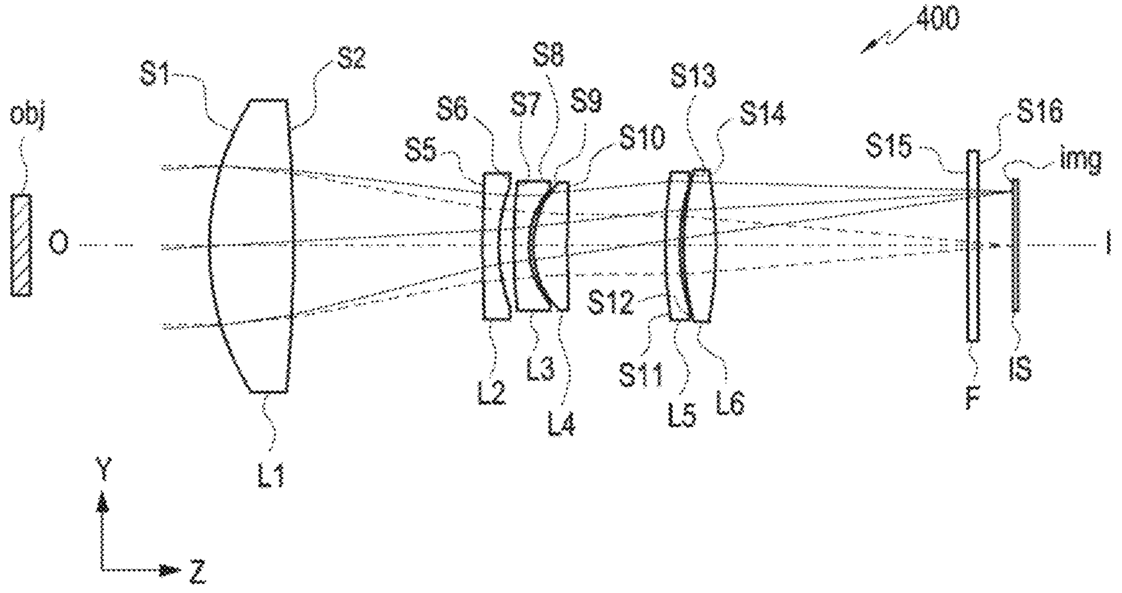
FIG. 10A is a diagram illustrating the configuration of a lens assembly according to an embodiment.
Figure 10B:
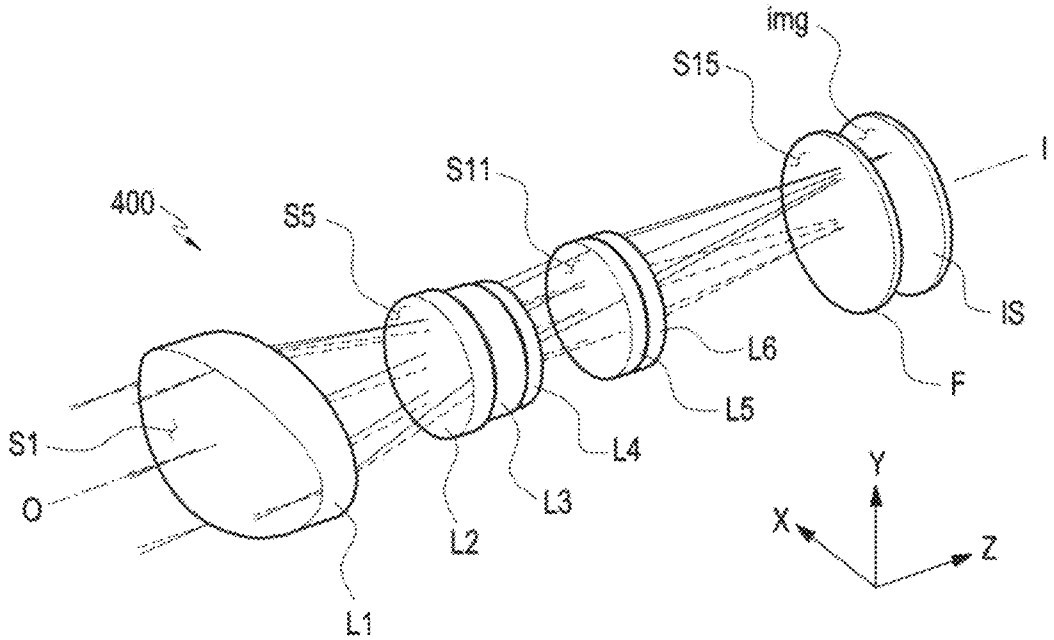
FIG. 10B is an exploded perspective view illustrating the lens assembly of FIG. 10A.
Figure 11A:
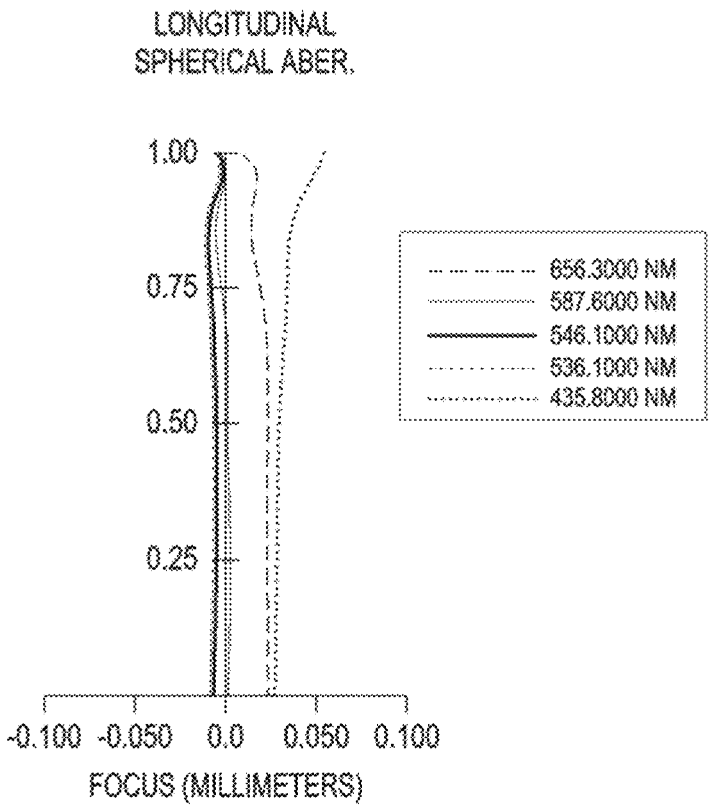
FIG. 11A is a graph illustrating spherical aberration of a lens assembly according to an embodiment.
Figure 11B:
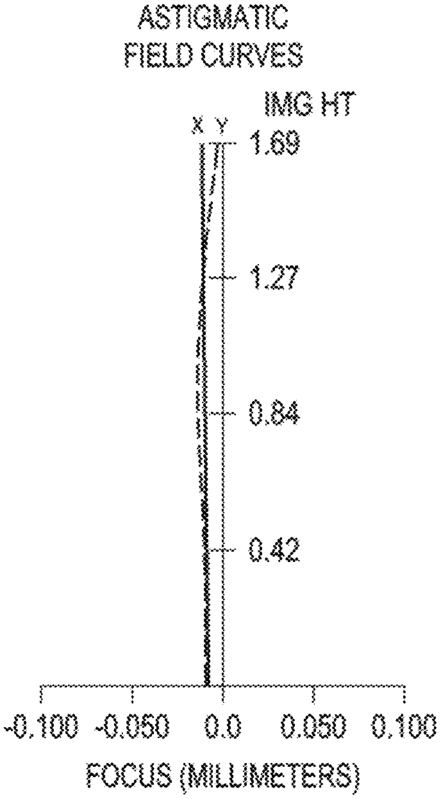
FIG. 11B is a graph illustrating astigmatism of a lens assembly according to an embodiment.
Figure 11C:
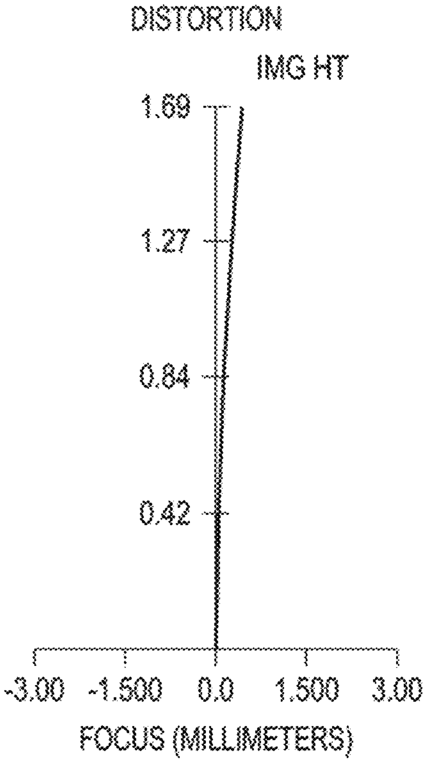
FIG. 11C is a graph illustrating distortion of a lens assembly according to an embodiment.
Figure 12A:
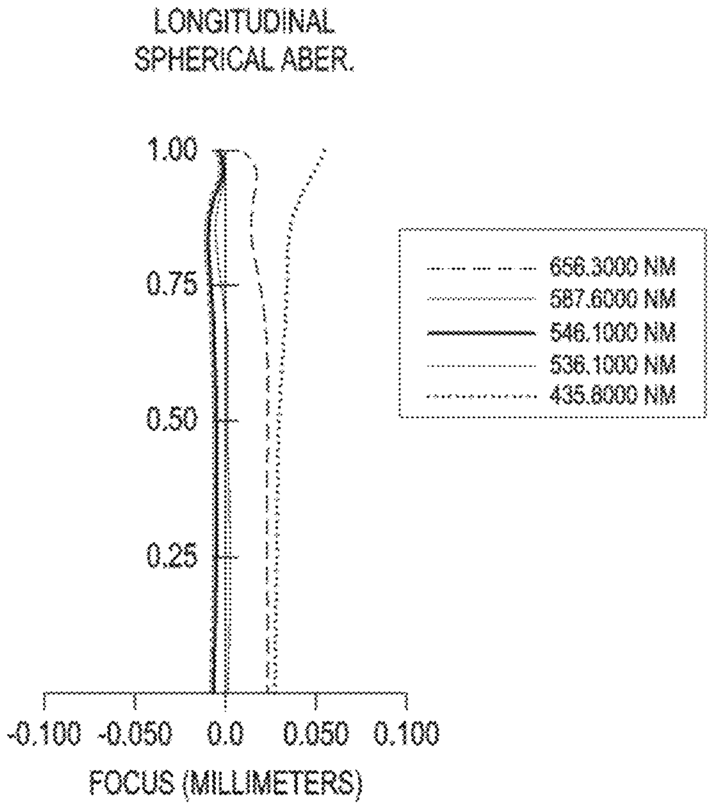
FIG. 12A is a graph illustrating spherical aberration of a lens assembly according to an embodiment.
Figure 12B:
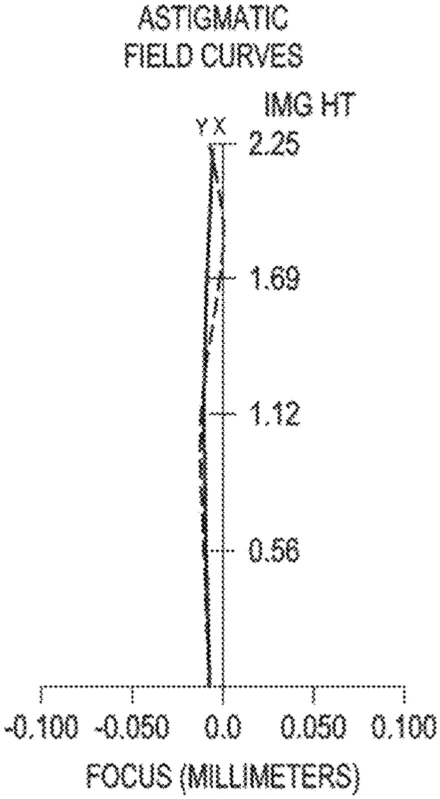
FIG. 12B is a graph illustrating astigmatism of a lens assembly according to an embodiment.
Figure 12C:
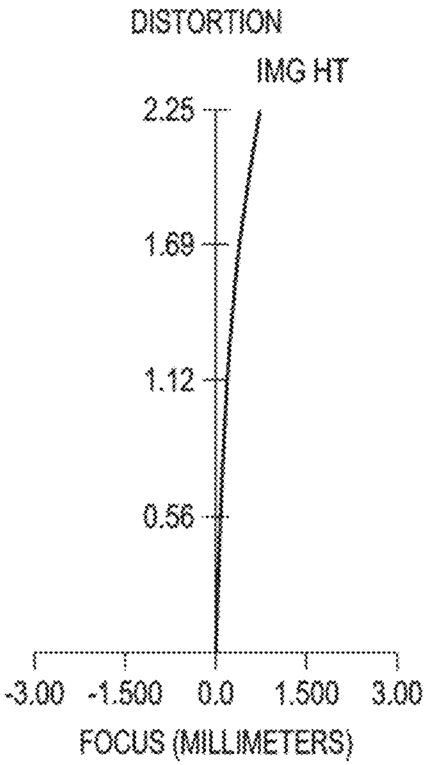
FIG. 12C is a graph illustrating distortion of a lens assembly according to an embodiment.

FIG. 10A is a diagram illustrating the configuration of the lens assembly 400 according to an embodiment. FIG. 10B is an exploded perspective view illustrating the lens assembly 400 of FIG. 10A. FIG. 11A is a graph illustrating spherical aberration of the lens assembly 400 according to an embodiment. FIG. 11B is a graph illustrating astigmatism of the lens assembly 400 according to an embodiment. FIG. 11C is a graph illustrating distortion of the lens assembly 400 according to an embodiment. FIG. 12A is a graph illustrating spherical aberration of the lens assembly 400 according to an embodiment. FIG. 12B is a graph illustrating astigmatism of the lens assembly 400 according to an embodiment. FIG. 12C is a graph illustrating distortion of the lens assembly 400 according to an embodiment. Referring to FIGS. 10A and 10B together, the lens assembly 400 according to another embodiment different from the embodiments of FIGS. 1A to 3C among the embodiments of the disclosure may include a plurality of lenses (e.g., L1, L2, L3, L4, L5, and L6), the image sensor IS, and/or the filter F. The lens assembly 400 according to the embodiment illustrated in FIGS. 10A and 10B may include a first lens L1 having a positive refractive power, a second lens L2 having a negative refractive power, a third lens L3 having a negative refractive power, a fourth lens L4 having a positive refractive power, a fifth lens L5 having a negative refractive power, and a sixth lens L6 having a positive refractive power. In the embodiment of FIGS. 10A and 10B, a W_Assy value for calculating Formula 4 may correspond to the distance from the object side surface S1 of the first lens L1 to the image side surface S14 of the sixth lens L6. According to an embodiment, a surface of at least one of the plurality of lenses (e.g., L1, L2, L3, L4, L5, and L6) may be formed to be aspheric. According to an embodiment, the first lens L1 may be implemented as an asymmetric lens, and spherical aberration that may occur in the lens may be prevented by implementing a surface of at least one of the remaining lenses of the plurality of lenses (e.g., L1, L2, L3, L4, L5, and L6) except the first lens L1 to be aspheric. For example, in the embodiment of FIGS. 10A and 10B, the object side surface S5 of the second lens L2, the object side surface S7 of the third lens L3, the image side surface S10 of the fourth lens L4, and the image side surface S14 of the sixth lens L6 may be formed to be aspheric. Table 10 below may list various lens data of the lens assembly 400 according to the embodiment of FIGS. 10A and 10B. Table 11 and Table 12 below may list aspheric coefficients of the plurality of lenses L1, L2, L3, L4, L5, and L6 and data for defining an asymmetric lens, respectively.

The lens assembly 400 included in Table 10 below may relate to a telephoto lens having an angle of view ANG of 16 degrees or less (a half angle of view XFOV of 8 degrees or less). Further, when the total EFL is 27.3 mm, the Fno is approximately 4.103, and the OTTL is 25.000 mm, the lens assembly 400 included in Table 10 below may satisfy the above-described conditions (and/or at least one of the above-described formulas).

TABLE 10

| surface | radius | Thickness (air gap) | EFL | nd | Vd |
|---|---|---|---|---|---|
| obj | infinity | infinity | | | |
| S1(sto) | L1S1 | 2.70000 | X: 13.327 Y: 13.330 | 1.53284 | 56.45 |
| S2 | L1S2 | 1.04893 | | | |
| S3 | infinity | 4.24562 | | | |
| S4 | infinity | 0.48263 | | | |
| S5* | −303.46431 | 0.44000 | −9.891 | 1.62476 | 23.4 |
| S6 | 6.37645 | 0.48687 | | | |
| S7* | 75.57450 | 0.44000 | −4.933 | 1.63543 | 22.32 |
| S8 | 3.03340 | 0.10308 | | | |
| S9 | 3.18531 | 1.10721 | 6.283 | 1.54194 | 56.16 |
| S10* | 40.81768 | 3.00000 | | | |
| S11 | 25.37499 | 0.40000 | −17.864 | 1.55018 | 50.41 |
| S12 | 7.06865 | 0.10000 | | | |
| S13 | 8.69055 | 1.00000 | 8.310 | 1.67379 | 18.9 |
| S14* | −15.54254 | 7.70320 | | | |
| S15 | infinity | 0.30000 | infinity | 1.51680 | 64.17 |
| S16 | infinity | 1.43507 | | | |
| img | infinity | 0.00742 | | | |

TABLE 11

| | S5 | S7 | S10 | S14 |
|---|---|---|---|---|
| Radius | −3.03464E+02 | 7.55745E+01 | 4.08177E+01 | −1.55425E+01 |
| K(conic) | 1.00000E+00 | −1.00000E+00 | −1.00000E+00 | −1.00000E+00 |
| A($4^{th}$) | 2.36224E−04 | −1.00801E−03 | −1.23984E−03 | −2.16271E−04 |
| B($6^{th}$) | 2.72672E−04 | −1.78622E−04 | 1.57435E−04 | −2.38584E−05 |
| C($8^{th}$) | −5.17343E−05 | −1.88866E−05 | −9.44503E−05 | 1.55104E−05 |
| D($10^{th}$) | 3.52566E−06 | 3.02501E−05 | 3.28001E−05 | −6.05707E−06 |
| E($12^{th}$) | −1.07998E−06 | 3.85873E−07 | −4.13841E−07 | 1.03750E−06 |
| F($14^{th}$) | 0.00000E+00 | 6.25512E−09 | 6.50231E−08 | −6.75257E−08 |
| G($16^{th}$) | 0.00000E+00 | 0.00000E+00 | 0.00000E+00 | 4.82170E−09 |
| H($18^{th}$) | 0.00000E+00 | 0.00000E+00 | 0.00000E+00 | −6.88383E−10 |
| I($20^{th}$) | 0.00000E+00 | 0.00000E+00 | 0.00000E+00 | 0.00000E+00 |

TABLE 12

| L1S1 | | L1S2 | |
|---|---|---|---|
| X Curvature | 1.20E−01 | X Curvature | 2.26E−02 |
| X Radius | 8.319855877 | X Radius | 44.26279764 |
| Y Curvature | 0.120395961 | Y Curvature | 0.022336441 |
| Y Radius | 8.30592645 | Y Radius | 44.76989031 |
| Y Conic Constant (KY) | −1 | Y Conic Constant (KY) | 75.71338655 |
| (AR) | 9.23E−05 | (AR) | 0.000106499 |
| (BR) | 1.64E−06 | (BR) | 4.87E−06 |
| (CR) | 1.55E−08 | (CR) | 1.60E−11 |
| (DR) | 2.63E−11 | (DR) | −3.90E−09 |
| X Conic Constant (KX) | −1 | X Conic Constant (KX) | 29.57164459 |
| (AP) | −0.06952256 | (AP) | 0.04309583 |
| (BP) | 0.298809418 | (BP) | 0.290140902 |
| (CP) | −0.092699046 | (CP) | −1.826796397 |
| (DP) | −0.284356999 | (DP) | 0.340443647 |

Figure 13A:
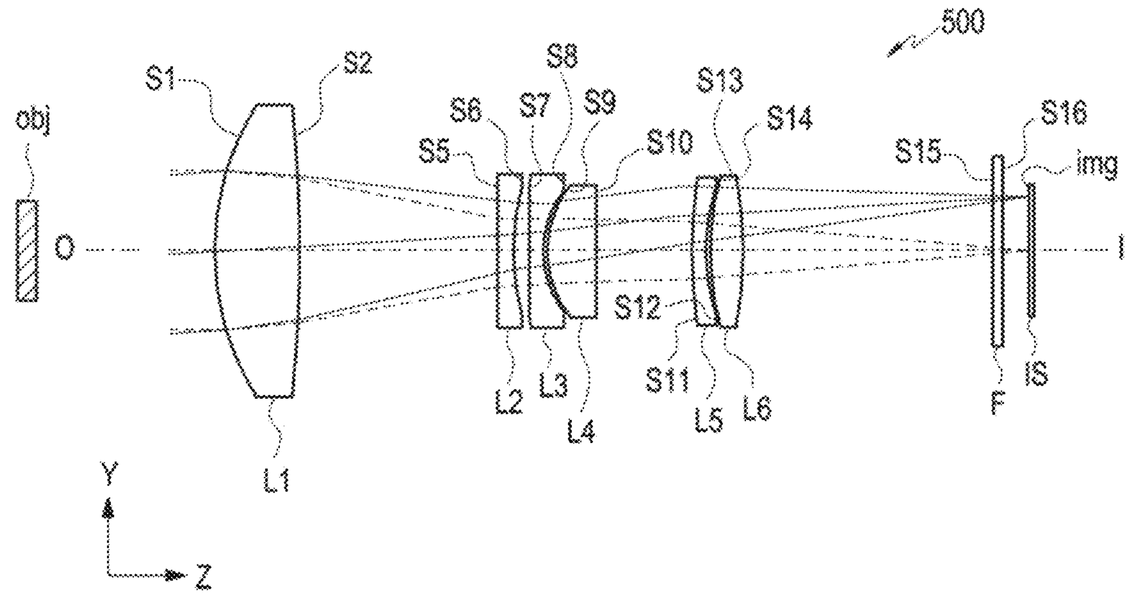
FIG. 13A is a diagram illustrating the configuration of a lens assembly according to an embodiment.
Figure 13B:
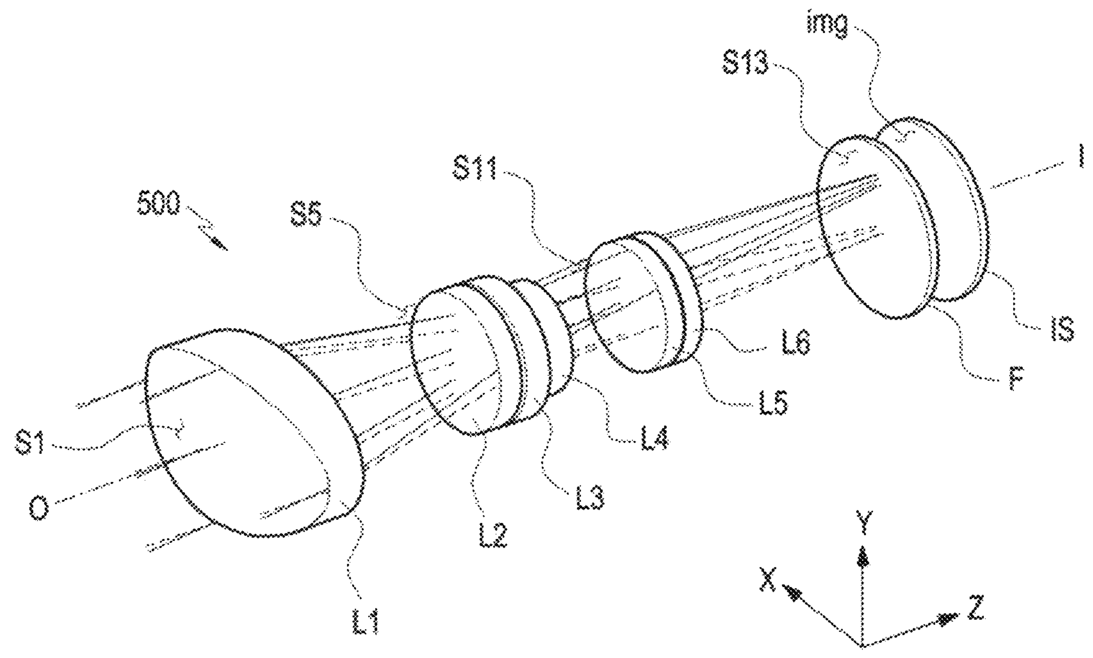
FIG. 13B is an exploded perspective view illustrating the lens assembly of FIG. 13A.
Figure 14A:
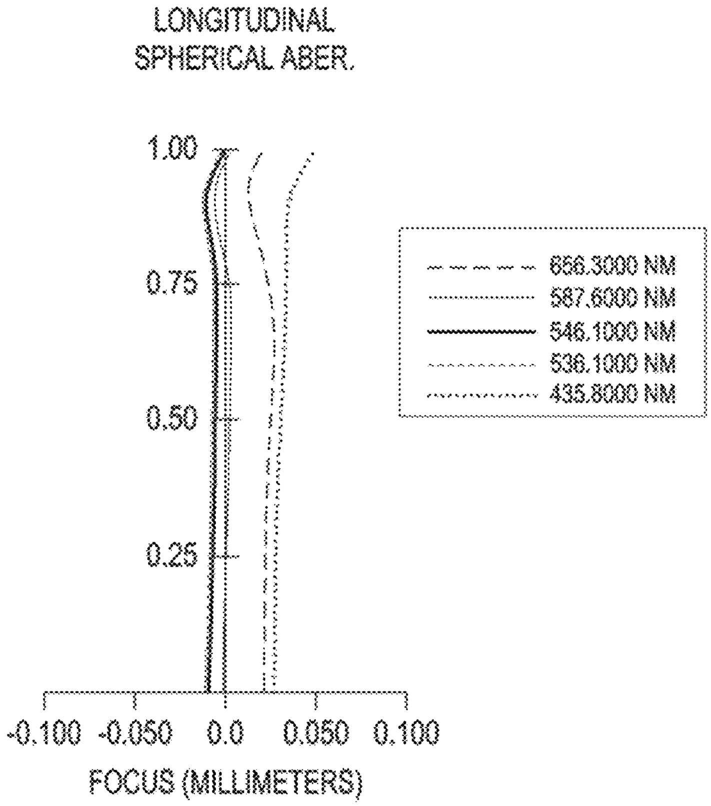
FIG. 14A is a graph illustrating spherical aberration of a lens assembly according to an embodiment.
Figure 14B:
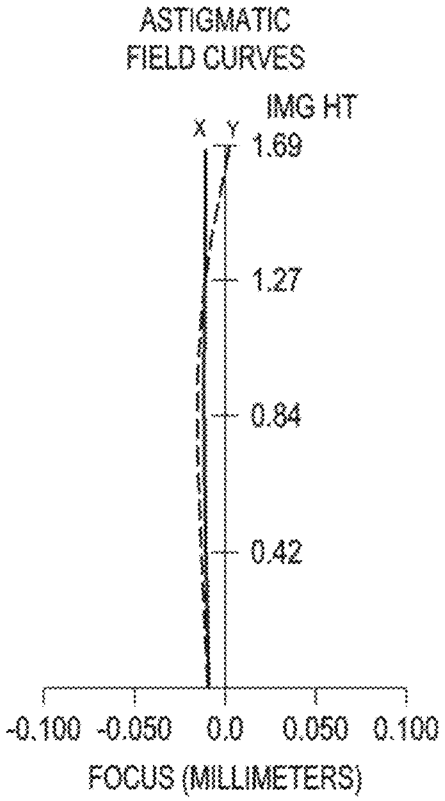
FIG. 14B is a graph illustrating astigmatism of a lens assembly according to an embodiment.
Figure 14C:
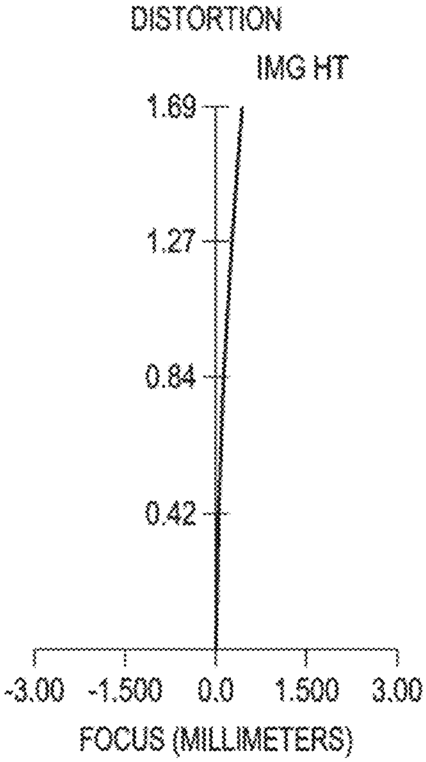
FIG. 14C is a graph illustrating distortion of a lens assembly according to an embodiment.
Figure 15A:
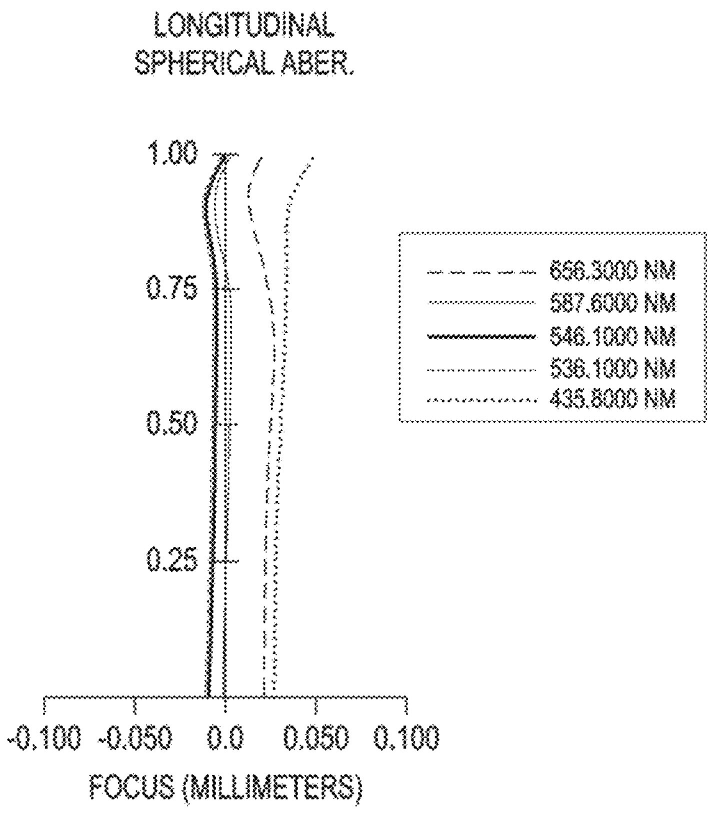
FIG. 15A is a graph illustrating spherical aberration of a lens assembly according to an embodiment.
Figure 15B:
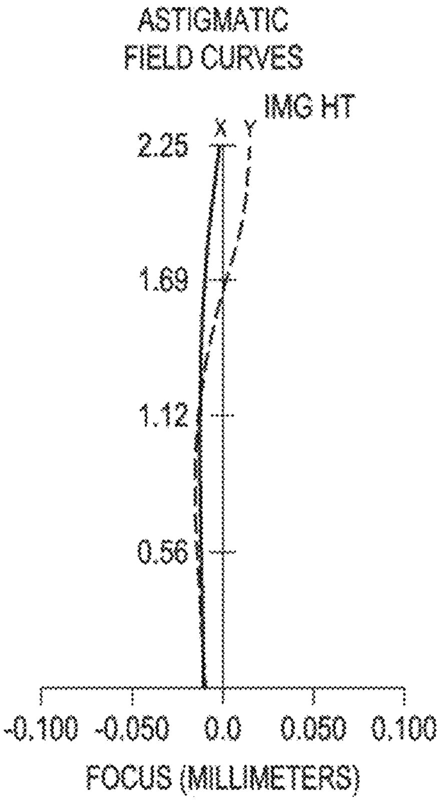
FIG. 15B is a graph illustrating astigmatism of a lens assembly according to an embodiment.
Figure 15C:
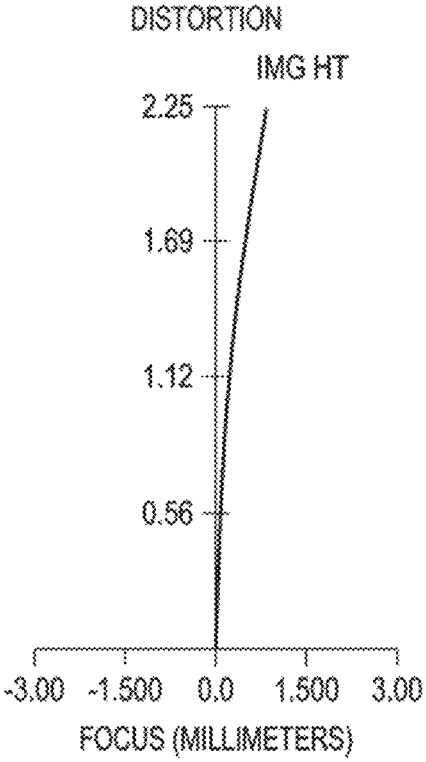
FIG. 15C is a graph illustrating distortion of a lens assembly according to an embodiment.
Figure 16A:
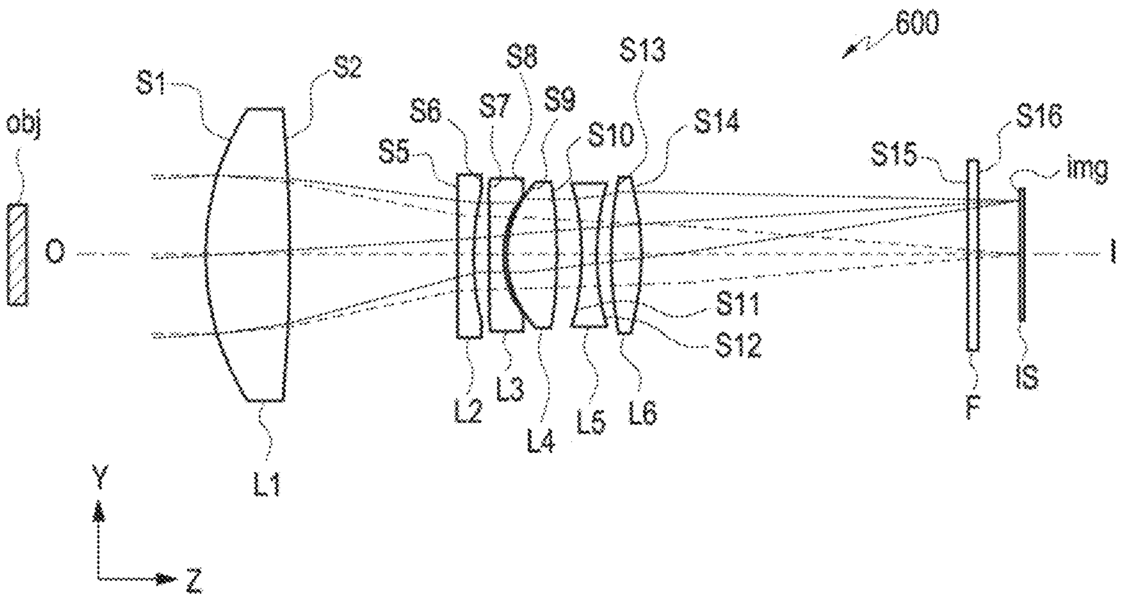
FIG. 16A is a diagram illustrating the configuration of a lens assembly according to an embodiment.
Figure 16B:
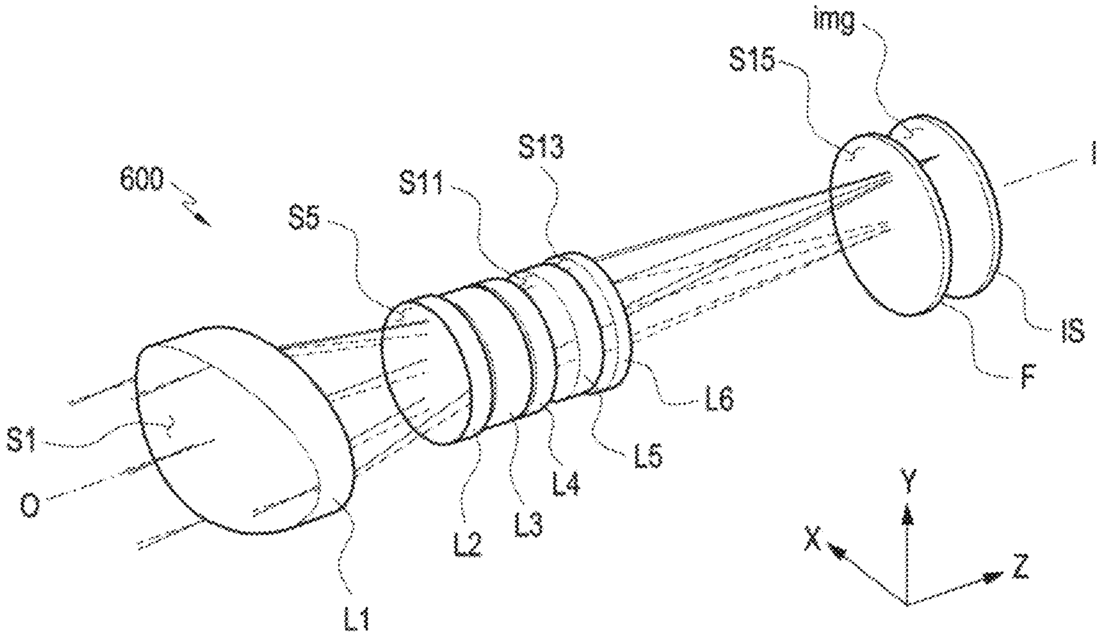
FIG. 16B is an exploded perspective view illustrating the lens assembly of FIG. 16A.

FIG. 13A is a diagram illustrating the configuration of the lens assembly 500 according to an embodiment. FIG. 13B is an exploded perspective view illustrating the lens assembly 500 of FIG. 13A. FIG. 14A is a graph illustrating spherical aberration of the lens assembly 500 according to an embodiment. FIG. 14B is a graph illustrating astigmatism of the lens assembly 500 according to an embodiment. FIG. 14C is a graph illustrating distortion of the lens assembly 500 according to an embodiment. FIG. 16A is a graph illustrating spherical aberration of the lens assembly 500 according to an embodiment. FIG. 16B is a graph illustrating astigmatism of the lens assembly 500 according to an embodiment. FIG. 16C is a graph illustrating distortion of the lens assembly 500 according to an embodiment. Referring to FIGS. 13A and 13B together, the lens assembly 500 according to another embodiment different from the embodiments of FIGS. 1A to 3C among the embodiments of the disclosure may include a plurality of lenses (e.g., L1, L2, L3, L4, L5, and L6), the image sensor IS, and/or the filter F. The lens assembly 500 according to the embodiment illustrated in FIGS. 13A and 13B may include a first lens L1 having a positive refractive power, a second lens L2 having a negative refractive power, a third lens L3 having a negative refractive power, a fourth lens L4 having a positive refractive power, a fifth lens L5 having a negative refractive power, and a sixth lens L6 having a positive refractive power. As in the embodiment of FIGS. 10A and 10B, in the embodiment of FIGS. 13A and 13B, the W_Assy value for calculating Formula 5 may correspond to the distance from the object side surface S1 of the first lens L1 to the image side surface S14 of the sixth lens L6. According to an embodiment, a surface of at least one of the plurality of lenses (e.g., L1, L2, L3, L4, L5, and L6) may be formed to be aspheric. According to an embodiment, the first lens L1 may be implemented as an asymmetric lens, and spherical aberration that may occur in the lens may be prevented by implementing a surface of at least one of the remaining lenses of the plurality of lenses (e.g., L1, L2, L3, L4, L5, and L6) except the first lens L1 to be aspheric. For example, in the embodiment of FIGS. 13A and 13B, the object side surface S5 of the second lens L2, the object side surface S7 of the third lens L3, and the image side surface S10 of the fourth lens L4 may be formed to be aspheric. Table 13 below may list various lens data of the lens assembly 500 according to the embodiment of FIGS. 13A and 13B. Table 14 and Table 15 below may list aspheric coefficients of the plurality of lenses L1, L2, L3, L4, L5, and L6 and data for defining an asymmetric lens, respectively.

The lens assembly 500 included in Table 13 below may relate to a telephoto lens having an angle of view ANG of 16 degrees or less (a half angle of view XFOV of 8 degrees or less). Further, when the total EFL is 27.3 mm, the Fno is approximately 4.1, and the OTTL is 25.000 mm, the lens assembly 500 included in Table 13 below may satisfy the above-described conditions (and/or at least one of the above-described formulas).

TABLE 13

| surface | radius | Thickness (air gap) | EFL | nd | Vd |
|---|---|---|---|---|---|
| obj | infinity | infinity | | | |
| S1(sto) | L1S1 | 2.70000 | X: 13.372<br>Y: 13.372 | 1.53120 | 56.5 |
| S2 | L1S2 | 1.13853 | | | |
| S3 | infinity | 4.33522 | | | |
| S4 | infinity | 0.57223 | | | 22.51 |
| S5* | 119.38728 | 0.46588 | −10.147 | 1.63230 | |
| S6 | 6.86536 | 0.49431 | | | |
| S7* | −68.74916 | 0.44000 | −4.650 | 1.63839 | 21.85 |
| S8 | 3.14524 | 0.10670 | | | |
| S9 | 3.29543 | 1.47010 | 6.158 | 1.53774 | 56.29 |
| S10* | 307.92207 | 3.00000 | | | |
| S11 | 22.09564 | 0.40000 | −15.864 | 1.55499 | 46.73 |
| S12 | 6.27776 | 0.10000 | | | |
| S13 | 7.06089 | 1.00000 | 7.702 | 1.67617 | 18.71 |
| S14 | −19.62875 | 7.70320 | | | |
| S15 | infinity | 0.30000 | infinity | 1.51680 | 64.17 |
| S16 | infinity | 0.76342 | | | |
| img | infinity | 0.01036 | | | |

TABLE 14

| | S5 | S7 | S10 |
|---|---|---|---|
| Radius | −1.19387E+02 | −6.87492E+01 | 3.07922E+02 |
| K(conic) | −1.00000E+00 | −1.00000E+00 | −1.00000E+00 |
| A($4^{th}$) | 2.20553E−04 | −1.01332E−03 | −1.28188E−03 |
| B($6^{th}$) | 2.93104E−04 | −1.89193E−04 | 1.59501E−04 |
| C($8^{th}$) | −6.23347E−05 | −2.11778E−05 | −9.42098E−05 |
| D($10^{th}$) | 6.72114E−06 | 3.00842E−05 | 2.86263E−05 |
| E($12^{th}$) | −1.50001E−06 | 3.85873E−07 | −4.13841E−07 |
| F($14^{th}$) | −8.95333E−20 | 6.25512E−09 | 6.50231E−08 |
| G($16^{th}$) | 0.00000E+00 | 0.00000E+00 | 0.00000E+00 |
| H($18^{th}$) | 0.00000E+00 | 0.00000E+00 | 0.00000E+00 |
| I($20^{th}$) | 0.00000E+00 | 0.00000E+00 | 0.00000E+00 |

TABLE 15

| L1S1 | | L1S2 | |
|---|---|---|---|
| X Curvature | 0.120162494 | X Curvature | −0.022581193 |
| X Radius | 8.322064258 | X Radius | −44.28464071 |
| Y Curvature | 0.12017797 | Y Curvature | −0.022563097 |
| Y Radius | 8.320992621 | Y Radius | −44.32015633 |

TABLE 15-continued

| L1S1 | | L1S2 | |
|---|---|---|---|
| Y Conic Constant (KY) | −1 | Y Conic Constant (KY) | 73.93537684 |
| (AR) | 9.41E−05 | (AR) | 0.000106433 |
| (BR) | 1.81E−06 | (BR) | 4.91E−06 |
| (CR) | 1.58E−08 | (CR) | 3.01E−13 |
| (DR) | 1.73E−12 | (DR) | −3.64E−09 |
| X Conic Constant (KX) | −1 | X Conic Constant (KX) | 29.68003139 |
| (AP) | −0.07267156 | (AP) | 0.044389044 |
| (BP) | 0.290566346 | (BP) | 0.297340521 |
| (CP) | −0.091077223 | (CP) | 1.798047335 |
| (DP) | −0.755499118 | (DP) | 0.349508503 |

Figure 17A:
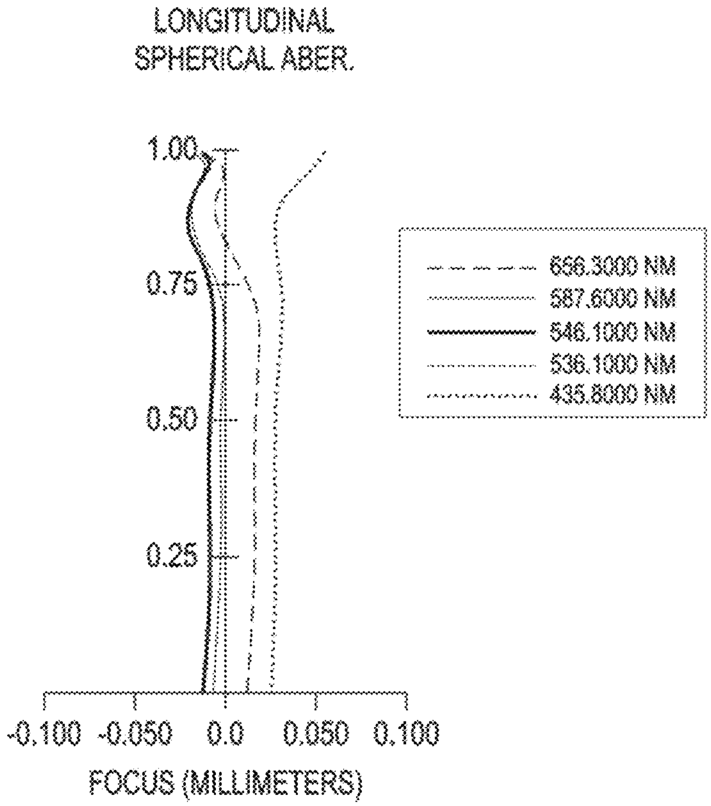
FIG. 17A is a graph illustrating spherical aberration of a lens assembly according to an embodiment.
Figure 17B:
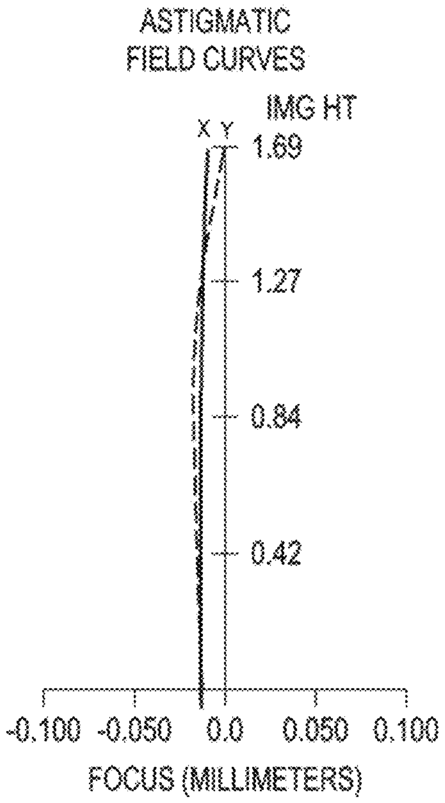
FIG. 17B is a graph illustrating astigmatism of a lens assembly according to an embodiment.
Figure 17C:
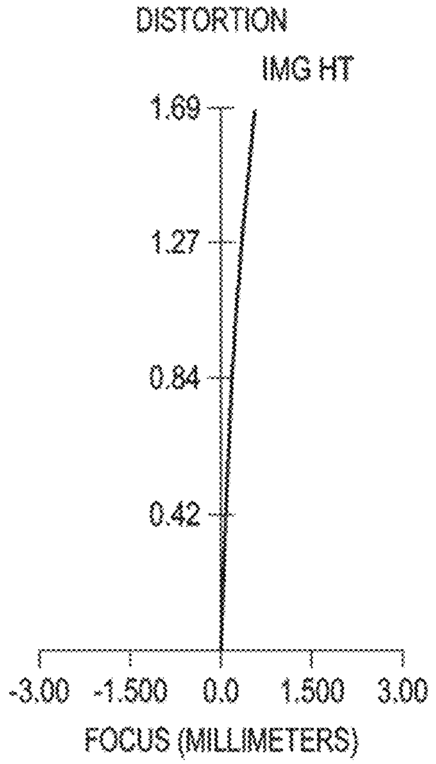
FIG. 17C is a graph illustrating distortion of a lens assembly according to an embodiment.
Figure 18A:
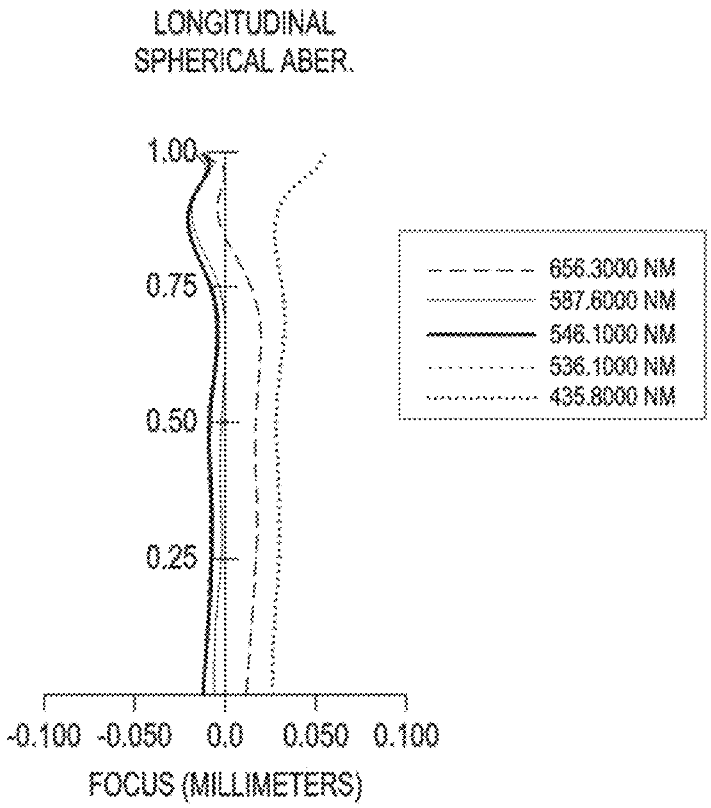
FIG. 18A is a graph illustrating spherical aberration of a lens assembly according to an embodiment.
Figure 18B:
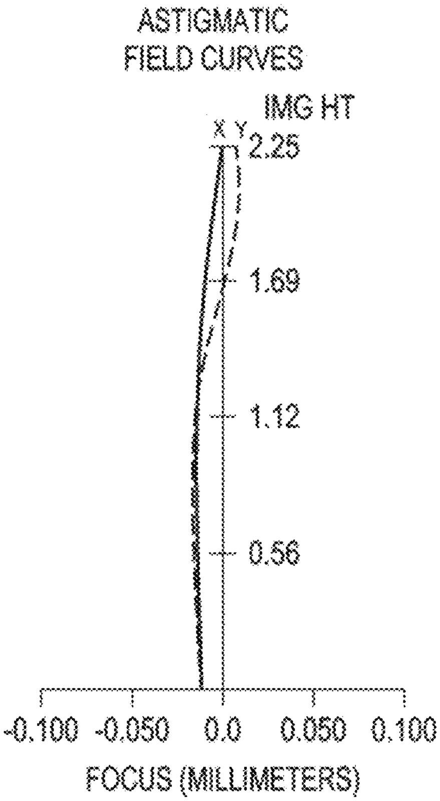
FIG. 18B is a graph illustrating astigmatism of a lens assembly according to an embodiment.
Figure 18C:
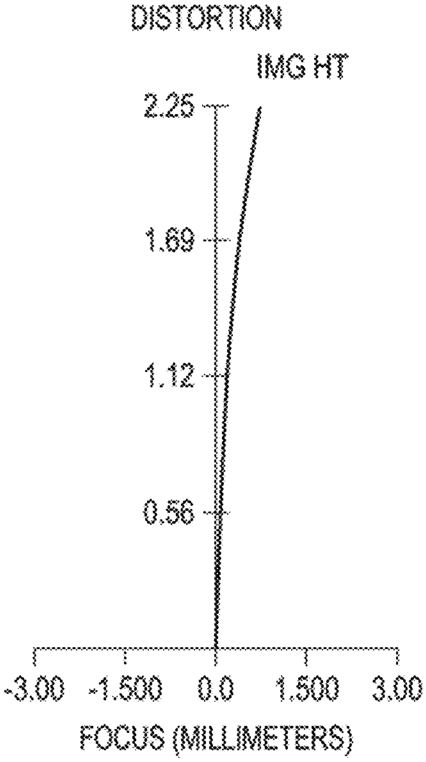
FIG. 18C is a graph illustrating distortion of a lens assembly according to an embodiment.

FIG. 16A is a diagram illustrating the configuration of the lens assembly 600 according to an embodiment. FIG. 16B is an exploded perspective view illustrating the lens assembly 600 of FIG. 16A. FIG. 17A is a graph illustrating spherical aberration of the lens assembly 600 according to an embodiment. FIG. 17B is a graph illustrating astigmatism of the lens assembly 600 according to an embodiment. FIG. 17C is a graph illustrating distortion of the lens assembly 600 according to an embodiment. FIG. 18A is a graph illustrating spherical aberration of the lens assembly 600 according to an embodiment. FIG. 18B is a graph illustrating astigmatism of the lens assembly 600 according to an embodiment. FIG. 18C is a graph illustrating distortion of the lens assembly 600 according to an embodiment. Referring to FIGS. 16A and 16B together, the lens assembly 600 according to another embodiment different from the embodiments of FIGS. 1A to 3C among the embodiments of the disclosure may include a plurality of lenses (e.g., L1, L2, L3, L4, L5, and L6), the image sensor IS, and/or the filter F. The lens assembly 600 according to the embodiment illustrated in FIGS. 16A and 16B may include a first lens L1 having a positive refractive power, a second lens L2 having a negative refractive power, a third lens L3 having a negative refractive power, a fourth lens L4 having a positive refractive power, a fifth lens L5 having a negative refractive power, and a sixth lens L6 having a positive refractive power. In the embodiment of FIGS. 16A and 16B, the W_Assy value for calculating Formula 5 may correspond to the distance from the object side surface S1 of the first lens L1 to the image side surface S14 of the sixth lens L6. According to an embodiment, a surface of at least one of the plurality of lenses (e.g., L1, L2, L3, L4, L5, and L6) may be formed to be aspheric. According to an embodiment, the first lens L1 may be implemented as an asymmetric lens, and spherical aberration that may occur in the lens may be prevented by implementing a surface of at least one of the remaining lenses of the plurality of lenses (e.g., L1, L2, L3, L4, L5, and L6) except the first lens L1 to be aspheric. For example, in the embodiment of FIGS. 16A and 16B, the object side surface S5 of the second lens L2, the object side surface S7 of the third lens L3, the image side surface S10 of the fourth lens L4, and the object side surface S13 of the sixth lens L6 may be formed to be aspheric. Table 16 below may list various lens data of the lens assembly 600 according to the embodiment of FIGS. 16A and 16B. Table 17 and Table 18 below may list aspheric coefficients of the plurality of lenses L1, L2, L3, L4, L5, and L6 and data for defining an asymmetric lens, respectively.

The lens assembly 600 included in Table 16 below may relate to a telephoto lens having an angle of view ANG of 16 degrees or less (a half angle of view XFOV of 8 degrees or less). Further, when the total EFL is 27.3 mm, the Fno is approximately 4.1, and the OTTL is 25.000 mm, the lens assembly 600 included in Table 16 below may satisfy the above-described conditions (and/or at least one of the above-described formulas).

TABLE 16

| surface | radius | Thickness (air gap) | EFL | nd | Vd |
|---|---|---|---|---|---|
| obj | infinity | infinity | | | |
| S1(sto) | L1S1 | 2.70000 | X:13.111Y:13.113 | 1.54196 | 56.16 |
| S2 | L1S2 | 0.83978 | | | |
| S3 | infinity | 4.03648 | | | |
| S4 | infinity | 0.27349 | | | |
| S5* | 105.62084 | 0.44000 | −12.450 | 1.63623 | 22.62 |
| S6 | 7.42778 | 0.53058 | | | |
| S7* | −110.29309 | 0.44000 | −4.691 | 1.64579 | 21.5 |
| S8 | 3.15494 | 0.10676 | | | |
| S9 | 3.25987 | 1.56046 | 5.022 | 1.53120 | 56.5 |
| S10* | 12.53250 | 0.80000 | | | |
| S11 | 6.61648 | 0.40000 | −6.000 | 1.57559 | 36 |
| S12 | 7.48696 | 0.41337 | | | |
| S13* | 10.66048 | 1.00000 | 6.349 | 1.68035 | 18.4 |
| S14 | −7.13572 | 7.70320 | | | |
| S15 | infinity | 0.30000 | infinity | 1.51680 | 64.17 |
| S16 | infinity | | | | |
| img | infinity | | | | |

TABLE 17

| | S5 | S7 | S10 | S13 |
|---|---|---|---|---|
| Radius | 1.05621E+02 | −1.10293E+02 | −1.25325E+01 | 1.06605E+01 |
| K(conic) | −1.00000E+00 | −1.00000E+00 | −1.00000E+00 | 3.40777E−02 |
| A($4^{th}$) | 2.62799E−04 | −9.86376E−04 | 1.27627E−03 | 1.87619E−05 |
| B($6^{th}$) | 3.06111E−04 | −1.98825E−04 | 1.79098E−04 | −4.46563E−06 |
| C($8^{th}$) | −6.24062E−05 | −3.47318E−05 | −9.87882E−05 | 3.52467E−06 |
| D($10^{th}$) | 7.36726E−06 | 2.61201E−05 | 2.52659E−05 | 2.18349E−07 |
| E($12^{th}$) | −1.24385E−06 | 4.59954E−08 | 4.13841E−07 | −3.07893E−07 |
| F($14^{th}$) | −2.11312E−09 | 6.25512E−09 | 6.50231E−08 | 0.00000E+00 |
| G($16^{th}$) | 0.00000E+00 | 0.00000E+00 | 0.00000E+00 | 0.00000E+00 |
| H($18^{th}$) | 0.00000E+00 | 0.00000E+00 | 0.00000E+00 | 0.00000E+00 |
| I($20^{th}$) | 0.00000E+00 | 0.00000E+00 | 0.00000E+00 | 0.00000E+00 |

TABLE 18

| L1S1 | | L1S2 | |
|---|---|---|---|
| X Curvature | 0.120183479 | X Curvature | 0.022534691 |
| X Radius | 8.32061117 | X Radius | 44.37602422 |
| Y Curvature | 0.120306859 | Y Curvature | 0.022375264 |
| Y Radius | 8.312078062 | Y Radius | −44.69221038 |
| Y Conic Constant (KY) | −1 | Y Conic Constant (KY) | 68.52394752 |
| (AR) | 9.53E−05 | (AR) | 0.000113732 |
| (BR) | 2.18E−06 | (BR) | 5.37E−06 |
| (CR) | 1.67E−08 | (CR) | 6.14E−11 |
| (DR) | 1.64E−11 | (DR) | −4.25E−09 |
| X Conic Constant (KX) | −1 | X Conic Constant (KX) | 26.64635318 |
| (AP) | 0.077053647 | (AP) | 0.0190927 |
| (BP) | 0.244437185 | (BP) | 0.259350709 |
| (CP) | −0.096189245 | (CP) | −2.495751121 |
| (DP) | −0.956789429 | (DP) | 0.23908542 |

Figure 19A:
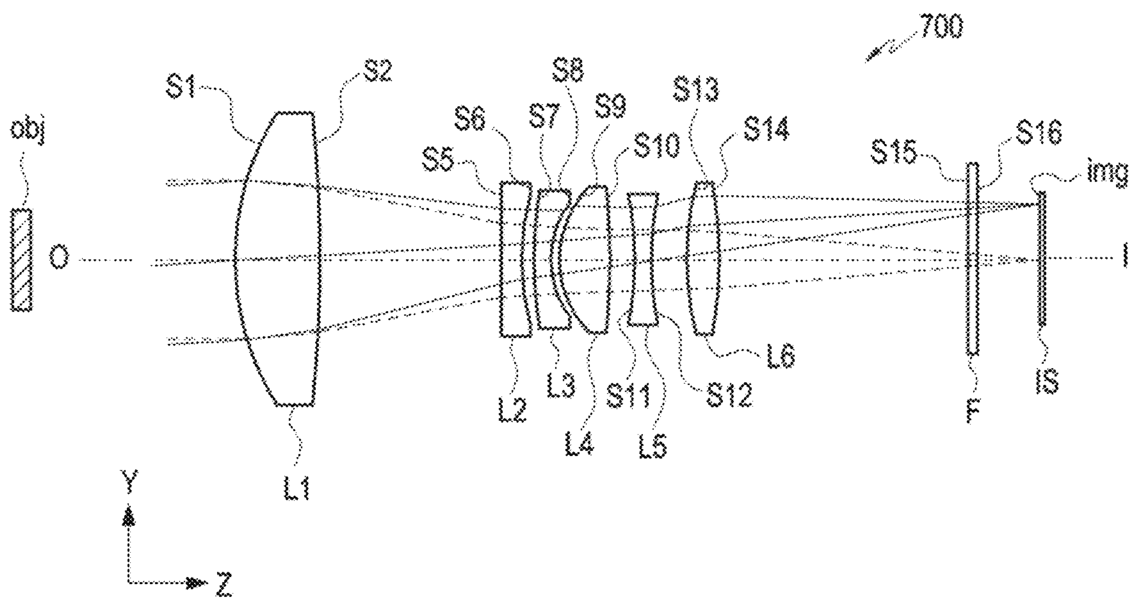
FIG. 19A is a diagram illustrating the configuration of a lens assembly according to an embodiment.
Figure 19B:
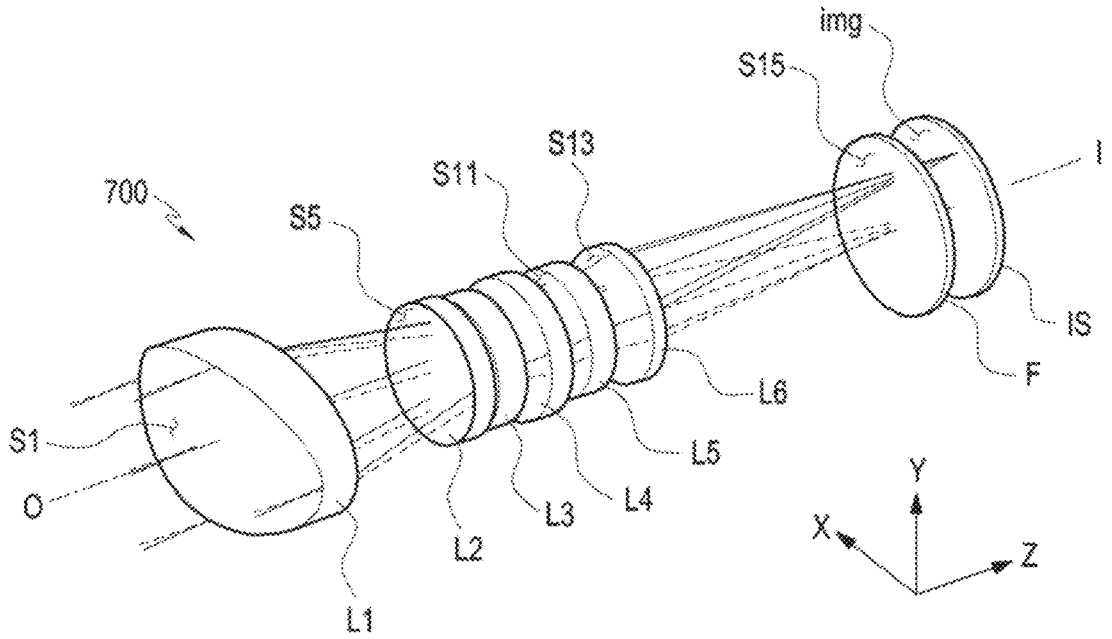
FIG. 19B is an exploded perspective view illustrating the lens assembly of FIG. 19A.
Figure 20A:
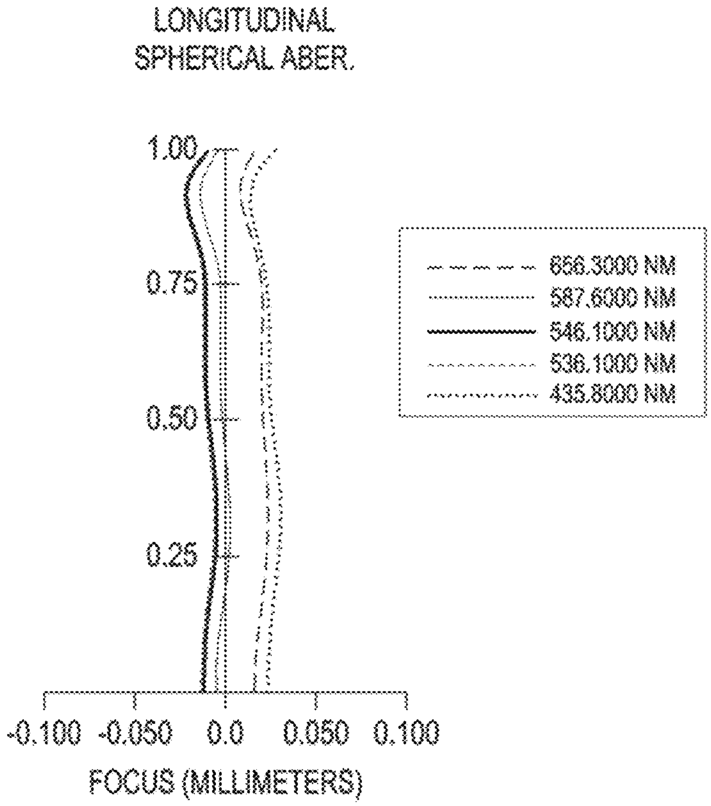
FIG. 20A is a graph illustrating spherical aberration of a lens assembly according to an embodiment.
Figure 20B:
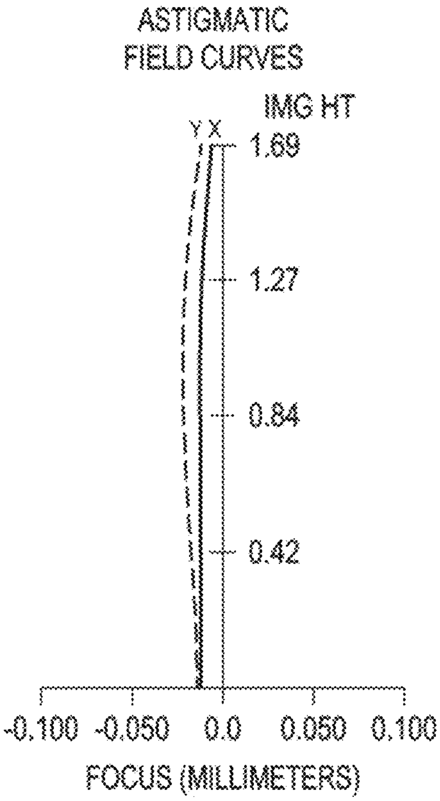
FIG. 20B is a graph illustrating astigmatism of a lens assembly according to an embodiment.
Figure 20C:
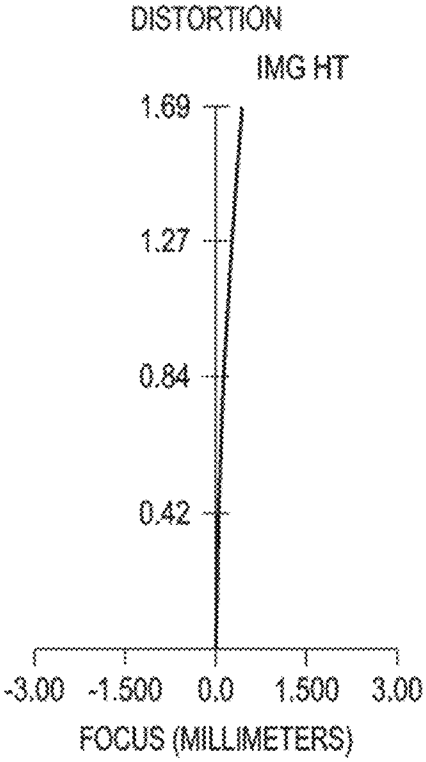
FIG. 20C is a graph illustrating distortion of a lens assembly according to an embodiment.
Figure 21A:
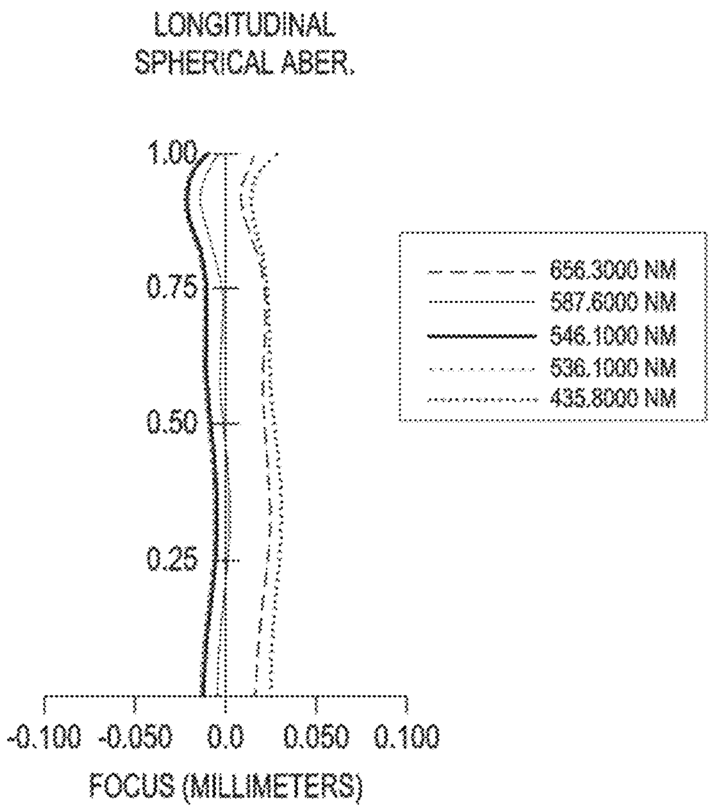
FIG. 21A is a graph illustrating spherical aberration of a lens assembly according to an embodiment.
Figure 21B:
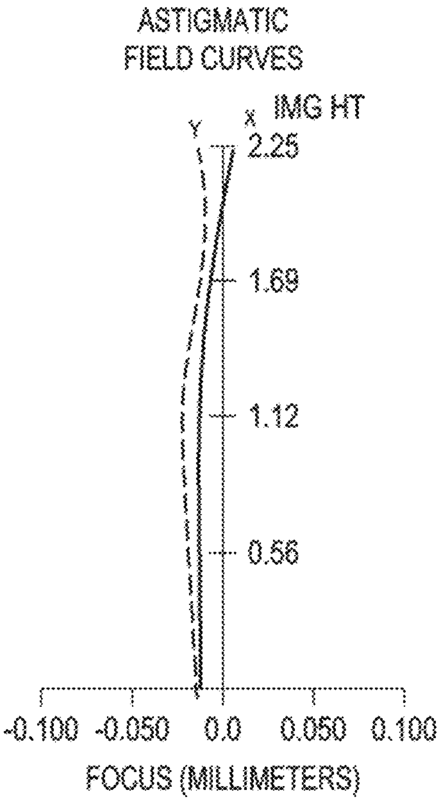
FIG. 21B is a graph illustrating astigmatism of a lens assembly according to an embodiment.
Figure 21C:
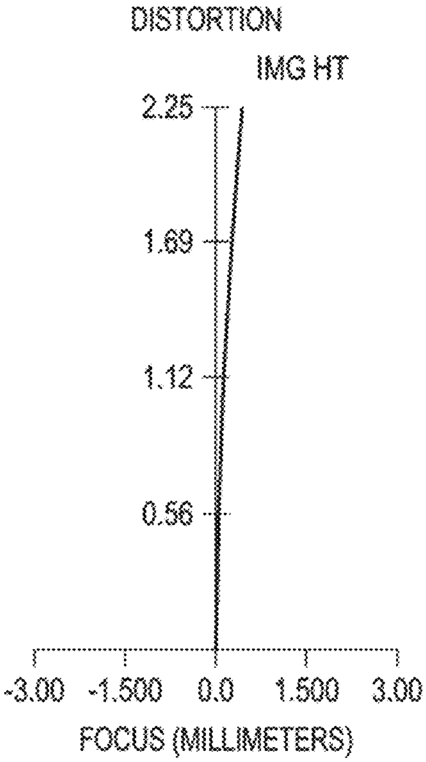
FIG. 21C is a graph illustrating distortion of a lens assembly according to an embodiment.

FIG. 19A is a diagram illustrating the configuration of the lens assembly 700 according to an embodiment. FIG. 19B is an exploded perspective view illustrating the lens assembly 700 of FIG. 19A. FIG. 20A is a graph illustrating spherical aberration of the lens assembly 700 according to an embodiment. FIG. 20B is a graph illustrating astigmatism of the lens assembly 700 according to an embodiment. FIG. 20C is a graph illustrating distortion of the lens assembly 700 according to an embodiment. FIG. 21A is a graph illustrating spherical aberration of the lens assembly 700 according to an embodiment. FIG. 21B is a graph illustrating astigmatism of the lens assembly 700 according to an embodiment. FIG. 21C is a graph illustrating distortion of the lens assembly 700 according to an embodiment. Referring to FIGS. 19A and 19B together, the lens assembly 700 according to another embodiment different from the embodiments of FIGS. 1A to 3C among the embodiments of the disclosure may include a plurality of lenses (e.g., L1, L2, L3, L4, L5, and L6), the image sensor IS, and/or the filter F. The lens assembly 700 according to the embodiment illustrated in FIGS. 19A and 19B may include a first lens L1 having a positive refractive power, a second lens L2 having a negative refractive power, a third lens L3 having a negative refractive power, a fourth lens L4 having a positive refractive power, a fifth lens L5 having a negative refractive power, and a sixth lens L6 having a positive refractive power. In the embodiment of FIGS. 19A and 19B, the W_Assy value for calculating Formula 5 may correspond to the distance from the object side surface S1 of the first lens L1 to the image side surface S14 of the sixth lens L6. According to an embodiment, a surface of at least one of the plurality of lenses (e.g., L1, L2, L3, L4, L5, and L6) may be formed to be aspheric. According to an embodiment, the first lens L1 may be implemented as an asymmetric lens, and spherical aberration that may occur in the lens may be prevented by implementing a surface of at least one of the remaining lenses of the plurality of lenses (e.g., L1, L2, L3, L4, L5, and L6) except the first lens L1 to be aspheric. For example, in the embodiment of FIGS. 19A and 19B, the object side surface S5 of the second lens L2, the object side surface S7 of the third lens L3, the image side surface S10 of the fourth lens L4, and the object side surface S13 of the sixth lens L6 may be formed to be aspheric. Table 19 below may list various lens data of the lens assembly 700 according to the embodiment of FIGS. 19A and 19B. Table 20 and Table 21 below may list aspheric coefficients of the plurality of lenses L1, L2, L3, L4, L5, and L6 and data for defining an asymmetric lens, respectively.

The lens assembly 700 included in Table 19 below may relate to a telephoto lens having an angle of view ANG of 16 degrees or less (a half angle of view XFOV of 8 degrees or less). Further, when the total EFL is 27.3 mm, the Fno is approximately 4.1, and the OTTL is 25.000 mm, the lens assembly 700 included in Table 19 below may satisfy the above-described conditions (and/or at least one of the above-described formulas).

TABLE 19

| surface | radius | Thickness (air gap) | EFL | nd | Vd |
|---|---|---|---|---|---|
| obj | infinity | infinity | | | |
| S1(sto) | L1S1 | 2.70000 | X:13.373Y:13.374 | 1.53120 | 56.5 |
| S2 | L1S2 | 0.97701 | | | |
| S3 | infinity | 4.17370 | | | |
| S4 | infinity | 0.41071 | | | |
| S5* | 236.46248 | 0.60213 | −11.905 | 1.62479 | 23.4 |
| S6 | 7.27426 | 0.44423 | | | |
| S7* | 26.61445 | 0.46521 | −5.504 | 1.63851 | 21.84 |
| S8 | 3.11253 | 0.30000 | | | |
| S9 | 3.25766 | 1.56046 | 5.194 | 1.53120 | 56.5 |
| S10* | 15.44984 | 0.80000 | | | |
| S11 | 8.02627 | 0.40000 | −5.978 | 1.58845 | 31.71 |
| S12 | 6.46338 | 1.19834 | | | |
| S13* | 10.13466 | 1.00000 | 7.446 | 1.68035 | 18.4 |
| S14 | −9.97154 | 7.70320 | | | |

TABLE 19-continued

| surface | radius | Thickness (air gap) | EFL | nd | Vd |
|---|---|---|---|---|---|
| S15 | infinity | 0.30000 | infinity | 1.51680 | 64.17 |
| S16 | infinity | 1.91428 | | | |
| img | infinity | 0.0153 | | | |

TABLE 20

| | S5 | S7 | S10 | S13 |
|---|---|---|---|---|
| Radius | 2.36463E+02 | 2.66145E+01 | −1.54498E+01 | 1.01347E+01 |
| K(conic) | −1.00000E+00 | −1.00000E+00 | −1.00000E+00 | −1.11944E+00 |
| A(4th) | 3.43160E−04 | −8.48645E−04 | −1.25234E−03 | −1.57901E−04 |
| B(6th) | 3.15790E−04 | −1.90746E−04 | 2.31198E−04 | −1.25899E−05 |
| C(8th) | 6.15426E−05 | −3.98690E−05 | −6.99399E−05 | 2.54105E−07 |
| D(10th) | 7.51977E−06 | 2.57258E−05 | 2.35820E−05 | 2.46188E−07 |
| E(12th) | −1.20235E−06 | 4.29143E−07 | −4.13841E−07 | −1.35858E−07 |
| F(14th) | 6.76154E−09 | 6.25512E−09 | 6.50231E−08 | 0.00000E+00 |
| G(16th) | 0.00000E+00 | 0.00000E+00 | 0.00000E+00 | 0.00000E+00 |
| H(18th) | 0.00000E+00 | 0.00000E+00 | 0.00000E+00 | 0.00000E+00 |
| I(20th) | 0.00000E+00 | 0.00000E+00 | 0.00000E+00 | 0.00000E+00 |

TABLE 21

| L1S1 | | L1S2 | |
|---|---|---|---|
| X Curvature | 0.12020895 | X Curvature | −0.022509613 |
| X Radius | 8.318848115 | X Radius | −44.4254637 |
| Y Curvature | 0.120305633 | Y Curvature | −0.022395607 |
| Y Radius | 8.312162722 | Y Radius | −44.65161499 |
| Y Conic Constant (KY) | −1 | Y Conic Constant (KY) | 65.2492628 |
| (AR) | 9.59E−05 | (AR) | 0.000116931 |
| (BR) | 2.27E−06 | (BR) | 5.41E−06 |
| (CR) | 2.05E−08 | (CR) | 6.40E−11 |
| (DR) | 1.50E−11 | (DR) | −4.53E−09 |
| X Conic Constant (KX) | −1 | X Conic Constant (KX) | 25.57520304 |
| (AP) | −0.078479726 | (AP) | 0.009059988 |
| (BP) | 0.224707521 | (BP) | 0.254210263 |
| (CP) | −0.106783331 | (CP) | 2.48698101 |
| (DP) | −0.911974301 | (DP) | 0.301175311 |

Figure 22A:
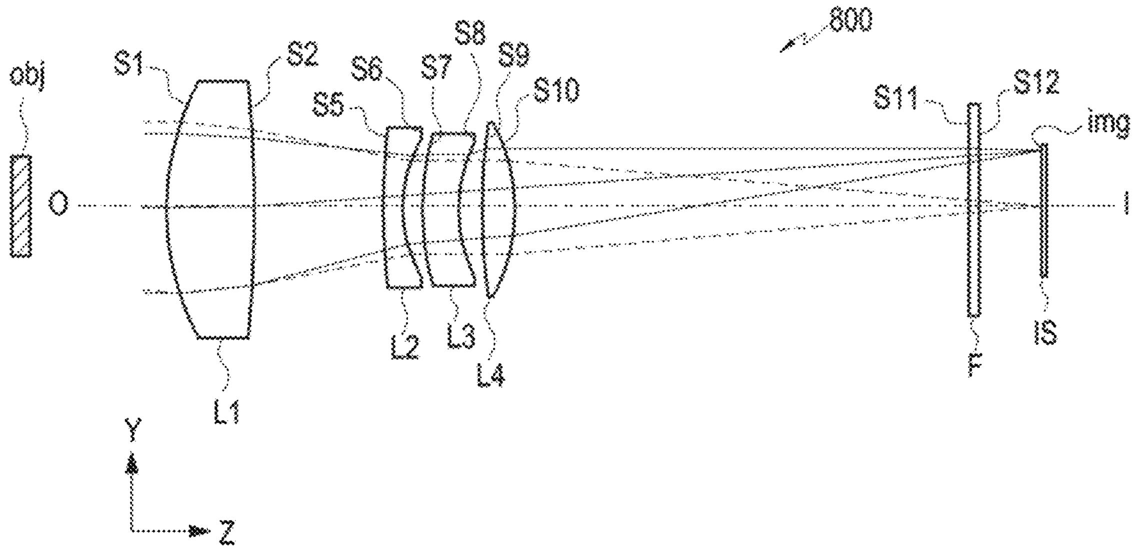
FIG. 22A is a diagram illustrating the configuration of a lens assembly according to an embodiment.
Figure 22B:
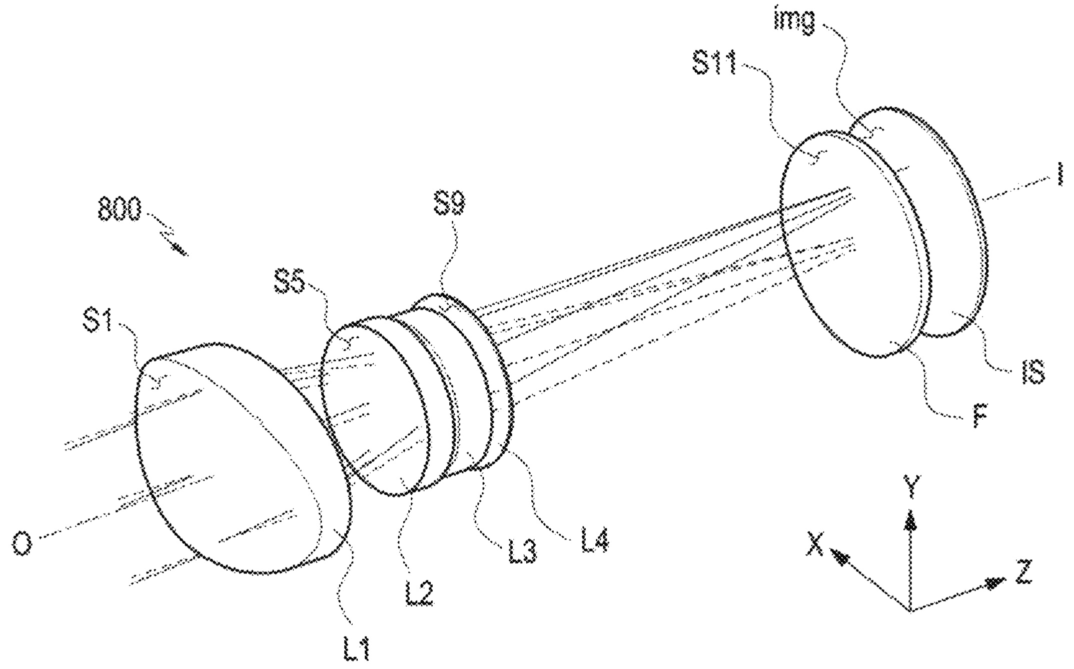
FIG. 22B is an exploded perspective view illustrating the lens assembly of FIG. 22A.
Figure 23A:
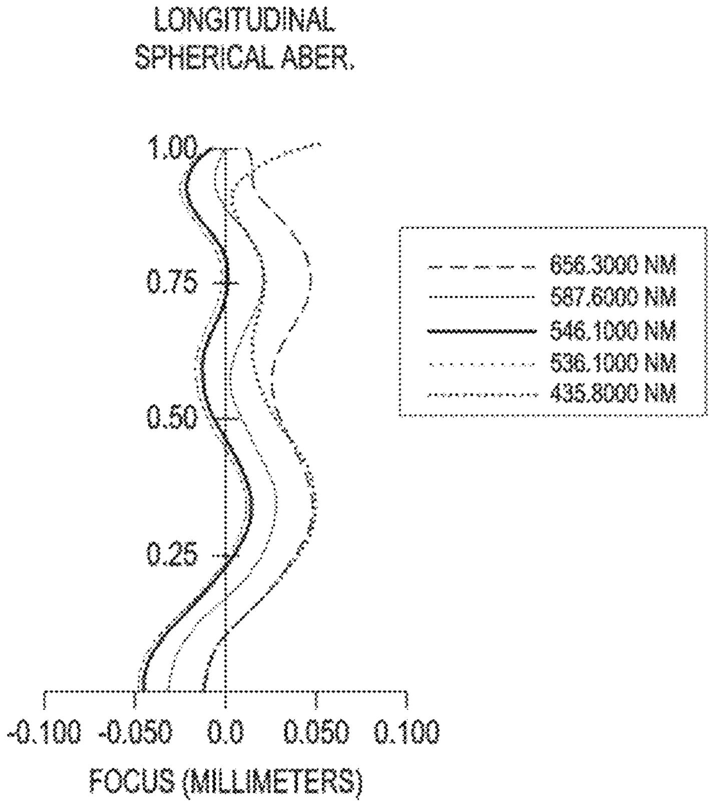
FIG. 23A is a graph illustrating spherical aberration of a lens assembly according to an embodiment.
Figure 23B:
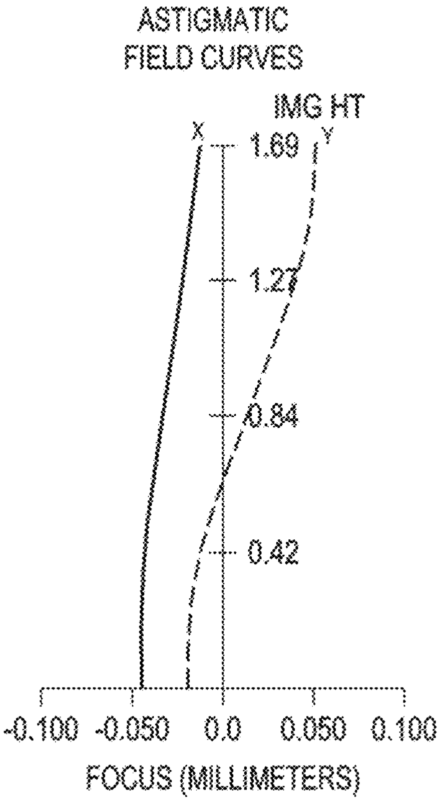
FIG. 23B is a graph illustrating astigmatism of a lens assembly according to an embodiment.
Figure 23C:
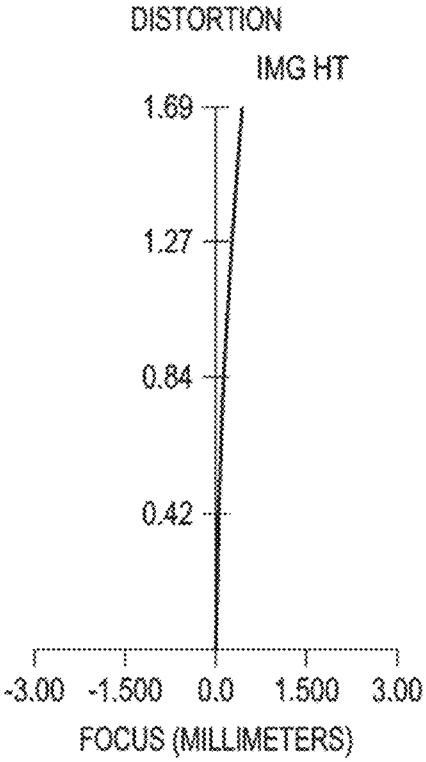
FIG. 23C is a graph illustrating distortion of a lens assembly according to an embodiment.
Figure 24A:
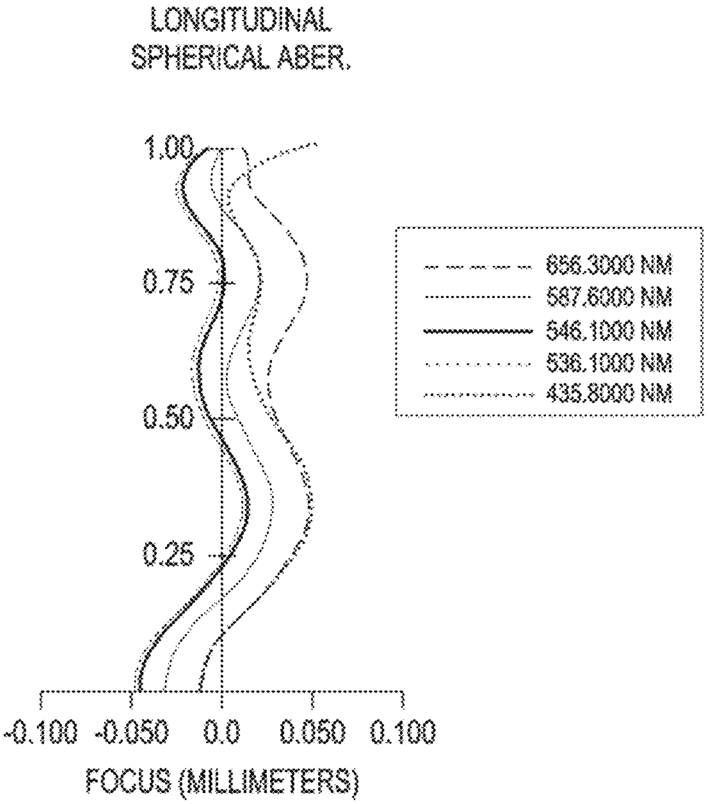
FIG. 24A is a graph illustrating spherical aberration of a lens assembly according to an embodiment.
Figure 24B:
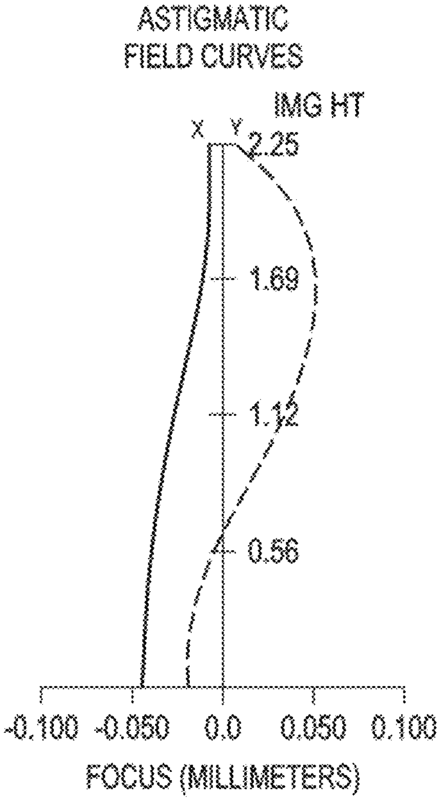
FIG. 24B is a graph illustrating astigmatism of a lens assembly according to an embodiment.
Figure 24C:
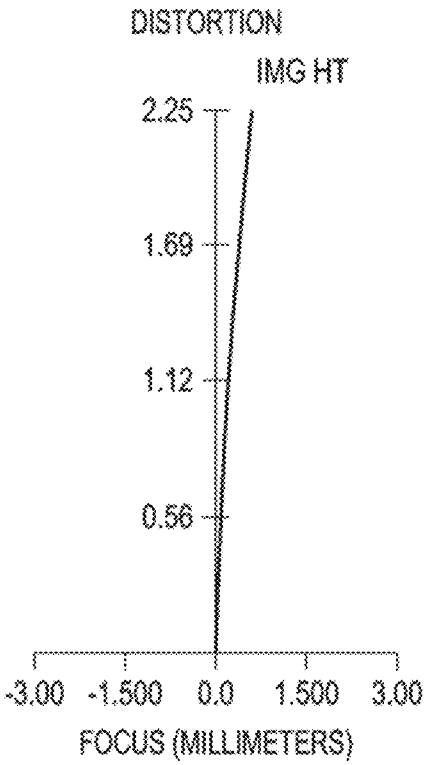
FIG. 24C is a graph illustrating distortion of a lens assembly according to an embodiment.

FIG. 22A is a diagram illustrating the configuration of the lens assembly 800 according to an embodiment. FIG. 22B is an exploded perspective view illustrating the lens assembly 800 of FIG. 22A. FIG. 23A is a graph illustrating spherical aberration of the lens assembly 800 according to an embodiment. FIG. 23B is a graph illustrating astigmatism of the lens assembly 800 according to an embodiment. FIG. 23C is a graph illustrating distortion of the lens assembly 800 according to an embodiment. FIG. 24A is a graph illustrating spherical aberration of the lens assembly 800 according to an embodiment. FIG. 24B is a graph illustrating astigmatism of the lens assembly 800 according to an embodiment. FIG. 24C is a graph illustrating distortion of the lens assembly 800 according to an embodiment. Referring to FIGS. 22A and 22B together, the lens assembly 800 according to another embodiment different from the embodiments of FIGS. 1A to 3C among the embodiments of the disclosure may include a plurality of lenses (e.g., L1, L2, L3, and L4), the image sensor IS, and/or the filter F. The lens assembly 800 according to the embodiment illustrated in FIGS. 22A and 22B may include a first lens L1 having a positive refractive power, a second lens L2 having a negative refractive power, a third lens L3 having a negative refractive power, and a fourth lens L4 having a positive refractive power. In the embodiment of FIGS. 22A and 22B, the W_Assy value for calculating Formula 5 may correspond to the distance from the object side surface S1 of the first lens L1 to the image side surface S10 of the fourth lens L4. According to an embodiment, a surface of at least one of the plurality of lenses (e.g., L1, L2, L3, and L4) may be formed to be aspheric. According to an embodiment, the first lens L1 may be implemented as an asymmetric lens, and spherical aberration that may occur in a lens may be prevented by implementing a surface of at least one of the remaining lenses of the plurality of lenses (e.g., L1, L2, L3, and L4) except the first lens L1 to be aspheric. For example, in the embodiment of FIGS. 22A and 22B, the object side surface S5 and image side surface S6 of the second lens L2, the object side surface S7 and image side surface S8 of the third lens L3, and the object side surface S9 and image side surface S10 of the fourth lens L4 may be formed to be aspheric. Table 22 below may list various lens data of the lens assembly 800 according to the embodiment of FIGS. 22A and 22B. Table 23 and Table 24 below may list aspheric coefficients of the plurality of lenses L1, L2, L3, and L4 and data for defining an asymmetric lens, respectively.

The lens assembly 800 included in Table 22 below may relate to a telephoto lens having an angle of view ANG of 16 degrees or less (a half angle of view XFOV of 8 degrees or less). Further, when the total EFL is 27.3 mm, the Fno is approximately 3.792, and the OTTL is 25.000 mm, the lens assembly 800 included in Table 22 below may satisfy the above-described conditions (and/or at least one of the above-described formulas).

TABLE 22

| surface | radius | Thickness (air gap) | EFL | nd | Vd |
|---|---|---|---|---|---|
| obj | infinity | infinity | | | |
| S1(sto) | 8.01325 | 2.50000 | X:12.214Y:12.206 | 1.53480 | 55.71 |
| S2 | −32.11622 | 0.25027 | | | |
| S3 | infinity | 3.31696 | | | |
| S4 | infinity | 0.13529 | | | |
| S5* | 11.12574 | 0.50000 | −8.745 | 1.67220 | 18.95 |
| S6* | 3.80661 | 0.63943 | | | |
| S7* | 26.18141 | 1.00000 | 13.399 | 1.59546 | 27.98 |
| S8* | 6.06651 | 0.74230 | | | |
| S9* | −189.22662 | 0.85618 | 19.640 | 1.61212 | 25.13 |
| S10* | −5.78454 | 14 | | | |
| S11 | infinity | 0.30000 | infinity | 1.51680 | 64.17 |
| S12 | infinity | | | | |
| img | infinity | | | | |

TABLE 23

| | S5 | S6 | S7 | S8 | S9 | S10 |
|---|---|---|---|---|---|---|
| Radius | 1.11257E+01 | 3.80661E+00 | 2.61814E+01 | 6.06651E+00 | −1.89227E+02 | −5.78454E+00 |
| K(conic) | −1.00000E+00 | 1.37163E+00 | 5.47935E+01 | −1.00000E+00 | −1.00000E+00 | −1.00000E+00 |
| A($4^{th}$) | 3.77098E−04 | 1.93737E−03 | 2.66078E−03 | 1.03859E−03 | 3.61883E−04 | −2.45226E−03 |
| B($6^{th}$) | 2.15874E−04 | 1.77660E−04 | 7.86121E−04 | 9.31464E−04 | 3.72773E−04 | −2.04090E−04 |
| C($8^{th}$) | −6.68253E−05 | 1.21680E−04 | −1.11759E−04 | 2.81848E−04 | 7.89625E−05 | −2.28689E−05 |
| D($10^{th}$) | −1.03405E−05 | −7.58718E−05 | 3.17314E−05 | −6.07471E−05 | 3.33828E−06 | 7.49817E−06 |
| E($12^{th}$) | 0.00000E+00 | 4.46909E−07 | −6.82742E−07 | 6.82973E−06 | −8.15749E−07 | −5.88158E−07 |
| F($14^{th}$) | 0.00000E+00 | 1.67818E−07 | 2.41793E−09 | −3.84453E−07 | −1.08678E−07 | −4.28949E−08 |
| G($16^{th}$) | 0.00000E+00 | 0.00000E+00 | 0.00000E+00 | 1.03443E−08 | 6.41339E−10 | 3.63937E−09 |
| H($18^{th}$) | 0.00000E+00 | 0.00000E+00 | 0.00000E+00 | 0.00000E+00 | 0.00000E+00 | −6.59729E−10 |
| I($20^{th}$) | 0.00000E+00 | 0.00000E+00 | 0.00000E+00 | 0.00000E+00 | 0.00000E+00 | 0.00000E+00 |

TABLE 24

| L1S1 | | L1S2 | |
|---|---|---|---|
| X Curvature | 0.12596935 | X Curvature | 0.02973568 |
| X Radius | 7.938438982 | X Radius | −33.62963298 |
| Y Curvature | 0.12479336 | Y Curvature | −0.031136911 |
| Y Radius | 8.013246833 | Y Radius | −32.11622421 |
| Y Conic Constant (KY) | −0.548092265 | Y Conic Constant (KY) | 0.938113353 |
| (AR) | 1.24116E−07 | (AR) | 1.51184E−04 |
| (BR) | 1.57888E−08 | (BR) | 7.79230E−06 |
| (CR) | 1.59371E−07 | (CR) | 2.10641E−08 |
| (DR) | 7.38908E−09 | (DR) | 9.79158E−10 |
| X Conic Constant (KX) | 0.277450034 | X Conic Constant (KX) | −27.32520443 |
| (AP) | 1.077704809 | (AP) | 0.020307037 |
| (BP) | 1.115179252 | (BP) | −0.06004283 |
| (CP) | 0.093106935 | (CP) | 0.895946198 |
| (DP) | −0.236992691 | (DP) | 0.812536149 |

Figure 25A:
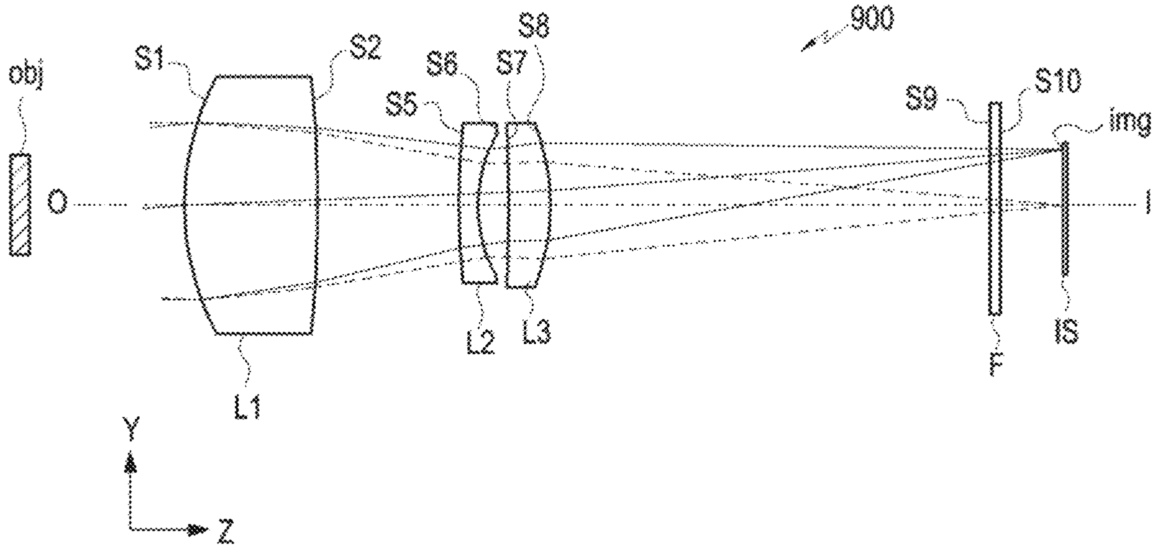
FIG. 25A is a diagram illustrating the configuration of a lens assembly according to an embodiment.
Figure 25B:
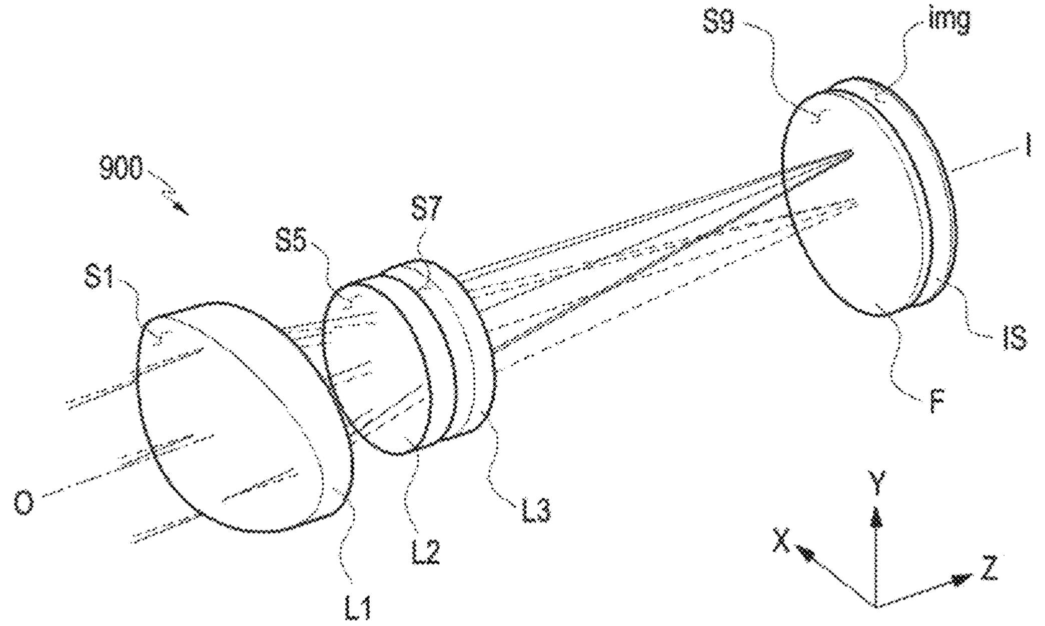
FIG. 25B is an exploded perspective view illustrating the lens assembly of FIG. 25A.
Figure 26A:
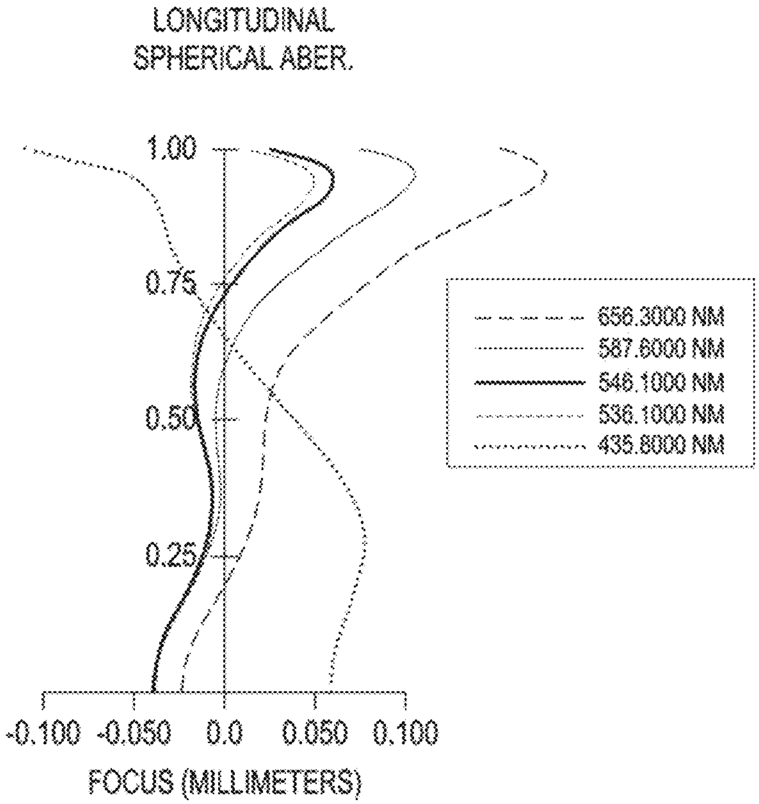
FIG. 26A is a graph illustrating spherical aberration of a lens assembly according to an embodiment.
Figure 26B:
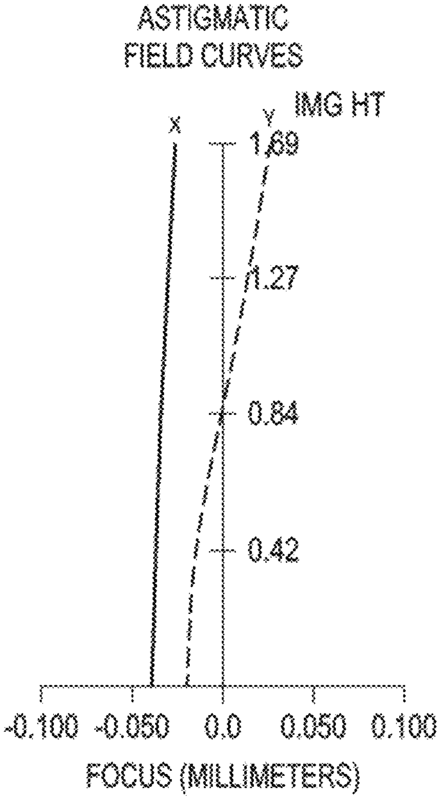
FIG. 26B is a graph illustrating astigmatism of a lens assembly according to an embodiment.
Figure 26C:
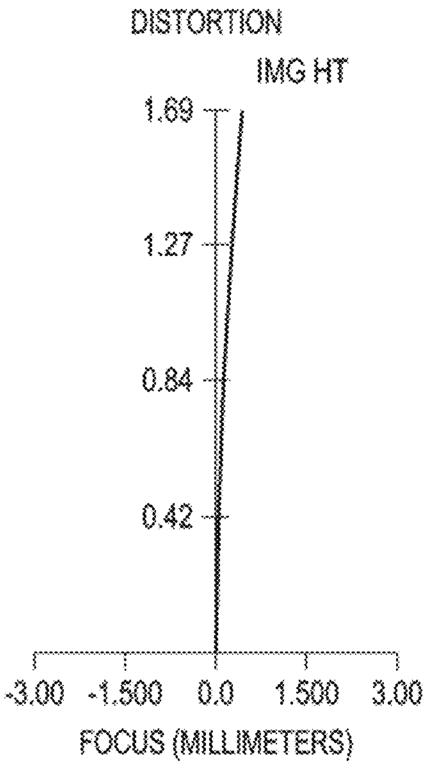
FIG. 26C is a graph illustrating distortion of a lens assembly according to an embodiment.
Figure 27A:
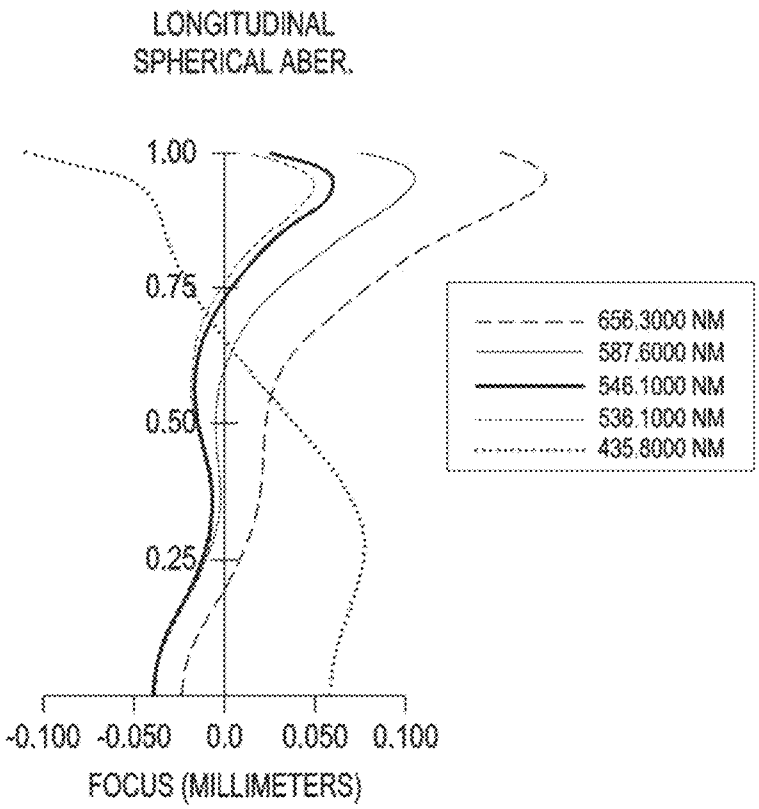
FIG. 27A is a graph illustrating spherical aberration of a lens assembly according to an embodiment.
Figure 27B:
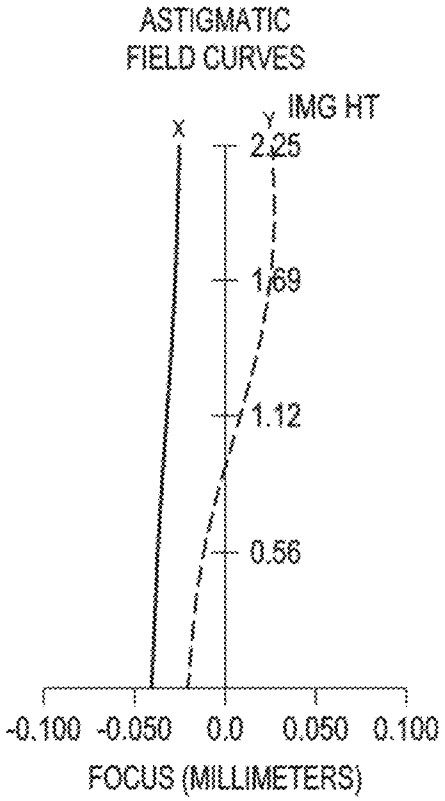
FIG. 27B is a graph illustrating astigmatism of a lens assembly according to an embodiment.
Figure 27C:
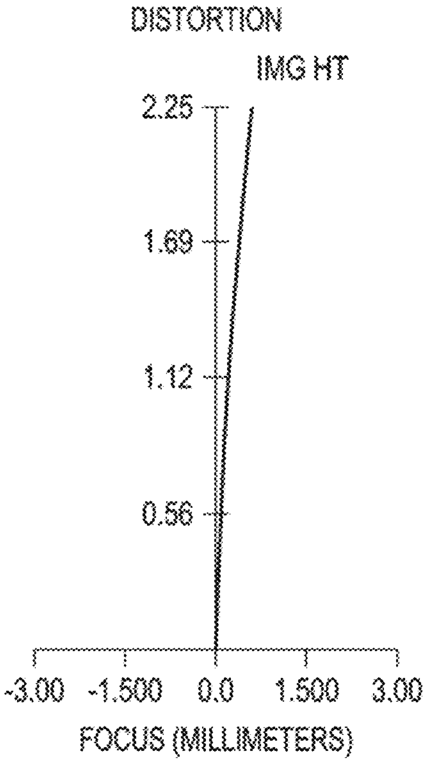
FIG. 27C is a graph illustrating distortion of a lens assembly according to an embodiment.

FIG. 25A is a diagram illustrating the configuration of the lens assembly 900 according to an embodiment. FIG. 25B is an exploded perspective view illustrating the lens assembly 900 of FIG. 25A. FIG. 26A is a graph illustrating spherical aberration of the lens assembly 900 according to an embodiment. FIG. 26B is a graph illustrating astigmatism of the lens assembly 900 according to an embodiment. FIG. 26C is a graph illustrating distortion of the lens assembly 900 according to an embodiment. FIG. 27A is a graph illustrating spherical aberration of the lens assembly 900 according to an embodiment. FIG. 27B is a graph illustrating astigmatism of the lens assembly 900 according to an embodiment. FIG. 27C is a graph illustrating distortion of the lens assembly 900 according to an embodiment. Referring to FIGS. 25A and 25B together, the lens assembly 900 according to another embodiment different from the embodiments of FIGS. 1A to 3C among the embodiments of the disclosure may include a plurality of lenses (e.g., L1, L2, and L3), the image sensor IS, and/or the filter F. The lens assembly 900 according to the embodiment illustrated in FIGS. 25A and 25B may include a first lens L1 having a positive refractive power, a second lens L2 having a negative refractive power, and a third lens L3 having a positive refractive power. In the embodiment of FIGS. 25A and 25B, the W_Assy value for calculating Formula 5 may correspond to the distance from the object side surface S1 of the first lens L1 to the image side surface S8 of the third lens L3. According to one or more embodiments, a surface of at least one of the plurality of lenses (e.g., L1, L2, and L3) may be formed to be aspheric. According to one or more embodiments, the first lens L1 may be implemented as an asymmetric lens, and spherical aberration that may occur in the lens may be prevented by implementing a surface of at least one of the remaining lenses of the plurality of lenses (e.g., L1, L2, and L3) except the first lens L1 to be aspheric. For example, in the embodiment of FIGS. 25A and 25B, the object side surface S5 and image side surface S6 of the second lens L2 and the object side surface S7 and image side surface S8 of the third lens L3 may be formed to be aspheric. Table 25 below may list various lens data of the lens assembly 900 according to the embodiment of FIGS. 25A and 25B. Table 26 and Table 27 below may list aspheric coefficients of the plurality of lenses L1, L2, and L3 and data for defining an asymmetric lens, respectively.

The lens assembly 900 included in Table 25 below may relate to a telephoto lens having an angle of view ANG of 16 degrees or less (a half angle of view XFOV of 8 degrees or less). Further, when the total EFL is 27.3 mm, the Fno is approximately 3.689, and the OTTL is 25.000 mm, the lens assembly 900 included in Table 25 below may satisfy the above-described conditions (and/or at least one of the above-described formulas).

TABLE 25

| surface | radius | Thickness (air gap) | EFL | nd | Vd |
|---|---|---|---|---|---|
| obj | infinity | infinity | | | |
| S1(sto) | 8.20375 | 3.62820 | X:13.844Y:13.804 | 1.49822 | 69.05 |
| S2 | −37.05878 | 0.27031 | | | |
| S3 | infinity | 3.33709 | | | |
| S4 | infinity | 0.24993 | | | |
| S5* | 11.67071 | 0.40886 | −8.812 | 1.66815 | 19.35 |
| S6* | 3.88923 | 0.99380 | | | |
| S7* | 15.31252 | 1.09233 | 20.052 | 1.67230 | 18.94 |
| S8* | −7.42469 | 14 | | | |
| S9 | infinity | 0.30000 | infinity | 1.51680 | 64.17 |
| S10 | infinity | | | | |
| img | infinity | | | | |

TABLE 26

| | S5 | S6 | S7 | S8 |
|---|---|---|---|---|
| Radius | 1.16707E+01 | 3.88923E+00 | −1.53125E+01 | −7.42469E+00 |
| K(conic) | −1.00000E+00 | 1.34268E+00 | 1.00000E+00 | 1.00000E+00 |
| A($4^{th}$) | 7.81539E−04 | 1.00393E−03 | 9.30588E−04 | 2.04300E−03 |
| B($6^{th}$) | 1.02465E−04 | −1.04217E−05 | 3.05773E−04 | 1.14706E−04 |
| C($8^{th}$) | −7.68063E−05 | 1.59223E−04 | 6.71845E−05 | 1.31771E−05 |
| D($10^{th}$) | −9.78257E−06 | −7.15854E−05 | 3.05985E−06 | 7.96728E−06 |
| E($12^{th}$) | 0.00000E+00 | 5.69698E−07 | 4.75606E−07 | −7.87926E−07 |
| F($14^{th}$) | 0.00000E+00 | 5.94696E−08 | 8.67243E−09 | −1.09559E−07 |
| G($16^{th}$) | 0.00000E+00 | 0.00000E+00 | 8.35704E−09 | −1.33910E−09 |
| H($18^{th}$) | 0.00000E+00 | 0.00000E+00 | 0.00000E+00 | 3.70564E−09 |
| I($20^{th}$) | 0.00000E+00 | 0.00000E+00 | 0.00000E+00 | 0.00000E+00 |

TABLE 27

| L1S1 | | L1S2 | |
|---|---|---|---|
| X Curvature | 0.124201551 | X Curvature | 0.02387214 |
| X Radius | 8.051429261 | X Radius | −41.88983519 |
| Y Curvature | 0.121895462 | Y Curvature | −0.026984158 |
| Y Radius | 8.20375082 | Y Radius | −37.05878156 |
| Y Conic Constant (KY) | 0.649451103 | Y Conic Constant (KY) | 3.954270541 |
| (AR) | 2.69862E−07 | (AR) | −9.66209E−05 |
| (BR) | −4.44042E−06 | (BR) | −1.58214E−07 |
| (CR) | −2.69532E−08 | (CR) | −5.50621E−08 |
| (DR) | −2.12763E−08 | (DR) | −1.09737E−09 |
| X Conic Constant (KX) | 0.193899668 | X Conic Constant (KX) | 32.18566155 |
| (AP) | 2.748442684 | (AP) | −0.410736511 |
| (BP) | 0.101007609 | (BP) | −2.185759985 |

TABLE 27-continued

| L1S1 | | L1S2 | |
|---|---|---|---|
| (CP) | 1.209906218 | (CP) | −1.612430253 |
| (DP) | 0.101797796 | (DP) | −1.237663259 |

Referring to the graphs of longitudinal spherical aberration illustrated in FIGS. 26A and 27A, it may be noted that as the distance from the center of the optical axis increases, the spherical aberration of the lens assembly 900 changes rapidly in some wavelength bands (e.g., 656.3000 NM and 435.8000 NM). Compared to the graphs of longitudinal spherical aberration in the above-described embodiments (e.g., FIGS. 2A, 3A, 5A, 6A, 8A, 9A, 11A, 12A, 14A, 15A, 17A, 18A, 20A, 21A, 23A, and 24A), a lens assembly including four or more lenses may be more advantageous than a lens assembly including three or more lenses in controlling the longitudinal spherical aberration in some wavelength bands. In the above-described embodiments, various data about lenses may be identified in a lens assembly (e.g., 100, 200, 300, 400, 500, 600, 700, 800, or 900) and/or an electronic device including the lens assembly (e.g., 100, 200, 300, 400, 500, 600, 700, 800, or 900). These data may satisfy the results of the above-described conditions.

TABLE 28

| | EFL/W_Assy | \|f1/f2\| | DY_L1S1 | DX_L1S1 | DY_L1/F1 |
|---|---|---|---|---|---|
| Embodiment 1 | 1.80 | 0.47 | 2.50 | 4.40 | 0.19 |
| Embodiment 2 | 1.94 | 0.72 | 2.50 | 4.40 | 0.19 |
| Embodiment 3 | 1.82 | 1.54 | 2.50 | 4.40 | 0.19 |
| Embodiment 4 | 1.76 | 1.35 | 2.50 | 4.40 | 0.19 |
| Embodiment 5 | 1.68 | 1.32 | 2.50 | 4.40 | 0.19 |
| Embodiment 6 | 2.02 | 1.05 | 2.50 | 4.40 | 0.19 |
| Embodiment 7 | 1.82 | 1.12 | 2.50 | 4.40 | 0.19 |
| Embodiment 8 | 2.75 | 1.40 | 2.50 | 3.60 | 0.20 |
| Embodiment 9 | 2.74 | 1.57 | 2.50 | 3.70 | 0.18 |

In Table 28 above, "Embodiment 1" may refer to the lens assembly 100 illustrated in FIGS. 1A to 1C, and "Embodiment 2" may refer to the lens assembly 200 illustrated in FIGS. 4A and 4B. "Embodiment 3" may refer to the lens assembly 300 illustrated in FIGS. 7A and 7B, "Embodiment 4" may refer to the lens assembly 400 illustrated in FIGS. 10A and 10B, "Embodiment 5" may refer to the lens assembly 500 illustrated in FIGS. 13A and 13B, "Embodiment 6" may refer to the lens assembly 600 illustrated in FIGS. 16A and 16B, and "Embodiment 7" may refer to the lens assembly 700 illustrated in FIGS. 19A and 19B, respectively. "Embodiment 8" may refer to the lens assembly 800 illustrated in FIGS. 22A and 22B. "Embodiment 9" may refer to the lens assembly 900 illustrated in FIGS. 25A and 25B. In addition, EFL/W_Assy is a parameter related to Formula 5, |f1/f2| is a parameter related to Formula 4, and DY_L1S1 and DX_L1S1 are parameters related to Formula 3. DY_L1/F1 is a parameter related to Formula 1. The lens assembly (e.g., 100, 200, 300, 400, 500, 600, 700, 800, or 900) according to the above-described embodiment may be mounted and used in an electronic device (e.g., optical device). In addition to the image sensor IS, the electronic device (e.g., optical device) may further include an application processor (AP), and control multiple hardware or software components connected to the AP and perform various data processes and calculations, by executing, for example, an operating system or an application program through the AP. For example, the AP may further include a graphic processing unit (GPU) and/or an image signal processor. When the AP includes an image signal processor, an image (or video) obtained by the image sensor IS may be stored or output using the AP. According to one or more embodiments of the disclosure, a lens assembly capable of achieving high magnification even with a small number of lenses may be designed. This may facilitate miniaturization of an electronic device including an optical system. For example, according to an embodiment of the disclosure, the lens assembly may be mounted in a miniaturized and/or lightweight electronic device such as a smartphone, and contribute to extending the optical functions of the electronic device or improving optical performance.

Figure 28:
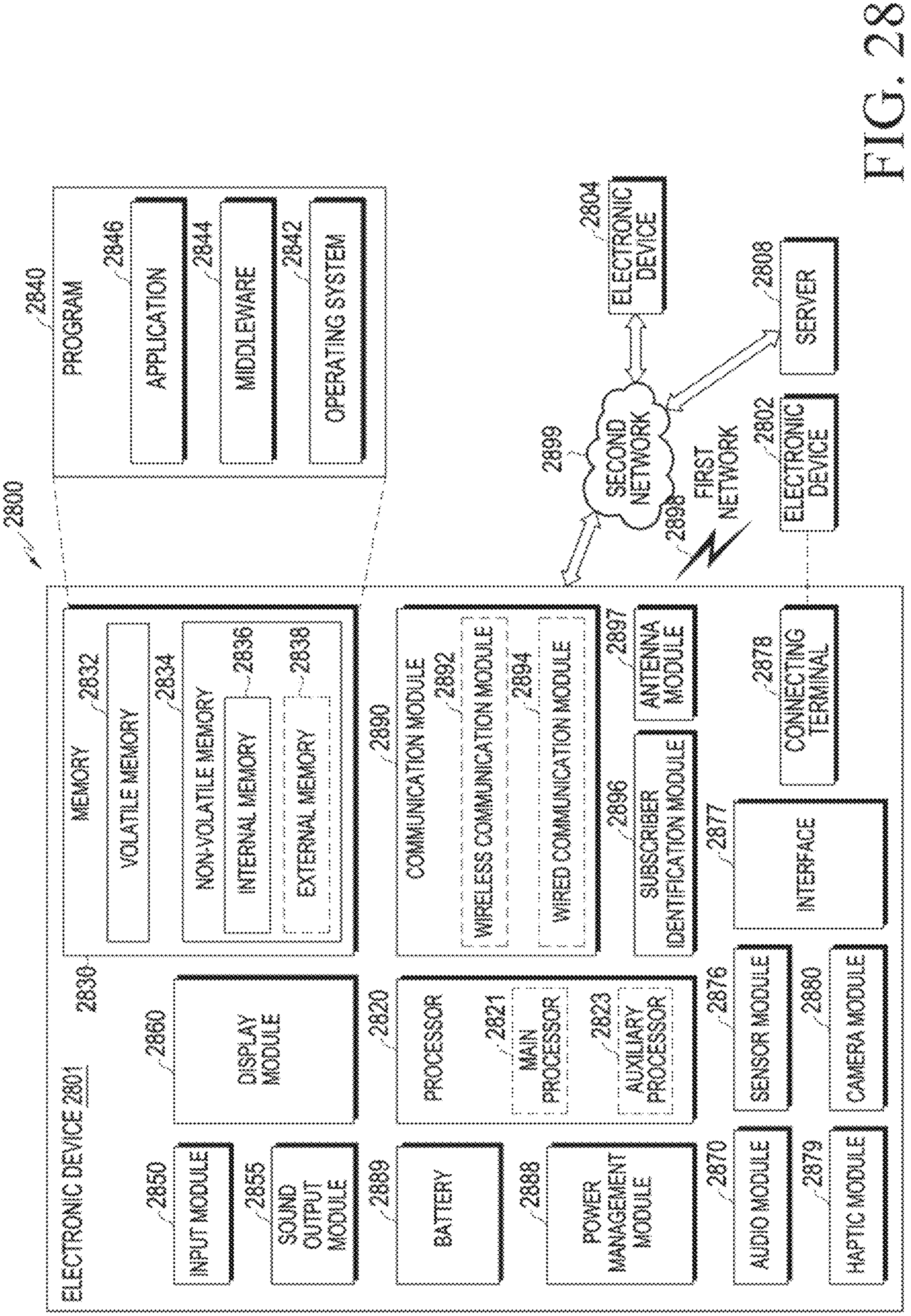
FIG. 28 is a block diagram illustrating an electronic device in a network environment according to various embodiments.

FIG. 28 is a block diagram illustrating an electronic device 2801 (e.g., an optical device) in a network environment 2800 according to one or more embodiments. Referring to FIG. 28, the electronic device 2801 (e.g., the optical device) in the network environment 2800 may communicate with an electronic device 2802 via a first network 2898 (e.g., a short-range wireless communication network), or at least one of an electronic device 2804 or a server 2808 via a second network 2899 (e.g., a long-range wireless communication network). According to an embodiment, the electronic device 2801 may communicate with the electronic device 2804 via the server 2808. According to an embodiment, the electronic device 2801 may include a processor 2820, memory 2830, an input module 2850, a sound output module 2855, a display module 2860, an audio module 2870, a sensor module 2876, an interface 2877, a connecting terminal 2878, a haptic module 2879, a camera module 2880, a power management module 2888, a battery 2889, a communication module 2890, a subscriber identification module (SIM) 2896, or an antenna module 2897. In one or more embodiments, at least one of the components (e.g., the display device 2860 or the camera module 2880) may be omitted from the electronic device 2801, or one or more other components may be added in the electronic device 2801. In one or more embodiments, some of the components (e.g., the sensor module 2876, the camera module 2880, or the antenna module 2897) may be implemented as a single component (e.g., the display module 2860).

The processor 2820 may execute, for example, software (e.g., a program 2840) to control at least one other component (e.g., a hardware or software component) of the electronic device 2801 coupled with the processor 2820, and may perform various data processing or computation. According to one embodiment, as at least part of the data processing or computation, the processor 2820 may store a command or data received from another component (e.g., the sensor module 2876 or the communication module 2890) in volatile memory 2832, process the command or the data stored in the volatile memory 2832, and store resulting data in non-volatile memory 2834. According to an embodiment, the processor 2820 may include a main processor 2821 (e.g., a central processing unit (CPU) or an application processor (AP)), or an auxiliary processor 2823 (e.g., a graphics processing unit (GPU), a neural processing unit (NPU), an image signal processor (ISP), a sensor hub processor, or a communication processor (CP)) that is operable independently from, or in conjunction with, the main processor 2821. For example, when the electronic device 2801 includes the main processor 2821 and the auxiliary processor 2823, the auxiliary processor 2823 may be adapted to consume less power than the main processor 2821, or to be specific to a specified function. The auxiliary processor 2823 may be implemented as separate from, or as part of the main processor 2821.

The auxiliary processor 2823 may control at least some of functions or states related to at least one component (e.g., the display module 2860, the sensor module 2876, or the communication module 2890) among the components of the electronic device 2801, instead of the main processor 2821 while the main processor 2821 is in an inactive (e.g., sleep) state, or together with the main processor 2821 while the main processor 2821 is in an active state (e.g., executing an application). According to an embodiment, the auxiliary processor 2823 (e.g., an image signal processor or a communication processor) may be implemented as part of another component (e.g., the camera module 2880 or the communication module 2890) functionally related to the auxiliary processor 2823. According to an embodiment, the auxiliary processor 2823 (e.g., the neural processing unit) may include a hardware structure specified for artificial intelligence model processing. An artificial intelligence model may be generated by machine learning. Such learning may be performed, e.g., by the electronic device 2801 where the artificial intelligence is performed or via a separate server (e.g., the server 2808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2830 may store various data used by at least one component (e.g., the processor 2820 or the sensor module 2876) of the electronic device 2801. The various data may include, for example, software (e.g., the program 2840) and input data or output data for a command related thereto. The memory 2830 may include the volatile memory 2832 or the non-volatile memory 2834.

The program 2840 may be stored in the memory 2830 as software, and may include, for example, an operating system (OS) 2842, middleware 2844, or an application 2846.

The input module 2850 may receive a command or data to be used by another component (e.g., the processor 2820) of the electronic device 2801, from the outside (e.g., a user) of the electronic device 2801. The input module 2850 may include, for example, a microphone, a mouse, a keyboard, a key (e.g., a button), or a digital pen (e.g., a stylus pen).

The sound output module 2855 may output sound signals to the outside of the electronic device 2801. The sound output module 2855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2860 may visually provide information to the outside (e.g., a user) of the electronic device 2801. The display module 2860 may include, for example, a display, a hologram device, or a projector and control circuitry to control a corresponding one of the display, hologram device, and projector. According to an embodiment, the display module 2860 may include a touch sensor adapted to detect a touch, or a pressure sensor adapted to measure the intensity of force incurred by the touch.

The audio module 2870 may convert a sound into an electrical signal and vice versa. According to an embodiment, the audio module 2870 may obtain the sound via the input module 2850, or output the sound via the sound output module 2855 or a headphone of an external electronic device (e.g., an electronic device 2802) directly (e.g., wiredly) or wirelessly coupled with the electronic device 2801.

The sensor module 2876 may detect an operational state (e.g., power or temperature) of the electronic device 2801 or an environmental state (e.g., a state of a user) external to the electronic device 2801, and then generate an electrical signal or data value corresponding to the detected state. According to an embodiment, the sensor module 2876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2877 may support one or more specified protocols to be used for the electronic device 2801 to be coupled with the external electronic device (e.g., the electronic device 2802) directly (e.g., wiredly) or wirelessly. According to an embodiment, the interface 2877 may include, for example, a high definition multimedia interface (HDMI), a universal serial bus (USB) interface, a secure digital (SD) card interface, or an audio interface.

A connecting terminal 2878 may include a connector via which the electronic device 2801 may be physically connected with the external electronic device (e.g., the electronic device 2802). According to an embodiment, the connecting terminal 2878 may include, for example, a HDMI connector, a USB connector, a SD card connector, or an audio connector (e.g., a headphone connector).

The haptic module 2879 may convert an electrical signal into a mechanical stimulus (e.g., a vibration or a movement) or electrical stimulus which may be recognized by a user via his tactile sensation or kinesthetic sensation. According to an embodiment, the haptic module 2879 may include, for example, a motor, a piezoelectric element, or an electric stimulator.

The camera module 2880 may capture a still image or moving images. According to an embodiment, the camera module 2880 may include one or more lenses, image sensors, image signal processors, or flashes.

The power management module 2888 may manage power supplied to the electronic device 2801. According to one embodiment, the power management module 2888 may be implemented as at least part of, for example, a power management integrated circuit (PMIC).

The battery 2889 may supply power to at least one component of the electronic device 2801. According to an embodiment, the battery 2889 may include, for example, a primary cell which is not rechargeable, a secondary cell which is rechargeable, or a fuel cell.

The communication module 2890 may support establishing a direct (e.g., wired) communication channel or a wireless communication channel between the electronic device 2801 and the external electronic device (e.g., the electronic device 2802, the electronic device 2804, or the server 2808) and performing communication via the established communication channel. The communication module 2890 may include one or more communication processors that are operable independently from the processor 2820 (e.g., the application processor (AP)) and supports a direct (e.g., wired) communication or a wireless communication. According to an embodiment, the communication module 2890 may include a wireless communication module 2892 (e.g., a cellular communication module, a short-range wireless communication module, or a global navigation satellite system (GNSS) communication module) or a wired communication module 2894 (e.g., a local area network (LAN) communication module or a power line communication (PLC) module). A corresponding one of these communication modules may communicate with the external electronic device via the first network 2898 (e.g., a short-range communication network, such as Bluetooth™, wireless-fidelity (Wi-Fi) direct, or infrared data association (IrDA)) or the second network 2899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2892 may identify and authenticate the electronic device 2801 in a communication network, such as the first network 2898 or the second network 2899, using subscriber information (e.g., international mobile subscriber identity (IMSI)) stored in the subscriber identification module 2896.

The wireless communication module 2892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2892 may support a high-frequency band (e.g., the mmWave band) to achieve, e.g., a high data transmission rate. The wireless communication module 2892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2892 may support various requirements specified in the electronic device 2801, an external electronic device (e.g., the electronic device 2804), or a network system (e.g., the second network 2899). According to an embodiment, the wireless communication module 2892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2897 may transmit or receive a signal or power to or from the outside (e.g., the external electronic device) of the electronic device 2801. According to an embodiment, the antenna module 2897 may include an antenna including a radiating element composed of a conductive material or a conductive pattern formed in or on a substrate (e.g., a printed circuit board (PCB)). According to an embodiment, the antenna module 2897 may include a plurality of antennas (e.g., array antennas). In such a case, at least one antenna appropriate for a communication scheme used in the communication network, such as the first network 2898 or the second network 2899, may be selected, for example, by the communication module 2890 (e.g., the wireless communication module 2892) from the plurality of antennas. The signal or the power may then be transmitted or received between the communication module 2890 and the external electronic device via the selected at least one antenna. According to an embodiment, another component (e.g., a radio frequency integrated circuit (RFIC)) other than the radiating element may be additionally formed as part of the antenna module 2897.

According to various embodiments, the antenna module 2897 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2801 and the external electronic device 2804 via the server 2808 coupled with the second network 2899. Each of the electronic devices 2802 or 2804 may be a device of a same type as, or a different type, from the electronic device 2801. According to an embodiment, all or some of operations to be executed at the electronic device 2801 may be executed at one or more of the external electronic devices 2802, 2804, or 2808. For example, if the electronic device 2801 should perform a function or a service automatically, or in response to a request from a user or another device, the electronic device 2801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2801. The electronic device 2801 may provide the outcome, with or without further processing of the outcome, as at least part of a reply to the request. To that end, a cloud computing, distributed computing, mobile edge computing (MEC), or client-server computing technology may be used, for example.

The electronic device 2801 may provide ultra low-latency services using, e.g., distributed computing or mobile edge computing. In another embodiment, the external electronic device 2804 may include an internet-of-things (IoT) device. The server 2808 may be an intelligent server using machine learning and/or a neural network. According to an embodiment, the external electronic device 2804 or the server 2808 may be included in the second network 2899. The electronic device 2801 may be applied to intelligent services (e.g., smart home, smart city, smart car, or healthcare) based on 5G communication technology or IoT-related technology.

Figure 29:
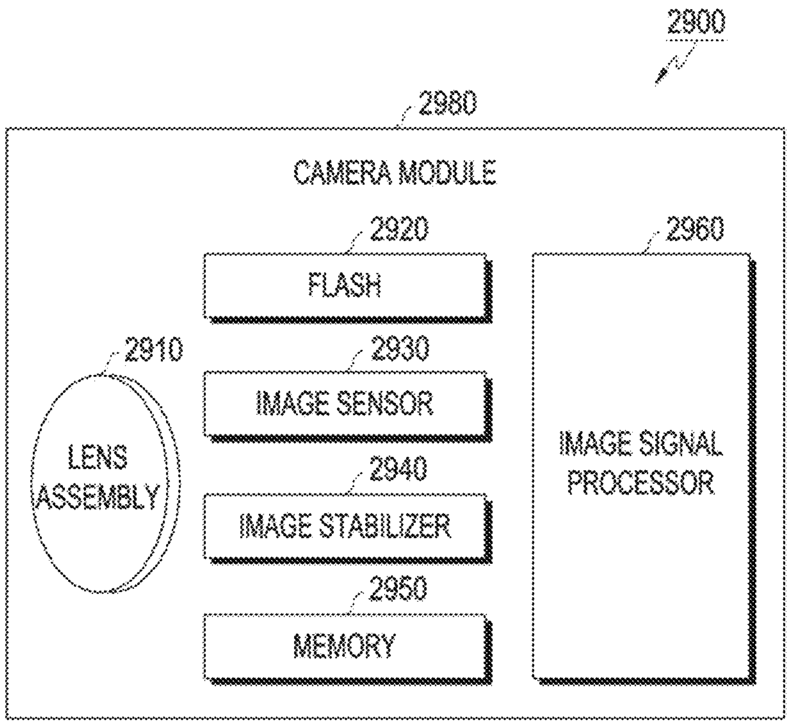
FIG. 29 is a block diagram illustrating a camera module according to one or more embodiments.

FIG. 29 is a block diagram 2900 illustrating a camera module 2980 according to various embodiments. Referring to FIG. 29, the camera module 2980 may include a lens assembly 2910 (e.g., 100, 200, 300, 400, 500, 600, 700, 800, or 900), a flash 2920, an image sensor 2930 (e.g., IS), an image stabilizer 2940, memory 2950 (e.g., buffer memory) (e.g., the memory 2830 in FIG. 28), or an image signal processor 2960. The lens assembly 2910 may collect light emitted or reflected from an object whose image is to be taken. The lens assembly 2910 may include one or more lenses. According to an embodiment, the camera module 2980 may include a plurality of lens assemblies 2910. In such a case, the camera module 2980 may form, for example, a dual camera, a 360-degree camera, or a spherical camera. Some of the plurality of lens assemblies 2910 may have the same lens attribute (e.g., view angle, focal length, auto-focusing, F number (Fno), or optical zoom), or at least one lens assembly may have one or more lens attributes different from those of another lens assembly. The lens assembly 2910 may include, for example, a wide-angle lens or a telephoto lens.

The flash 2920 may emit light that is used to reinforce light reflected from an object. According to an embodiment, the flash 2920 may include one or more light emitting diodes (LEDs) (e.g., a red-green-blue (RGB) LED, a white LED, an infrared (IR) LED, or an ultraviolet (UV) LED) or a xenon lamp. The image sensor 2930 may obtain an image corresponding to an object by converting light emitted or reflected from the object and transmitted via the lens assembly 2910 into an electrical signal. According to an embodiment, the image sensor 2930 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 2930 may be implemented using, for example, a charged coupled device (CCD) sensor or a complementary metal oxide semiconductor (CMOS) sensor.

The image stabilizer 2940 may move the image sensor 2930 or at least one lens included in the lens assembly 2910 in a particular direction, or control an operational attribute (e.g., adjust the read-out timing) of the image sensor 2930 in response to the movement of the camera module 2980 or the electronic device 2801 including the camera module 2980. This allows compensating for at least part of a negative effect (e.g., image blurring) by the movement on an image being captured. According to an embodiment, the image stabilizer 2940 may sense such a movement by the camera module 2980 or the electronic device 2801 using a gyro sensor or an acceleration sensor disposed inside or outside the camera module 2980. According to an embodiment, the image stabilizer 2940 may be implemented, for example, as an optical image stabilizer. The memory 2950 may store, at least temporarily, at least part of an image obtained via the image sensor 2930 for a subsequent image processing task. For example, if image capturing is delayed due to shutter lag or multiple images are quickly captured, a raw image obtained (e.g., a Bayer-patterned image, a high-resolution image) may be stored in the memory 2950, and its corresponding copy image (e.g., a low-resolution image) may be previewed via the display device 2860. Thereafter, if a specified condition is met (e.g., by a user's input or system command), at least part of the raw image stored in the memory 2950 may be obtained and processed, for example, by the image signal processor 2960. According to an embodiment, the memory 2950 may be configured as at least part of the memory 2830 or as a separate memory that is operated independently from the memory 2830.

The image signal processor 2960 may perform one or more image processing with respect to an image obtained via the image sensor 2930 or an image stored in the memory 2950. The one or more image processing may include, for example, depth map generation, three-dimensional (3D)

modeling, panorama generation, feature point extraction, image synthesizing, or image compensation (e.g., noise reduction, resolution adjustment, brightness adjustment, blurring, sharpening, or softening). Additionally or alternatively, the image signal processor 2960 may perform control (e.g., exposure time control or read-out timing control) with respect to at least one (e.g., the image sensor 2930) of the components included in the camera module 2980. An image processed by the image signal processor 2960 may be stored back in the memory 2950 for further processing, or may be provided to an external component (e.g., the memory 2830, the display device 2860, the electronic device 2802, the electronic device 2804, or the server 2808) outside the camera module 2980. According to an embodiment, the image signal processor 2960 may be configured as at least part of the processor 2820, or as a separate processor that is operated independently from the processor 2820. If the image signal processor 2960 is configured as a separate processor from the processor 2820, at least one image processed by the image signal processor 2960 may be displayed, by the processor 2820, via the display module 2860 as it is or after being further processed.

According to an embodiment, the electronic device 2801 may include a plurality of camera modules 2880 having different attributes or functions. In such a case, at least one of the plurality of camera modules 2880 may form, for example, a wide-angle camera and at least another of the plurality of camera modules 2880 may form a telephoto camera. Similarly, at least one of the plurality of camera modules 2880 may form, for example, a front camera and at least another of the plurality of camera modules 2880 may form a rear camera.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 2840) including one or more instructions that are stored in a storage medium (e.g., internal memory 2836 or external memory 2838) that is readable by a machine (e.g., the electronic device 2801). For example, a processor (e.g., the processor 2820) of the machine (e.g., the electronic device 2801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an electronic device (e.g., the electronic device 2801 in FIG. 28) including a lens assembly (e.g., the lens assembly 100 in FIGS. 1A to 1C; the lens assembly 200 in FIGS. 4A and 4B; the lens assembly 300 in FIGS. 7A and 7B; the lens assembly 400 in FIGS. 10A and 10B; the lens assembly 500 in FIGS. 13A and 13B; the lens assembly 600 in FIGS. 16A and 16B; the lens assembly 700 in FIGS. 19A and 19B; the lens assembly 800 in FIGS. 22A and 22B; and the lens assembly 900 in FIGS. 25A and 25B) may be provided. The electronic device may include the lens assembly including a plurality of lenses (e.g., the five lenses L1, L2, L3, L4, and L5 in FIG. 1A to 1C; the five lenses L1, L2, L3, L4, and L5 in FIGS. 4A and 4B; the five lenses L1, L2, L3, L4, and L5 in FIGS. 7A and 7B; the six lenses L1, L2, L3, L4, L5, and L6 in FIGS. 10A and 10B; the six lenses L1, L2, L3, L4, L5, and L6 in FIGS. 13A and 13B; the six lenses L1, L2, L3, L4, L5, and L6 in FIGS. 16A and 16B; the six lenses L1, L2, L3, L4, L5, and L6 in FIGS. 19A and 19B; the four lenses L1, L2, L3, and LA in FIGS. 22A and 22B; and the three lenses L1, L2, and L3 in FIGS. 25A and 25B) aligned along a direction of an optical axis directed from an object side to an image side. Among the plurality of lenses included in the lens assembly, a first lens (e.g., the first lens L1 in FIGS. 1A to 1C; the first lens L1 in FIGS. 4A and 4B; the first lens L1 in FIGS. 7A and 7B; the first lens L1 in FIGS. 10A and 10B; the first lens L1 in FIGS. 13A and 13B; the first lens L1 in FIGS. 16A and 16B; the first lens L1 in FIGS. 19A and 19B; the first lens L1 in FIGS. 22A and 22B; and the first lens L1 in FIGS. 25A and 25B) from the object side may include a synthetic resin material. At least one of an object side surface (e.g., S1 in FIGS. 1A to 1C; S1 in FIGS. 4A and 4B; S1 in FIGS. 7A and 7B; S1 in FIGS. 10A and 10B; S1 in FIGS. 13A and 13B; S1 in FIGS. 16A and 16B; S1 in FIGS. 19A and 19B; S1 in FIGS. 22A and 22B; and S1 in FIGS. 25A and 25B) or an image side surface (e.g., S2 in FIGS. 1A to 1C; S2 in FIGS. 4A and 4B; S2 in FIGS. 7A and 7B; S2 in FIGS. 10A and 10B; S2 in FIGS. 13A and 13B; S2 in FIGS. 16A and 16B; S2 in FIGS. 19A and 19B; S2 in FIGS. 22A and 22B; and S2 in FIGS. 25A and 25B) of the first lens from the object side may have a first radius of curvature for a curve in a first direction substantially perpendicular to the optical axis from a vertex through which the optical axis passes. The first lens from the object side may be a free curved surface lens formed to have a second radius of curvature different from the first radius of curvature for a curve in a second direction substantially perpendicular to the optical axis from the vertex through which the optical axis passes. The electronic device may include an image sensor (e.g., the image sensor IS in FIGS. 1A to 1C; the image sensor IS in FIGS. 4A and 4B; the image sensor IS in FIGS. 7A and 7B; the image sensor IS in FIGS. 10A and 10B; the image sensor IS in FIGS. 13A and 13B; the image sensor IS in FIGS. 16A and 16B; the image sensor IS in FIGS. 19A and 19B; the image sensor IS in FIGS. 22A and 22B; and the image sensor IS in FIGS. 25A and 25B) including an imaging plane on which an image is formed. An effective diameter of the curve in the second direction may be formed to be greater than an effective diameter of the curve in the first direction, and the electronic device may satisfy Formula 1 below.

$$0.1 < DY\_L1/F1 < 0.3 \quad \text{Formula 1}$$

(where DY_L1 is the effective diameter of the curve in the first direction on the first lens from the object side, and F1 is a focal length of the first lens from the object side in the lens assembly).

According to an embodiment, the electronic device may satisfy Formula 2 below.

$$3 < XFOV < 8 \quad \text{Formula 2:}$$

(where XFOV is a half angle of view of the curve in the second direction in an optical system including the lens assembly and the image sensor).

According to an embodiment, XFOV in Formula 2 may be formed to be equal to or greater than at least 6 degrees.

According to an embodiment, the second direction may be perpendicular to the first direction.

According to an embodiment, the curve in the first direction may be a curve (e.g., the curve C.T. in FIGS. 1B and 1C) on a tangential plane of the lens, and the curve in the second direction may be a curve (e.g., the curve C.S. in FIGS. 1B and 1C) on a sagittal plane of the lens, perpendicular to the curve in the first direction.

According to an embodiment, among the plurality of lenses included in the lens assembly, the first lens from the object side may include a curve having a third radius of curvature in a third direction perpendicular to the optical axis and different from the first direction and the second direction.

According to an embodiment, the electronic device may satisfy Formula 3 below.

$$1.0 < DX\_L1S1/DY\_L1S1 < 3.5 \quad \text{Formula 3}$$

(where DX_L1S1 is an effective diameter of a curve in the second direction on the object side surface of the first lens from the object side in the lens assembly, and DY_L1S1 is an effective diameter of a curve in the first direction on the object side surface of the first lens from the object side in the lens assembly).

According to an embodiment, among the plurality of lenses included in the lens assembly, the first lens from the object side may have a positive refractive power.

According to an embodiment, the lens assembly may further include at least two lenses having a refractive power.

According to an embodiment, at least one of a plurality of lenses including a second lens (e.g., the second lens L2 in FIGS. 1A to 1C; the second lens L2 in FIGS. 4A and 4B; the second lens L2 in FIGS. 7A and 7B; the second lens L2 in FIGS. 10A and 10B; the second lens L2 in FIGS. 13A and 13B; the second lens L2 in FIGS. 16A and 16B; the second lens L2 in FIGS. 19A and 19B; the second lens L2 in FIGS. 22A and 22B; and the second lens L2 in FIGS. 25A and 25B) from the object side to a last lens (e.g., the fifth lens L5 in FIGS. 1A to 1C; the fifth lens L5 in FIGS. 4A and 4B; the fifth lens L5 in FIGS. 7A and 7B; the sixth lens L6 in FIGS. 10A and 10B; the sixth lens L6 in FIGS. 13A and 13B; the sixth lens L6 in FIGS. 16A and 16B; the sixth lens L6 in FIGS. 19A and 19B; the fourth lens L4 in FIGS. 22A and 22B; and the third lens L3 in FIGS. 25A and 25B) closest to the image side in the lens assembly may include a synthetic resin material.

According to an embodiment, the second lens from the object side in the lens assembly may include a synthetic resin material. Further, the electronic device may satisfy Formula 4 below.

$$0.2 < |F1/F2| < 2.0 \quad \text{Formula 4}$$

(where F1 is the focal length of the first lens from the object side in the lens assembly, and F2 is a focal length of the second lens from the object side in the lens assembly).

According to an embodiment, at least one of a plurality of lenses including a second lens (e.g., the second lens L2 in FIGS. 1A to 1C; the second lens L2 in FIGS. 4A and 4B; the second lens L2 in FIGS. 7A and 7B; the second lens L2 in FIGS. 10A and 10B; the second lens L2 in FIGS. 13A and 13B; the second lens L2 in FIGS. 16A and 16B; the second lens L2 in FIGS. 19A and 19B; the second lens L2 in FIGS. 22A and 22B; and the second lens L2 in FIGS. 25A and 25B) from the object side to a last lens (e.g., the fifth lens L5 in FIGS. 1A to 1C; the fifth lens L5 in FIGS. 4A and 4B; the fifth lens L5 in FIGS. 7A and 7B; the sixth lens L6 in FIGS. 10A and 10B; the sixth lens L6 in FIGS. 13A and 13B; the sixth lens L6 in FIGS. 16A and 16B; the sixth lens L6 in FIGS. 19A and 19B; the fourth lens L4 in FIGS. 22A and 22B; and the third lens L3 in FIGS. 25A and 25B) closest to the image side in the lens assembly may include an aspheric surface.

According to an embodiment, the electronic device may satisfy Formula 5 below.

$$1.0 < EFL/\text{W\_Assy} < 2.5 \quad \text{Formula 5}$$

(where EFL is a total focal length of the lens assembly, and W_Assy is a distance from the object side surface of the first lens from the object side to an image side surface of a last lens in the lens assembly).

According to an embodiment of the disclosure, an electronic device (e.g., the electronic device 2801 in FIG. 28) including a lens assembly (e.g., the lens assembly 100 in FIGS. 1A to 1C; the lens assembly 200 in FIGS. 4A and 4B; the lens assembly 300 in FIGS. 7A and 7B; the lens assembly 400 in FIGS. 10A and 10B; the lens assembly 500 in FIGS. 13A and 13B; the lens assembly 600 in FIGS. 16A and 16B; the lens assembly 700 in FIGS. 19A and 19B; the lens assembly 800 in FIGS. 22A and 22B; and the lens assembly 900 in FIGS. 25A and 25B) is provided. The electronic device may include the lens assembly including at least three lenses aligned along a direction of an optical axis directed from an object side to an image side. A first lens from the object side may have a positive refractive power and include a synthetic resin material. At least one of an object side surface or an image side surface of the first lens from the object side may be formed to have a first radius of curvature for a curve (e.g., the curve C.T. in FIGS. 1B and 1C) on a tangential plane and a second radius of curvature different from the first radius of curvature for a curve (e.g., the curve C.S. in FIGS. 1B and 1C) on a sagittal plane. The first lens from the object side may be a free curved surface lens in which an effective diameter on a sagittal plane (e.g., the effective diameter DX_L1S1 on the sagittal plane in FIGS. 1B and 1C) and an effective diameter on a tangential plane (e.g., the effective diameter DY_L1S1 on the tangential plane in FIGS. 1B and 1C) are different on the object side surface of the first lens from the object side. The electronic device may include an image sensor including an imaging plane on which an image is formed. An effective diameter on a sagittal plane may be formed to be greater than an effective diameter on a tangential plane in the first lens from the object side, and the electronic device may satisfy Formula 1 and Formula 2 below.

$$0.1 < \text{DY\_L1}/F1 < 0.3 \quad \text{Formula 1}$$

$$3 < XFOV < 8 \quad \text{Formula 2}$$

(where DY_L1 is the effective diameter on the tangential plane in the first lens from the object side, and F1 is a focal length of the first lens from the object side in the lens assembly in Formula 1, and XFOV is a half angle of view on a sagittal plane in an optical system including the lens assembly and the image sensor in Formula 2).

According to an embodiment, the electronic device may satisfy Formula 3 below.

$$1.0 < \text{DX\_L1S1}/\text{DY\_L1S1} < 3.5 \quad \text{Formula 3}$$

(where DX_L1S1 is the effective diameter on the sagittal plane of the object side surface of the first lens from the object side in the lens assembly, and DY_L1S1 is the effective diameter on the tangential plane of the object side surface of the first lens from the object side in the lens assembly).

According to an embodiment, at least one of a plurality of lenses including a second lens from the object side to a last lens closest to the image side in the lens assembly may include a synthetic resin material and an aspheric surface.

According to an embodiment, the second lens from the object side in the lens assembly may include a synthetic resin material, and the electronic device may satisfy Formula 4 below.

$$0.2 < |F1/F2| < 2.0 \quad \text{Formula 4}$$

(where F1 is the focal length of the first lens from the object side in the lens assembly, and F2 is a focal length of the second lens from the object side in the lens assembly).

According to an embodiment, the electronic device may satisfy Formula 5 below.

$$1.0 < EFL/\text{W\_Assy} < 2.5 \quad \text{Formula 5}$$

(where EFL is a total focal length of the lens assembly, and W_Assy is a distance from the object side surface of the first lens from the object side to an image side surface of a last lens closest to the image side in the lens assembly).

According to an embodiment of the disclosure, an electronic device (e.g., the electronic device 2801 in FIG. 28) including a lens assembly (e.g., the lens assembly 100 in FIGS. 1A to 1C; the lens assembly 200 in FIGS. 4A and 4B; the lens assembly 300 in FIGS. 7A and 7B; the lens assembly 400 in FIGS. 10A and 10B; the lens assembly 500 in FIGS. 13A and 13B; the lens assembly 600 in FIGS. 16A and 16B; the lens assembly 700 in FIGS. 19A and 19B; the lens assembly 800 in FIGS. 22A and 22B; and the lens assembly 900 in FIGS. 25A and 25B) may be provided. The electronic device may include the lens assembly including at least three lenses aligned along a direction of an optical axis directed from an object side to an image side. A first lens from the object side may include a synthetic resin material. The first lens from the object side may be a free curved surface lens having different radii of curvature and effective diameters in at least two directions substantially perpendicular to the optical axis, on at least one of an object side surface or an image side surface of the first lens from the object side. The electronic device may include an image sensor including an imaging plane on which an image is formed, and satisfy Formula 2 below.

$$3 < XFOV < 8 \quad \text{Formula 2}$$

(where XFOV is a half angle of view of an optical system including the lens assembly and the image sensor).

According to an embodiment, the electronic device may satisfy Formula 1 below.

$$0.1 < DY\_L1/F1 < 0.3 \quad \text{Formula 1}$$

(where DY_L1 is an effective diameter of a curve in a first direction on the first lens from the object side, and F1 is a focal length of the first lens from the object side in the lens assembly).

While specific embodiments have been described above in the detailed description of an embodiment of the disclosure, various modifications may be made by a person of skill in the art without departing from the subject matter of the disclosure. For example, in a specific embodiment of the disclosure, the dimensions of a plurality of lenses may be appropriately set according to the structure and requirements of a lens assembly to be actually manufactured or an electronic device in which the lens assembly is to be mounted, an actual use environment, and so on.

What is claimed is:

1. An electronic device comprising:

an image sensor comprising an imaging plane on which an image is formed; and a lens assembly comprising a plurality of lenses aligned along a direction of an optical axis, the lens assembly having an object side corresponding to an object being viewed and an image side corresponding to the imaging plane, wherein the plurality of lenses comprises a first lens from the object side of the lens assembly, wherein the first lens is closest to the object side of the lens assembly among the plurality of lenses, wherein an object side of the first lens comprises a synthetic resin material, wherein at least one surface of an object side surface of the first lens or an image side surface of the first lens is a free curved surface lens, the free curved surface lens comprising a first radius of curvature for a curve in a first direction substantially perpendicular to the optical axis from a vertex through which the optical axis passes, and a second radius of curvature different from the first radius of curvature for a curve in a second direction substantially perpendicular to the optical axis from the vertex through which the optical axis passes, wherein an effective diameter of the curve in the second direction is greater than an effective diameter of the curve in the first direction, and wherein the electronic device satisfies Formula 1:

$$0.1 < DY\_L1/F1 < 0.3, \quad \text{Formula 1}$$

wherein DY_L1 is the effective diameter of the curve in the first direction, and F1 is a focal length of the first lens.

2. The electronic device of claim 1, wherein the electronic device satisfies Formula 2:

$$3 < XFOV < 8, \quad \text{Formula 2}$$

wherein XFOV is a half angle of view of the curve in the second direction.

3. The electronic device of claim 2, wherein XFOV is equal to or greater than 6 degrees.

4. The electronic device of claim 1, wherein the second direction is perpendicular to the first direction.

5. The electronic device of claim 1, wherein the curve in the first direction is a curve on a tangential plane of the lens, and the curve in the second direction is a curve on a sagittal plane of the lens, wherein the curve in the second direction is perpendicular to the curve in the first direction.

6. The electronic device of claim 5, wherein among the plurality of lenses included in the lens assembly, the first lens from the object side includes a curve having a third radius of curvature in a third direction perpendicular to the optical axis and different from the first direction and the second direction.

7. The electronic device of claim 1, wherein the electronic device satisfies Formula 3:

$$1.0 < DX\_L1S1/DY\_L1S1 < 3.5, \quad \text{Formula 3}$$

wherein DX_L1S1 is the effective diameter of the curve in the second direction, and DY_L1S1 is the effective diameter of the curve in the first direction.

8. The electronic device of claim 1, wherein the first lens has a positive refractive power.

9. The electronic device of claim 8, wherein the plurality of lenses further comprises at least two lenses having a refractive power.

10. The electronic device of claim 1, wherein at least one of the plurality of lenses other than the first lens comprises a synthetic resin material.

11. The electronic device of claim 1, wherein a second lens from the object side of the lens assembly comprises a synthetic resin material, and wherein the electronic device satisfies Formula 4:

$$0.2 < |F1/F2| < 2.0, \quad \text{Formula 4}$$

wherein F1 is the focal length of the first lens, and F2 is a focal length of the second lens.

12. The electronic device of claim 1, wherein at least one of the plurality of lenses other than the first lens comprises an aspheric surface.

13. The electronic device of claim 1, wherein the electronic device satisfies Formula 5:

$$1.0 < EFL/\text{W\_Assy} < 2.5, \qquad \text{Formula 5}$$

wherein EFL is a total focal length of the lens assembly, and W_Assy is a distance from the object side surface of the first lens to an image side surface of a last lens in the lens assembly, wherein the last lens is closest to the image side of the lens assembly among the plurality of lenses.

14. An electronic device comprising:

an image sensor comprising an imaging plane on which an image is formed, a lens assembly comprising a plurality of lenses aligned along an optical axis, the lens assembly having an object side corresponding to an object being viewed and an image side corresponding to the imaging plane, wherein the plurality of lenses are sequentially arranged from the object side of the lens assembly to the image side of the lens assembly, wherein the plurality of lenses comprises a first lens closest to the object side of the lens assembly among the plurality of lenses, wherein at least one surface of an object side surface of the first lens or an image side surface of the first lens is a free curved surface lens, the free curved surface lens comprising a first radius of curvature for a curve in a first direction substantially perpendicular to the optical axis from a vertex through which the optical axis passes, and a second radius of curvature different from the first radius of curvature for a curve in a second direction substantially perpendicular to the optical axis from the vertex through which the optical axis passes, wherein an effective diameter of the curve in the second direction is greater than an effective diameter of the curve in the first direction, and wherein the electronic device satisfies Formula 1:

$$0.1 < \text{DY\_L1}/F1 < 0.3, \qquad \text{Formula 1}$$

wherein DY_L1 is the effective diameter of the curve in the first direction, and F1 is a focal length of the first lens.

15. The electronic device of claim 14, wherein the plurality of lenses further comprises a second lens, a third lens, and a fourth lens sequentially arranged from the object side of the lens assembly to the image side of the lens assembly, wherein the second lens is on the image side of the first lens, and the fourth lens is closest to the image side of the lens assembly among the plurality of lenses, and wherein the first lens has a positive refractive power, the second lens has a negative refractive power, the third lens has a negative refractive power, and the fourth lens has a positive refractive power.

16. The electronic device of claim 14, wherein the plurality of lenses further comprises a second lens, a third lens, a fourth lens, and a fifth lens sequentially arranged from the object side of the lens assembly to the image side of the lens assembly, wherein the second lens is on the image side of the first lens, and the fifth lens is closest to the image side of the lens assembly among the plurality of lenses, and wherein the first lens has a positive refractive power, the second lens has a negative refractive power, the third lens has a negative refractive power, the fourth lens has a positive refractive power, and the fifth lens has a positive refractive power.

17. The electronic device of claim 14, wherein the plurality of lenses further comprises a second lens, a third lens, a fourth lens, a fifth lens, and a sixth lens sequentially arranged from the object side of the lens assembly to the image side of the lens assembly, wherein the second lens is on the image side of the first lens, and the sixth lens is closest to the image side of the lens assembly among the plurality of lenses, and wherein the first lens has a positive refractive power, the second lens has a negative refractive power, the third lens has a negative refractive power, the fourth lens has a positive refractive power, the fifth lens has a negative refractive power, and the sixth lens has a positive refractive power.

18. The electronic device of claim 14, wherein the plurality of lenses further comprises a second lens and a third lens sequentially arranged from object side of the lens assembly to the image side of the lens assembly, wherein the second lens is on the image side of the first lens, and the third lens is closest to the image side of the lens assembly among the plurality of lenses, and wherein the first lens has a positive refractive power, the second lens has a negative refractive power, and the third lens has a positive refractive power.

19. The electronic device of claim 14, wherein at least one of the plurality of lenses comprises a synthetic resin material.

20. The electronic device of claim 14, wherein at least one of the plurality of lenses other than the first lens comprises an aspheric surface.

* * * * *